US008059117B2

(12) United States Patent
Takatori

(10) Patent No.: US 8,059,117 B2
(45) Date of Patent: Nov. 15, 2011

(54) LIQUID CRYSTAL DISPLAY DEVICE, AND METHOD AND CIRCUIT FOR DRIVING LIQUID CRYSTAL DISPLAY DEVICE

(75) Inventor: Kenichi Takatori, Tokyo (JP)

(73) Assignee: NEC LCD Technologies, Ltd, Kanagawa (JP)

( * ) Notice: Subject to any disclaimer, the term of this patent is extended or adjusted under 35 U.S.C. 154(b) by 0 days.

(21) Appl. No.: 12/870,746

(22) Filed: Aug. 27, 2010

(65) Prior Publication Data

US 2010/0321376 A1 Dec. 23, 2010

Related U.S. Application Data

(62) Division of application No. 12/725,125, filed on Mar. 16, 2010, which is a division of application No. 11/019,322, filed on Dec. 23, 2004, now abandoned.

(30) Foreign Application Priority Data

Dec. 26, 2003 (JP) ................................ 2003-435693

(51) Int. Cl.
*G06F 3/038* (2006.01)
*G09G 5/00* (2006.01)

(52) U.S. Cl. .......................... 345/214; 345/87; 345/213

(58) Field of Classification Search ............ 345/87–100, 345/211–214

See application file for complete search history.

(56) References Cited

U.S. PATENT DOCUMENTS 4,596,446 A 6/1986 Water et al.
4,715,688 A 12/1987 Harada et al.
4,717,871 A 1/1988 Yoo
4,899,224 A 2/1990 Ooba et al.
5,200,926 A 4/1993 Iwahashi et al.
5,218,232 A 6/1993 Yuzurihara et al.
5,274,366 A 12/1993 Hayashi et al.
5,412,240 A 5/1995 Inoue et al.
5,546,102 A 8/1996 Scheffer et al.
5,572,735 A 11/1996 Tanikawa (Continued)

FOREIGN PATENT DOCUMENTS

CN 1348166 A 5/2002

(Continued)

OTHER PUBLICATIONS

N. Nakamura et al., "Modified Drive Method for OCB LCD", IBM-Japan, Ltd., 1997, pp. L-66-L-69.

*Primary Examiner* — Kimnhung Nguyen
(74) *Attorney, Agent, or Firm* — Sughrue Mion, PLLC

(57) ABSTRACT

A liquid crystal display device includes a display section, an image signal drive circuit, a scan signal drive circuit, a common electrode potential control circuit, and a synchronous circuit. The display section has scan electrodes, image signal electrodes, a plurality of pixel electrodes arranged in a matrix, a plurality of switching elements for transmitting an image signal to the pixel electrodes, and a common electrode. The common electrode potential control circuit changes an electric potential of the common electrode into a pulse shape, after the scan signal drive circuit has scanned all the scan electrodes and the image signal has been transmitted to the pixel electrodes. Otherwise, the image signal is overdriven. Otherwise, torque for returning to a no-voltage-application state is increased.

16 Claims, 39 Drawing Sheets

U.S. PATENT DOCUMENTS 5,591,990 A 1/1997 Misawa et al.
5,637,187 A 6/1997 Takasu et al.
5,670,970 A 9/1997 Yamazaki
5,686,932 A * 11/1997 Tomita ............................ 345/94
5,754,154 A 5/1998 Katakura et al.
5,852,429 A 12/1998 Scheffer et al.
6,046,790 A 4/2000 Hara et al.
6,067,062 A 5/2000 Takasu et al.
6,211,849 B1 4/2001 Sasaki et al.
6,232,948 B1 5/2001 Tsuchi
RE37,333 E 8/2001 Harada et al.
6,307,681 B1 10/2001 Aoki et al.
6,509,895 B2 1/2003 Yanagi et al.
6,542,211 B1 4/2003 Okada et al.
6,628,355 B1 9/2003 Takahara
6,768,535 B2 7/2004 Yasukawa et al.
6,903,716 B2 6/2005 Kawabe et al.
6,909,415 B2 * 6/2005 Kumagawa et al. ............ 345/92
6,927,829 B2 8/2005 Yamagishi et al.
6,982,770 B2 1/2006 Lim et al.
6,992,718 B1 1/2006 Takahra
7,002,542 B2 * 2/2006 Lee ................................ 345/94
7,027,023 B2 4/2006 Okishiro et al.
7,133,004 B2 11/2006 Tomitani
7,145,520 B2 12/2006 Ramanujan
7,161,576 B2 1/2007 Kawabe et al.
7,355,575 B1 * 4/2008 Ota et al. ........................ 345/87
7,463,235 B2 12/2008 Hiyama et al.
2001/0033261 A1 * 10/2001 Washio et al. .................. 345/87
2001/0033266 A1 * 10/2001 Lee ................................ 345/94
2002/0015131 A1 2/2002 Sato
2002/0018059 A1 2/2002 Yanagi et al.
2002/0024491 A1 * 2/2002 Hosoyamada .................. 345/88
2002/0033909 A1 3/2002 Hiyama et al.
2002/0057403 A1 5/2002 Yasukawa et al.
2002/0084967 A1 7/2002 Akimoto et al.
2002/0093472 A1 7/2002 Numao
2002/0113929 A1 8/2002 Yamazaki et al.
2002/0154078 A1 10/2002 Yoshihara et al.
2003/0011739 A1 1/2003 Yoshihara et al.
2003/0025659 A1 2/2003 Kondo et al.
2003/0043103 A1 3/2003 Yoshihara et al.
2003/0052847 A1 3/2003 Hiyama et al.
2003/0058229 A1 * 3/2003 Kawabe et al. ............... 345/204
2003/0063074 A1 * 4/2003 Kumagawa et al. .......... 345/204
2003/0076289 A1 * 4/2003 Tokonami et al. ............ 345/100
2003/0095228 A1 5/2003 Hiji et al.
2003/0107546 A1 6/2003 Ham
2003/0117538 A1 6/2003 Lim et al.
2003/0132903 A1 * 7/2003 Ueda ............................... 345/87
2003/0156086 A1 8/2003 Maeda et al.
2003/0169247 A1 9/2003 Kawabe et al.
2003/0201969 A1 10/2003 Hiyama et al.
2003/0218593 A1 11/2003 Inoue
2004/0012551 A1 1/2004 Ishii
2004/0041782 A1 3/2004 Tachibana
2004/0263760 A1 12/2004 Kodate et al.
2005/0219188 A1 10/2005 Kawabe et al.
2006/0145978 A1 7/2006 Takatori et al.
2006/0250346 A1 11/2006 Ham
2007/0080905 A1 4/2007 Takahara
2007/0085794 A1 4/2007 Kawabe et al.
2010/0171818 A1 * 7/2010 Takatori .......................... 348/51

FOREIGN PATENT DOCUMENTS

JP 02-157815 A 6/1990
JP 05-107557 A 4/1993
JP 06-138440 A 5/1994
JP 2001-506376 A 5/2001
JP 2002-182621 A 6/2002
JP 2003-228080 A 8/2003
JP 2005-010202 A 1/2005
WO 98/27538 A1 6/1998

* cited by examiner

LIQUID CRYSTAL DISPLAY DEVICE, AND METHOD AND CIRCUIT FOR DRIVING LIQUID CRYSTAL DISPLAY DEVICE

CROSS REFERENCE TO RELATED APPLICATIONS

This application is a divisional of U.S. patent application Ser. No. 12/725,125, filed Mar. 16, 2010, which is a divisional of U.S. patent application Ser. No. 11/019,322, filed Dec. 23, 2004, which claims priority from Japanese Patent Application No. 2003-435693, filed Dec. 26, 2003, the contents of all of which are incorporated herein by reference in their entirety.

BACKGROUND OF THE INVENTION

1. Field of the Invention

The present invention relates to a liquid crystal display device, and a method and a circuit for driving the liquid crystal display device. In particular, the present invention relates to a liquid crystal display device which can respond at high speed with high efficiency, and a method and a circuit for driving the liquid crystal display device.

2. Description of the Related Art

With the progression of the age of multimedia, various types of liquid crystal display devices, from a small one used in a projector device, a cellular phone, a viewfinder, and the like to a large one used in a notebook PC, a monitor, a television, and the like, have rapidly become widespread. A medium-sized liquid crystal display device has become essential in electronic equipment such as a viewer and a PDA, and in a game instrument such as a portable game machine and a pachinko (Japanese pinball game) machine. The liquid crystal display device has been used in various types of equipment down to a household electrical appliance such as a refrigerator and a microwave oven. Currently, almost all liquid crystal display elements are in a twisted nematic (hereinafter referred to as "TN") type display device. The TN liquid crystal display element takes advantage of a nematic liquid crystal composition. When the conventional TN liquid crystal display element is driven by simple matrix drive, display quality is not high, and the number of scanning lines is limited. Thus, an STN (super twisted nematic) type device is mainly used in the simple matrix drive system, instead of the TN device. In the STN device, contrast and viewing angle dependence have been improved, as compared with an initial simple matrix drive system using the TN device. The STN liquid crystal display device, however, is not suited for displaying moving images because the response speed thereof is slow. To improve the display performance of the simple matrix drive, an active matrix device, in which each pixel is provided with a switching element, has been developed and widely used. For example, a TN-TFT device that uses a thin film transistor (TFT) in the TN type display has been generally used. The active matrix device using the TFT can realize higher display quality than the simple matrix drive, so that the TN-TFT liquid crystal display device has currently become the mainstream of a market.

In response to a demand for further improving image quality, on the other hand, a method for improving a viewing angle has been researched and developed, and in practical use. As a result, three types of active matrix liquid crystal display devices have become the mainstream of a current liquid crystal display with high performance. One of the three types is the TN LCD using a compensation film. Another is the TFT active matrix LCD in an IPS (in plane switching) mode, and the other is the TFT active matrix LCD in an MVA (multi-domain vertical aligned) mode.

In these active matrix liquid crystal display devices, positive and negative writing is generally carried out by using an image signal of 30 Hz. Thus, an image is rewritten every 60 Hz, and time for a single field is approximately 16.7 ms (milliseconds). Namely, the total time of positive and negative fields is called a single frame, and is approximately 33.3 ms. As compared with this, the response speed of current liquid crystal is on the order of this frame time even in a fastest condition, in consideration of a response during halftone display. Thus, when an image signal composed of moving images, high speed computer graphics (CG), or high speed game images is/are displayed, a response speed faster than the current frame time is necessary.

On the other hand, a current mainstream pixel size is approximately 100 ppi (pixel per inch), and pixels have been further fined by the following two methods. One of the methods is to reduce the pixel size by increasing the accuracy of processing. The other method is to adopt a field sequential (time division) color liquid crystal display device. In the field sequential (time division) color liquid crystal display device, a backlight serving as illumination light of the liquid crystal display device is switched among red, green, and blue in accordance with time. Red, green, and blue images are displayed in synchronization with the switching of the backlight. According to this method, it is unnecessary to spatially dispose a color filter. Thus, it is possible to improve the display resolution three times as fine as the conventional one. In the field sequential liquid crystal display device, since a single color has to be displayed for one-third time of the single field, time available for display is approximately 5 ms. Therefore, it is required that the liquid crystal itself respond faster than 5 ms.

From the necessity of such high speed liquid crystal, various technologies have been considered, and some of high speed display mode technologies have been developed. These technologies for the high speed liquid crystal are mainly divided in two trends. One is a technology for speeding up the foregoing nematic liquid crystal being the mainstream. The other is a technology for using a spontaneous polarization type of smectic liquid crystal that can respond at high speed, or the like. The speedup of the nematic liquid crystal, being a first trend, is mainly carried out by the following means. (1) Thinning a cell gap, and increasing electric field intensity at the same voltage. (2) Applying a high voltage, and increasing electric field intensity to accelerate change in a state (an overdrive method.) (3) Reducing viscosity. (4) Using a mode to be thought of high speed in principle.

The following problems occur in such high speed nematic liquid crystal. In the high speed nematic liquid crystal, a liquid crystal response is almost completed within the frame, so that variation in capacitance of a liquid crystal layer due to the anisotropy of permittivity becomes extremely large. The variation in the capacitance causes variation in a holding voltage to be written into and held in the liquid crystal layer. The variation in the holding voltage like this, that is, variation in an effective applied voltage lowers contrast due to a shortage of writing. When the same signal is written continuously, luminance keeps varying until the holding voltage stops varying, and hence several frames are necessary to obtain stable luminance.

To prevent such a response needing the several frames, it is necessary to provide a one-to-one correspondence between an applied signal voltage and obtained transmittance. In the active matrix drive, transmittance after a liquid crystal response is determined in accordance with the amount of electric charge accumulated in a liquid crystal capacitor after the liquid crystal response, instead of the applied signal voltage. This is because the active drive is a constant electric charge drive in which the held electric charge makes the liquid crystal respond. The amount of electric charge supplied from an active element is determined by accumulated electric charge before writing a predetermined signal and newly written electric charge, when omitting a minute leak and the like. The accumulated electric charge after the response of the liquid crystal varies in accordance with pixel design values of the liquid crystal such as physical constants, electric parameters, and storage capacitance. Therefore, to make the signal voltage and the transmittance correspond to each other, information for calculating (1) correspondence between the signal voltage and the written electric charge, (2) the accumulated electric charge before writing, and (3) the accumulated electric charge after the response, actual calculation for the items (1) to (3) and the like are necessary. As a result of this, a frame memory for storing information in the item (2) over the whole screen, and calculation sections for the items (1) and (3) become necessary.

On the other hand, a reset pulse method is often used as a method for establishing a one-to-one correspondence without using the foregoing frame memory and the calculation sections. In the reset pulse method, a reset voltage is applied before writing new data to align the liquid crystal in a predetermined state. By way of example, a technology disclosed in IDRC 1997 pages L-66 to L-69 will be described. The technology disclosed in this document uses an OCB (optically compensated birefringence) mode, in which nematic liquid crystal is in pi-alignment and a compensation film is added. The response speed of this liquid crystal mode is approximately 2 to 5 milliseconds, and is much faster than that of the conventional TN mode. As a result, a response which should be originally completed within a single frame needs several frames, as described above, until variation in permittivity by a response of the liquid crystal significantly decreases the holding voltage and stable transmittance is obtained. Thus, a method for necessarily writing black display after writing white display within the single frame is shown in FIG. 5 disclosed in the IDRC 1997 pages L-66 to L-69. This drawing is quoted as FIG. 1. Referring to FIG. 1, a horizontal axis represents time, and a vertical axis represents luminance. A dotted line that indicates variation in the luminance in the case of normal drive reaches the stable luminance at the third frame. According to this reset pulse method, since the liquid crystal is certainly in a predetermined state in writing new data, it was possible to establish the one-to-one correspondence between a written constant signal voltage and constant transmittance. The generation of a driving signal becomes extremely easy because of the one-to-one correspondence. Also, means for storing previously written information such as the frame memory becomes unnecessary.

The structure of a pixel of an active matrix type of liquid crystal display device will be hereinafter summarized. FIG. 2 shows an example of a pixel circuit of a single pixel of the conventional active matrix type of liquid crystal display device. As shown in FIG. 2, the pixel of the active matrix type of liquid crystal display device comprises a MOS transistor (Qn) (hereinafter called a transistor (Qn)) 904, a storage capacitor 906, and a liquid crystal 908. A gate electrode of the transistor (Qn) 904 is connected to a scan line (or a scan signal electrode) 901. One of source and drain electrodes of the transistor (Qn) 904 is connected to a signal line (or an image signal electrode) 902, and the other of the source and drain electrodes is connected to a pixel electrode 903. The storage capacitor 906 is formed between the pixel electrode 903 and a storage capacitor electrode 905. The liquid crystal 908 is disposed between the pixel electrode 903 and an opposed electrode (or a common electrode) Vcom 907.

Currently, in a notebook personal computer (notebook PC) which forms a large application market of the liquid crystal display device, an amorphous silicon thin-film transistor (hereinafter abbreviated as a-Si TFT) or a poly-silicon thin-film transistor (hereinafter abbreviated as p-Si TFT) has been generally used as the transistor (Qn) 904. As a material for the liquid crystal, a TN liquid crystal has been used. FIG. 3 shows an equivalent circuit of the TN liquid crystal. As shown in FIG. 3, the equivalent circuit of the TN liquid crystal comprises a capacitor component C3 of the liquid crystal (capacitance Cpix), a resistor R1 (resistance Rr), and a capacitor C1 (capacitance Cr). The capacitor component C3 is connected in parallel with the resistor R1 and the capacitor C1. In this equivalent circuit, the resistance Rr and the capacitance Cr are components for determining a response time constant of the liquid crystal.

FIG. 4 is a timing chart of a scan line voltage Vg, a signal line voltage (or image signal voltage) Vd, and a voltage Vpix of the pixel electrode 903 (hereinafter called a pixel voltage), in the case where such a TN liquid crystal is driven in the pixel circuit shown in FIG. 2. As shown in FIG. 4, since the scan line voltage Vg is at a high level VgH during a horizontal scan period, the n-type MOS transistor (Qn) 904 is turned on. Therefore, the signal line voltage Vd inputted into the signal line 902 is transferred to the pixel electrode 903 through the transistor (Qn) 904. The TN liquid crystal normally operates in a mode, in which light passes through when voltage is not applied, that is, the so-called normally white mode.

In FIG. 4, voltage for increasing transmittance through the TN liquid crystal is applied as the signal line voltage Vd over a few fields. When the horizontal scan period is completed, and the scan line voltage Vg becomes a low level, the transistor (Qn) 904 is turned into an off state. Thus, the signal line voltage transferred to the pixel electrode 903 is held by the storage capacitor 906 and the capacitor Cpix of the liquid crystal. At this time, the pixel voltage Vpix carries out a voltage shift, which is called a feed-through voltage, through capacitance between the gate and the source of the transistor (Qn) 904, at a time when the transistor (Qn) 904 is turned off. This voltage shift is indicated by Vf1, Vf2, and Vf3 in FIG. 4. Increasing a value of the storage capacitor 906 makes it possible to reduce the amount of the voltage shift Vf1 to Vf3.

The pixel voltage Vpix is held, until the scan line voltage Vg becomes the high level again in the next field period and the transistor (Qn) 904 is selected. The TN liquid crystal is switched in accordance with the held pixel voltage Vpix. Light transmitted through the liquid crystal shifts from a dark state to a bright state as shown in transmittance T1. At this time, as shown in FIG. 4, the pixel voltage Vpix varies by $\Delta V1$, $\Delta V2$, and $\Delta V3$ in each field. This is because the capacitance of the liquid crystal varies in accordance with the response of the liquid crystal. To minimize this variation, the storage capacitor 906 is generally designed so as to have two, three times or more as large capacitance as the pixel capacitor Cpix. As described above, the TN liquid crystal is driven by the pixel circuit shown in FIG. 2.

Japanese National Publication No. 2001-506376 discloses technology for modulating a common voltage (common electrode voltage (or opposed electrode voltage)). The technology has the effects of a combination of the overdrive method and a reset method. FIG. 2C of this Publication No. 2001-506376 is quoted as FIG. 5. In this technology, the common voltage, being the voltage of a common electrode disposed opposite to the pixel electrode, is generally modulated. In FIG. 5, an upper graph indicates variation in the common voltage (VCG) with time, and a lower graph indicates variation in transmittance (I) with time due to a liquid crystal response. In other words, a voltage having a voltage waveform 151 is applied to the common electrode, and a light intensity waveform 152 indicates light intensity at time corresponding to the waveform 151. Line segments 153 to 156 are pixel light intensity curves. In technology prior to this technology, the common voltage was kept at constant during drive. Otherwise, common inversion drive, in which the common voltage was changed between two voltage values at regular intervals when each of periods of t0 to t2 and t2 to t4 of FIG. 5 was regarded as a single frame period, was carried out. In the Japanese National Publication No. 2001-506376, the single frame period is divided in two, and a voltage having approximately the same amplitude as that of the conventional common inversion drive is applied during each of periods from t1 to t2 and from t3 to t4. On the other hand, a voltage higher than the amplitude of common inversion, that is, for example, a voltage higher than the amplitude of the common inversion by a voltage applied for black display is applied during each of periods from t0 to t1 and from t2 to t3 in the single frame period. According to this technology, since the high voltage is applied to the common electrode during the period from t0 to t1, difference in voltage between the pixel electrode and the common electrode becomes large. Thus, it is possible to rapidly change the whole display area into the black display. In other words, drive corresponding to the reset drive is carried out. Furthermore, if image data is written into the pixel electrode during the period from t0 to t1, the image data is not observed in the display area because the difference in voltage between the pixel electrode and the common electrode is sufficiently large (for example, more than black display voltage). After the image data is written into the whole display area, the voltage of the common electrode is returned to the amplitude of the common inversion at the timing of t1. As a result, a liquid crystal layer starts responding to change transmittance corresponding to each gray level, in accordance with the voltage stored in the pixel electrode. Namely, the difference in voltage changes from a large value to a value corresponding to each gray-level voltage whenever a response starts. In this respect, a kind of overdrive is carried out during the period from t0 to t1.

Note that the response time of liquid crystal is generally expressed by the following two equations (refer to page 24 of "Liquid Crystal Dictionary" Baifukan Co., Ltd, edited by Japan Society for the Promotion of Science, 142th Committee on Organic Materials Used in Information Science and Industry, Liquid Crystal Division.) Namely, the following equation 1 is satisfied at a rising response (ON response), in which a voltage higher than a threshold voltage is applied to turn on the liquid crystal.

$$\tau_{rise} = \frac{d^2 \cdot \tilde{\eta}}{\Delta\varepsilon \cdot (V^2 - V_c^2)} \quad \text{Equation 1}$$

The following equation 2 is satisfied at a falling response (OFF response), in which the applied voltage higher than the threshold voltage is abruptly lowered to zero.

$$\tau_{decay} = \frac{d^2 \cdot \tilde{\eta}}{\pi^2 \cdot \tilde{K}} \quad \text{Equation 2}$$

In the foregoing equations, "d" represents the thickness of a liquid crystal layer, "η" represents rotational viscosity, "Δ∈" represents dielectric anisotropy, "V" represents the applied voltage corresponding to each gray level, "Vc" represents the threshold voltage, and "K" represents a Frank elastic constant. The following equation 3 is satisfied in the TN mode.

$$\tilde{K} = K_{11} + \frac{1}{4}(K_{33} - 2 \cdot K_{22}) \quad \text{Equation 3}$$

In the foregoing equation, "$K_{11}$" represents a splay elastic constant, "$K_{22}$" represents a twist elastic constant, and "$K_{33}$" represents a bend elastic constant. As is apparent from the equation 1, the response time of the liquid crystal is in proportion to the reciprocal of the square of the applied voltage at the rising response (ON response). Namely, the response time of the liquid crystal is in proportion to the reciprocal of the square of the applied voltage, which differs on a gray level basis. Thus, the response time largely differs in accordance with the gray level, and when voltage differs 10 times the response time differs 100 times. On the other hand, difference in the response time due to the gray level exists even in the falling response (OFF response), but the difference remains to the extent of double.

Note that the technology disclosed in the "Liquid Crystal Dictionary" (Baifukan Co., Ltd, edited by Japan Society for the Promotion of Science, 142th Committee on Organic Materials Used in Information Science and Industry, Liquid Crystal Division). The speed of the liquid crystal is increased at the rising response (ON response) by the effect of overdrive. In the overdrive, an extremely high voltage is applied. All responses used for displaying an actual image are the falling responses (OFF responses), so that they hardly depend on the gray level. Therefore, it is possible to obtain approximately the same response time over all gray levels.

The foregoing liquid crystal display devices, that is, the display device by the overdrive, the display device by the reset drive, the display device disclosed in a document such as Japanese National Publication No. 2001-506376, however, have several problems.

A first problem is that the rising response speed of the liquid crystal can be increased in the overdrive method, but the response speed is confined from several tens milliseconds to a dozen or so milliseconds under the constraint of a material. As to the falling response speed, it cannot be much increased.

This is explained as follows. To improve the response speed of the liquid crystal element itself, as is apparent from the equations 1 and 2, the following contrivances are effective:

(1) Thinning the width "d" of the liquid crystal layer;
(2) Reducing the viscosity "η;"
(3) Increasing the dielectric anisotropy "Δ∈" (only in the rising response);
(4) Increasing the applied voltage (only in the rising response); and
(5) Of the elastic constants, decreasing "$K_{11}$" and "$K_{33}$" and increasing "$K_{22}$" (only in the falling response).

In regard to (1), however, the thickness of the liquid crystal layer is variable only within the confines of constant relation with refractive index anisotropy "Δn," in order to obtain a sufficient optical effect. Since all of the viscosity, dielectric anisotropy, and elastic constants of (2), (3), and (5) are physical values, they greatly depend on the material. Thus, it is difficult to increase/decrease the viscosity, dielectric anisotropy, and elastic constants to predetermined values or more/less. Furthermore, it is extremely difficult to largely change only each physical value itself, so that it is difficult to realize the effect of speedup assumed by the equations. For example, "$K_{11}$," "$K_{22}$," and "$K_{33}$" are the independent elastic constants, but a relation of $K_{11}:K_{22}:K_{33}=10:5:14$ approximately holes according to the measurement result of the actual material. Thus, "$K_{11}$," "$K_{22}$," and "$K_{33}$" cannot be always treated as the independent constants. According to this relation and the equation 3, for example, $K=11\cdot K_{22}=5$, and only "$K_{22}$" is independent. Therefore, improvement at a few tens percent or more is impossible, though slight adjustment is possible. A method of increasing the applied voltage value according to (4), on the other hand, receives severe constraint from the viewpoints of electric power consumption and the high cost of a high voltage driving circuit. At the same time, when the active element such as a thin-film transistor is provided in the display device and driven, the withstand voltage of the element adds constraints to the display device. As described above, there are severe limitations in speeding up the response speed by the conventional contrivances such as the overdrive.

A second problem is that the overdrive method can speed up the rising response (ON response), but hardly speed up the falling response (OFF response). This is because, as is apparent from the equations 1 and 2, the response time varies dependently on potential difference in the ON response, but the response time does not depend on the potential difference in the OFF response. As a result, in the conventional overdrive method, the OFF response dominantly determines the response speed of the whole system.

A third problem is that the voltage necessary for the overdrive is high in the conventional overdrive method. An image signal was a high frequency signal in the display device. In the overdrive method in which the voltage of the image signal was increased, increase in electric power consumption was significant. Since it was necessary to generate a signal with high frequency and high voltage, a drive IC and a signal processing system identical to conventional ones could not be used. Thus, an IC using specific process or an expensive IC had to be used.

A fourth problem is that in the reset method, a method for applying a reset signal through the pixel switch complicates the structure of a drive system and increases electric power consumption. Namely, it becomes necessary to drive scan lines differently from a scan for writing the image signal in terms of a scan period and a scan method. When the pixel switch is reset, a method for collectively resetting all the scan lines is often used instead of a successive scan. Therefore, structure for collectively sending a signal to the whole screen is necessary in the scan system. Driving the scan lines not only in writing the image signal but also in writing the reset signal causes increase in the frequency of a signal for a scan line, the voltage amplitude of which is the highest in the display device. Thus, the electric power consumption is increased. From these points of view, it is desirable that the reset not be carried out through the pixel switch.

A fifth problem is that a display state significantly changes in accordance with the redundancy or lack of reset in the reset method. This problem also goes for the method disclosed in the Japanese National Publication No. 2001-506376, which is the combination of the overdrive method and the reset method, in common.

First, the redundancy of the reset delays the start of an optical response of the liquid crystal after the reset, or causes an abnormal optical response before starting a normal optical response. This is because a direction, to which the liquid crystal should operate at the response, is not clear at a point in time when the liquid crystal shifts from a predetermined alignment state realized by the reset to the normal response. Therefore, the liquid crystal responds unevenly and unstably. FIG. 6 shows an example of the abnormal optical response. As shown in FIG. 6, the redundancy of the reset causes delay and display abnormality.

The lack of the reset, on the other hand, may cause a situation that the same transmittance cannot be obtained even if the same data is written for a plurality of times in the reset method. When the reset is insufficient, the liquid crystal does not completely become the predetermined alignment state at the reset. Thus, transmittance in accordance with a history of previous frames is shown at a response after the reset. As a result, the one-to-one correspondence between the applied voltage and the transmittance does not hold. Therefore, a desired gray level may not be obtained, or the luminance may be largely different even if the same gray level is displayed.

A sixth problem is that it is difficult to obtain stable display over a wide temperature range. This is because the response speed of the liquid crystal largely depends on temperature. Especially in the reset method and the method disclosed in the Japanese National Publication No. 2001-506376, the foregoing redundancy and lack of the reset significantly occur when the temperature changes. As a result, for example, the luminance significantly decreases at low temperatures. At high temperatures, on the other hand, the response speed between gray levels is increased, and the luminance increases on the whole. Therefore, display gets near the white display, and hence phenomena in which, for example, the whole display becomes whitish.

SUMMARY OF THE INVENTION

An object of the present invention is to provide a liquid crystal display device which can increase display performance, response speed, temperature dependence, and reliability, and to provide a method and a circuit for driving the liquid crystal display device.

To be more specific, an object of the present invention is to provide a liquid crystal display device which can respond at high speed, have high light-use efficiency, and operate with low electric power consumption, and to provide a method and a circuit for driving the liquid crystal display device. In the liquid crystal display device, the method, and the circuit for driving the device, an image can be stabilized within a single frame and is not degraded by the effect of a history. When displaying a moving image, the moving image is clearly displayed without blurring.

Another specific object of the present invention is to provide a liquid crystal display device which can eliminate the unevenness and instability of a liquid crystal response due to reset drive or the like, and display images that is hardly changed even if environmental temperatures change, so that favorable display with high reliability is possible, and to provide a method and a circuit for driving the liquid crystal display device. The liquid crystal display device, the method, and the circuit for driving the device can reduce cost without increasing performance requirement of a drive IC and a signal processing circuit.

Further another specific object of the present invention is to provide a high speed liquid crystal display device which can write data at a frequency (for example, 70 Hz, 80 Hz, or 200 Hz) faster than a conventional frame frequency (for example, 60 Hz), or a frequency (for example, 120 Hz, 180 Hz, or 360 Hz) which is an integral multiple of the conventional frame frequency.

Further another specific object of the present invention is to provide a liquid crystal display device which can carry out field sequential color display. In the field sequential color display, a display image is divided into several color images to successively display the several color images with time. Light sources, the colors of which are the same as those of the images, are turned on in synchronization with the images. An object of the present invention is especially to provide a liquid crystal display device which can carry out field sequential drive in a TN-type liquid crystal display mode. Furthermore, an object of the present invention is to provide a transmissive liquid crystal display device which can carry out the field sequential drive in the TN-type liquid crystal display mode. An object of the present invention is, furthermore, to provide a liquid crystal display device which can carry out the field sequential drive in various liquid crystal display modes except for the TN-type one, and to provide such a liquid crystal display device with high light-use efficiency.

A liquid crystal display device according to a first aspect of the present invention comprises: a liquid crystal display section, an image signal drive circuit, a scan signal drive circuit, a synchronous circuit, and a common electrode potential control circuit. The liquid crystal display section has scan electrodes, image signal electrodes, a plurality of pixel electrodes arranged in a matrix, a plurality of switching elements for transmitting an image signal to the pixel electrodes, and a common electrode. The common electrode potential control circuit changes an electric potential of the common electrode into a pulse shape, after the scan signal drive circuit has scanned all the scan electrodes and the image signal has been transmitted to the pixel electrodes.

A liquid crystal display device according to a second aspect of the present invention comprises a liquid crystal display section, an image signal drive circuit, a scan signal drive circuit, a synchronous circuit, and a storage capacitor electrode potential control circuit. The liquid crystal display section has scan electrodes, image signal electrodes, a plurality of pixel electrodes arranged in a matrix, a plurality of switching elements for transmitting an image signal to the pixel electrodes, and a storage capacitor electrode. The storage capacitor electrode potential control circuit changes an electric potential of the storage capacitor electrode into a pulse shape, after the scan signal drive circuit has scanned all the scan electrodes and the image signal has been transmitted to the pixel electrodes.

A liquid crystal display device according to a third aspect of the present invention comprises a liquid crystal display section, an image signal drive circuit, a scan signal drive circuit, a synchronous circuit, a common electrode potential control circuit, and a storage capacitor electrode potential control circuit. The liquid crystal display section has scan electrodes, image signal electrodes, a plurality of pixel electrodes arranged in a matrix, a plurality of switching elements for transmitting an image signal to the pixel electrodes, a common electrode, and a storage capacitor electrode. The common electrode potential control circuit changes an electric potential of the common electrode into a pulse shape, after the scan signal drive circuit has scanned all the scan electrodes and the image signal has been transmitted to the pixel electrodes. The storage capacitor electrode potential control circuit changes an electric potential of the storage capacitor electrode into a pulse shape, after the scan signal drive circuit has scanned all the scan electrodes and the image signal has been transmitted to the pixel electrodes.

A liquid crystal display device according to a fourth aspect of the present invention comprises a liquid crystal display section, an image signal drive circuit, a scan signal drive circuit, a synchronous circuit, and a common electrode potential control circuit. The liquid crystal display section has scan electrodes, image signal electrodes, a plurality of pixel electrodes arranged in a matrix, a plurality of switching elements for transmitting an image signal to the pixel electrodes, and a plurality of common electrodes electrically separated from one another. After the scan signal drive circuit has scanned part of the scan electrodes and the image signal has been transmitted to the pixel electrodes, the common electrode potential control circuit changes an electric potential of the common electrode corresponding to the scan electrodes into a pulse shape.

A liquid crystal display device according to a fifth aspect of the present invention comprises a liquid crystal display section, an image signal drive circuit, a scan signal drive circuit, a synchronous circuit, and a storage capacitor electrode potential control circuit. The liquid crystal display section has scan electrodes, image signal electrodes, a plurality of pixel electrodes arranged in a matrix, a plurality of switching elements for transmitting an image signal to the pixel electrodes, and a plurality of storage capacitor electrodes electrically separated from one another. After the scan signal drive circuit has scanned part of the scan electrodes and the image signal has been transmitted to the pixel electrodes, the storage capacitor electrode potential control circuit changes an electric potential of the storage capacitor electrode corresponding to the scan electrodes into a pulse shape.

A liquid crystal display device according to a sixth aspect of the present invention comprises a liquid crystal display section, an image signal drive circuit, a scan signal drive circuit, a synchronous circuit, a common electrode potential control circuit, and a storage capacitor electrode potential control circuit. The liquid crystal display section has scan electrodes, image signal electrodes, a plurality of pixel electrodes arranged in a matrix, a plurality of switching elements for transmitting an image signal to the pixel electrodes, a plurality of common electrodes electrically separated from one another, and a plurality of storage capacitor electrodes electrically separated from one another. After the scan signal drive circuit has scanned part of the scan electrodes and the image signal has been transmitted to the pixel electrodes, the common electrode potential control circuit changes an electric potential of the common electrode corresponding to the scan electrodes into a pulse shape. After the scan signal drive circuit has scanned part of the scan electrodes and the image signal has been transmitted to the pixel electrodes, the storage capacitor electrode potential control circuit changes an electric potential of the storage capacitor electrode corresponding to the scan electrodes into a pulse shape.

A method for driving a liquid crystal display device according to the present invention is one for the liquid crystal display device wherein the polarity of the image signal is reversed at a predetermined timing, and of a plurality of electric potentials among which the electric potential of the common electrode changes, one or two electric potentials applied for longer time than the other electric potentials is/are almost equal to an electric potential middle of a maximum electric potential and a minimum electric potential of all electric potentials applied as the image signal, or the liquid crystal display device wherein the electric potential of the common electrode just before the scan signal drive circuit starts scanning a first scan electrode of the scan electrodes is equal to the electric potential of the common electrode just after the scan signal drive circuit has scanned all the scan electrodes and the image signal has been transmitted to the pixel electrode, and before the electric potential of the common electrode is changed into the pulse shape. The electric potential of the common electrode is composed of four electric potentials, a first electric potential is the electric potential of the common electrode while the scan signal drive circuit scans the scan electrodes to transmit the reversed image signal with one polarity, a second electric potential is an electric potential of a pulse height section while the electric potential of the common electrode is changed into the pulse shape following the first electric potential, a third electric potential is an electric potential after the completion of the pulse when the electric potential of the common electrode has been changed into the pulse shape following the second electric potential, and is the electric potential of the common electrode while the scan signal drive circuit scans the scan electrodes to transmit the reversed image signal with the other polarity, and a fourth electric potential is an electric potential of a pulse height section while the electric potential of the common electrode is changed into the pulse shape following the third electric potential.

Another method for driving a liquid crystal display device according to the present invention is one for the liquid crystal display device wherein the polarity of the image signal is reversed at a predetermined timing, and of a plurality of electric potentials among which the electric potential of the common electrode changes, one or two electric potentials applied for longer time than the other electric potentials is/are almost equal to one of a maximum electric potential and a minimum electric potential of all electric potentials applied as the image signal, or the liquid crystal display device wherein the electric potential of the common electrode just before the scan signal drive circuit starts scanning a first scan electrode of the scan electrodes is different from the electric potential of the common electrode just after the scan signal drive circuit has scanned all the scan electrodes and the image signal has been transmitted to the pixel electrode, and before the electric potential of the common electrode is changed into the pulse shape, or the liquid crystal display device wherein the electric potential of the common electrode just before the scan signal drive circuit starts scanning the first scan electrode of the scan electrodes is almost equal to one of a maximum electric potential and a minimum electric potential applied as an image signal to be applied after that, and the electric potential of the common electrode just after the scan signal drive circuit has scanned all the scan electrodes and the image signal has been transmitted to the pixel electrode and before being changed into the pulse shape is almost equal to the other of the maximum electric potential and the minimum electric potential having applied as the image signal. The electric potential of the common electrode is composed of six potentials, a first electric potential is the electric potential of the common electrode while the scan signal drive circuit scans the scan electrodes to transmit a reversed image signal with one polarity, a second electric potential is an electric potential of a pulse height section while the electric potential of the common electrode is changed into the pulse shape following the first electric potential, a third electric potential is an electric potential after the completion of the pulse when the electric potential of the common electrode has been changed into the pulse shape following the second electric potential, a fourth electric potential is the electric potential of the common electrode while the scan signal drive circuit scans the scan electrodes to transmit the reversed image signal with the other polarity, a fifth electric potential is an electric potential of a pulse height section while the electric potential of the common electrode is changed into the pulse shape following the fourth electric potential, and a sixth electric potential is an electric potential after the completion of the pulse when the electric potential of the common electrode has been changed into the pulse shape following the fifth electric potential.

A near-eye device according to the present invention uses the liquid crystal display device as described above.

A projection device for projecting an original image of a display device by a projection optical system according to the present invention uses the liquid crystal display device as described above.

A mobile terminal according to the present invention uses the liquid crystal display device as described above.

A monitor device according to the present invention uses the liquid crystal display device as described above.

A display device for a vehicle according to the present invention uses the liquid crystal display device as described above.

A first effect of the present invention is to be able to accelerate the response speed of a display material. This is because speedup corresponding to two steps of overdrive is carried out in rising. The two steps of overdrive means the overdrive of the image signal, and the pulse-shaped change in the common electrode or the storage capacitor electrode after writing the image signal. Furthermore, delay does not occur, because electric potential exists and varies in the range of not resetting the display material in such steps. Also, this is because the liquid crystal is quickly changed into the no-voltage-application state by increasing torque in falling. This effect is obtained by the control of a twist pitch, polymeric stabilization, the control of an electric field, the control of interface alignment, and the like. Namely, in the present invention, it is possible to accelerate the response speed in all stages including rising, falling, and halftone responses.

A second effect of the present invention is to be able to obtain high reliability, which makes favorable display possible, even if the ambient temperature changes. This is because the response speed of the liquid crystal is increased, and an unstable alignment state such as a bounce does not occur. Especially, this is because a potential variation without reset is applied.

A third effect of the present invention is to be able to obtain a liquid crystal display device with high light-use efficiency and low electric power consumption. This is because, first, the liquid crystal rapidly reaches stable transmittance due to the speedup of the liquid crystal response. Second, a voltage necessary for overdriving the image signal at a high frequency is low due to the two steps of overdrive, so that electric power consumption is reduced as compared with a conventional overdrive method.

A fourth effect of the present invention is to be able to obtain a liquid crystal display device which can stabilize an image within one frame, and does not degrade the image (variations in gray level and flicker) by the effect of a history. This is because delay in a response such as a bounce and delay does not occur. Also, an image signal for realizing a desired display state is generated by a comparison calculator and a lookup table.

A fifth effect of the present invention is to be able to provide a liquid crystal display device which does not bring blurriness in a moving image. This is because a combination of field sequential drive and drive according to the present invention can provide favorable display.

A sixth effect of the present invention is to be able to realize an overdrive type of display device with simple system structure at low cost. This is because it is not necessary to compare all color data of a previous screen with all color data of the next screen by applying a field sequential method. It is enough to compare specific color (or one color synthesized from a plurality of colors) data of the previous screen with specific color (or one color synthesized from a plurality of colors) data of the next screen. As a result, necessary memory size is reduced, and the size of comparison calculation means and the LUT used at a time is reduced.

Another reason is that the display device carries out drive corresponding to the two steps of overdrive. Thus, the voltage for the overdrive with respect to the image signal is lower than that in the conventional overdrive method. The image signal has a high frequency among signals used in the display device. In the conventional overdrive method, since the voltage of the image signal at the high frequency is increased, a conventional drive IC cannot be used. Therefore, it is necessary to use an expensive drive IC using specific process or the like. Also, special specifications are required of an IC for generating an image signal too. In the method according to the present invention, since a voltage for the overdrive is lower than that for the conventional overdrive, it is unnecessary to use such a specific IC. Therefore, it is possible to prevent increase in cost.

A seventh effect of the present invention is to be able to obtain a stereoscopic display device with high realism. This is because color reproducibility is high due to the use of LEDs and the like. Another reason is that a stereoscopic image can be displayed without spatial division, and color display is possible without the spatial division. As a result, it is possible to easily realize the display device with much more number of pixels than conventional one, and hence it is possible to improve the realism.

DETAILED DESCRIPTION OF THE PREFERRED EMBODIMENT

Figure 7:
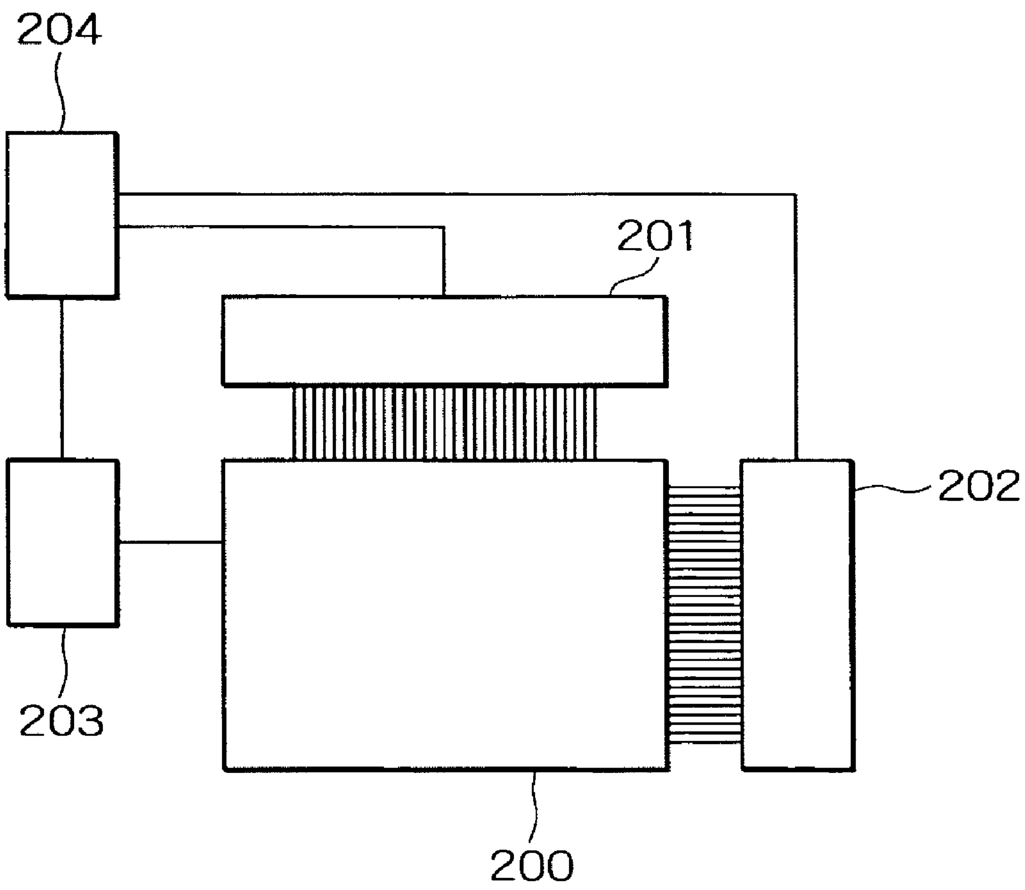
FIG. 7 is a block diagram showing the structure of a first embodiment of the present invention.
Figure 8:
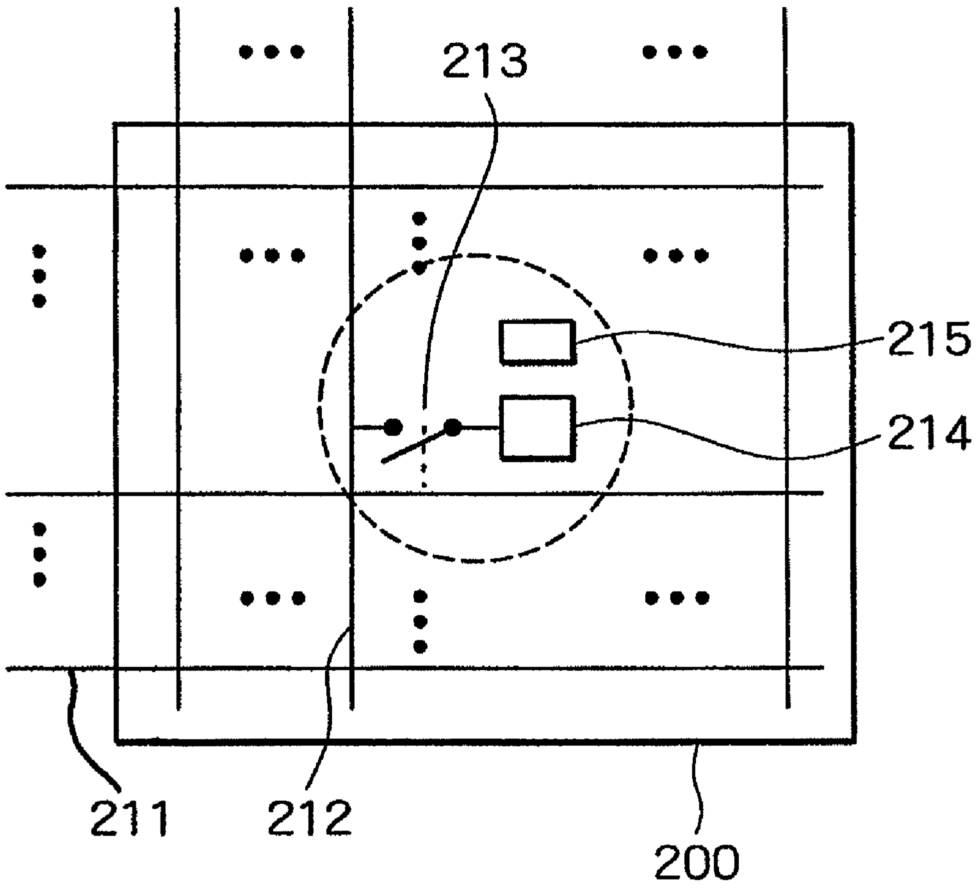
FIG. 8 is a diagram showing an example of the structure of a display section according to the present invention.

A display device according to the present invention, as shown in FIGS. 7 and 8, has a common electrode potential control circuit 203 and a synchronous circuit 204. The common electrode potential control circuit 203 changes the electric potential of a common electrode 215 into a pulse shape, after a scan signal drive circuit 202 has scanned all scan electrodes 212 and an image signal has been transmitted to pixel electrodes 214.

Figure 9:
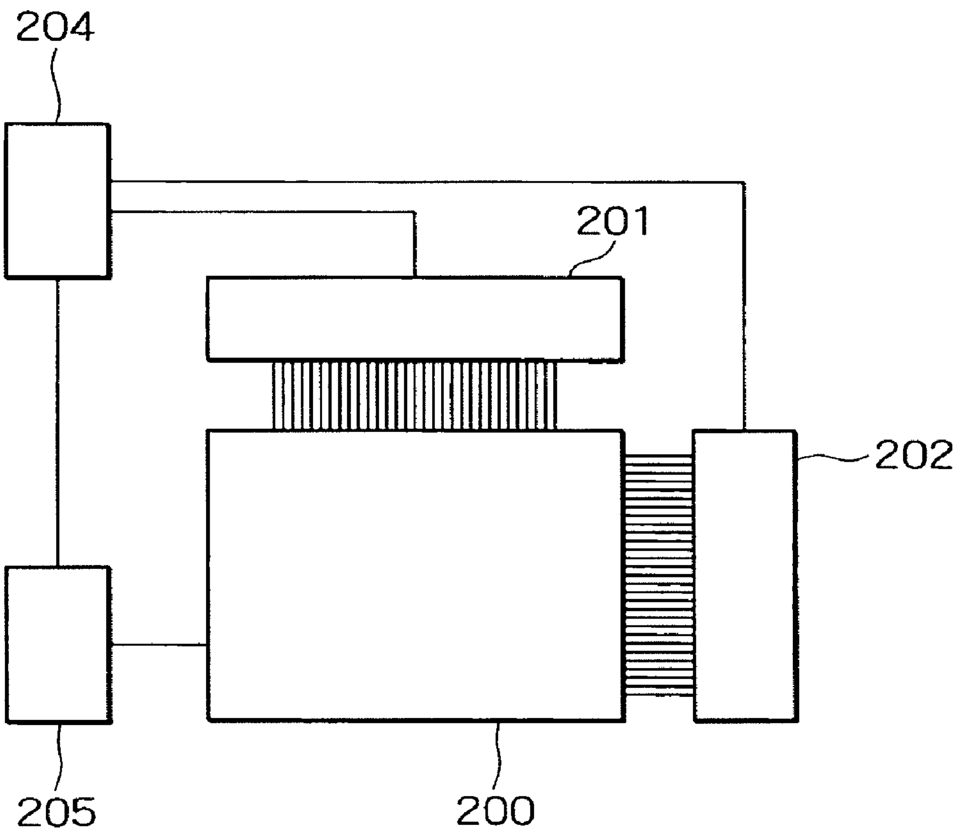
FIG. 9 is a block diagram showing the structure of a second embodiment of the present invention.
Figure 10:
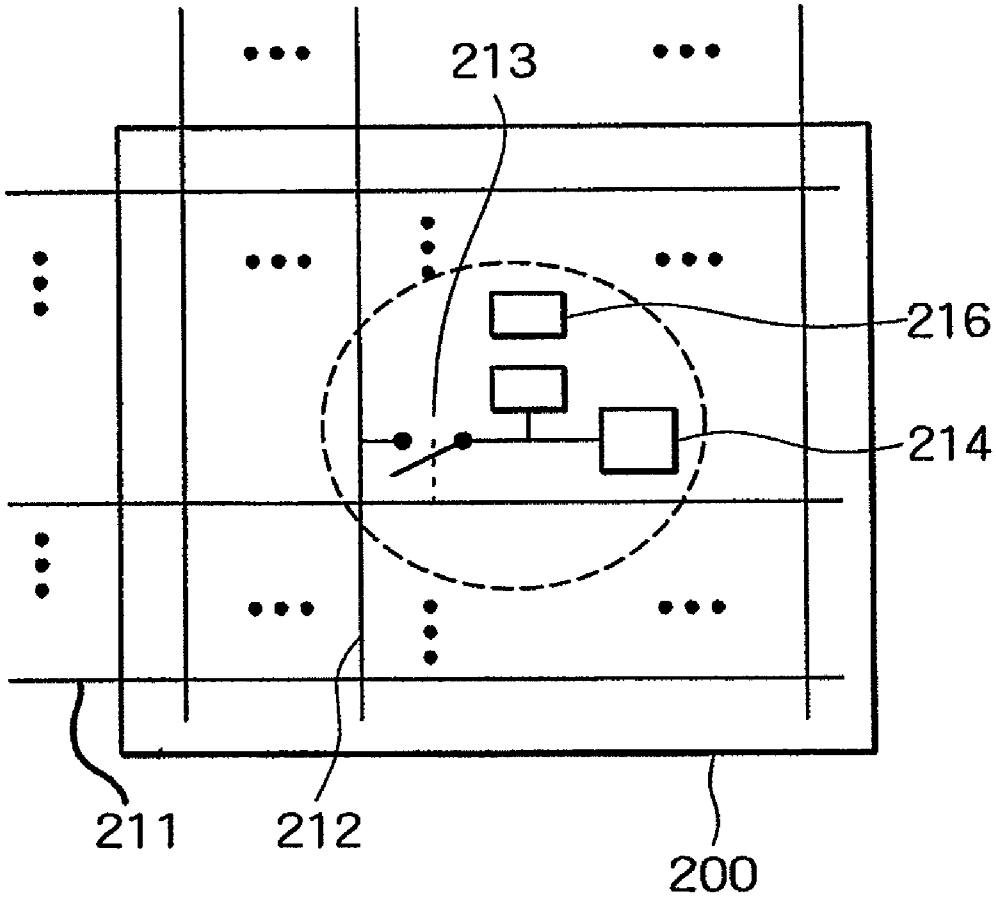
FIG. 10 is a diagram showing another example of the structure of the display section according to the present invention.

Otherwise, a display device according to the present invention, as shown in FIGS. 9 and 10, comprises a storage capacitor electrode potential control circuit 205 and a synchronous circuit 204. The storage capacitor electrode potential control circuit 205 changes the electric potential of a storage capacitor electrode 216 into a pulse shape, after a scan signal drive circuit 202 has scanned all scan electrodes 212 and an image signal has been transmitted to pixel electrodes 214.

Figure 11:
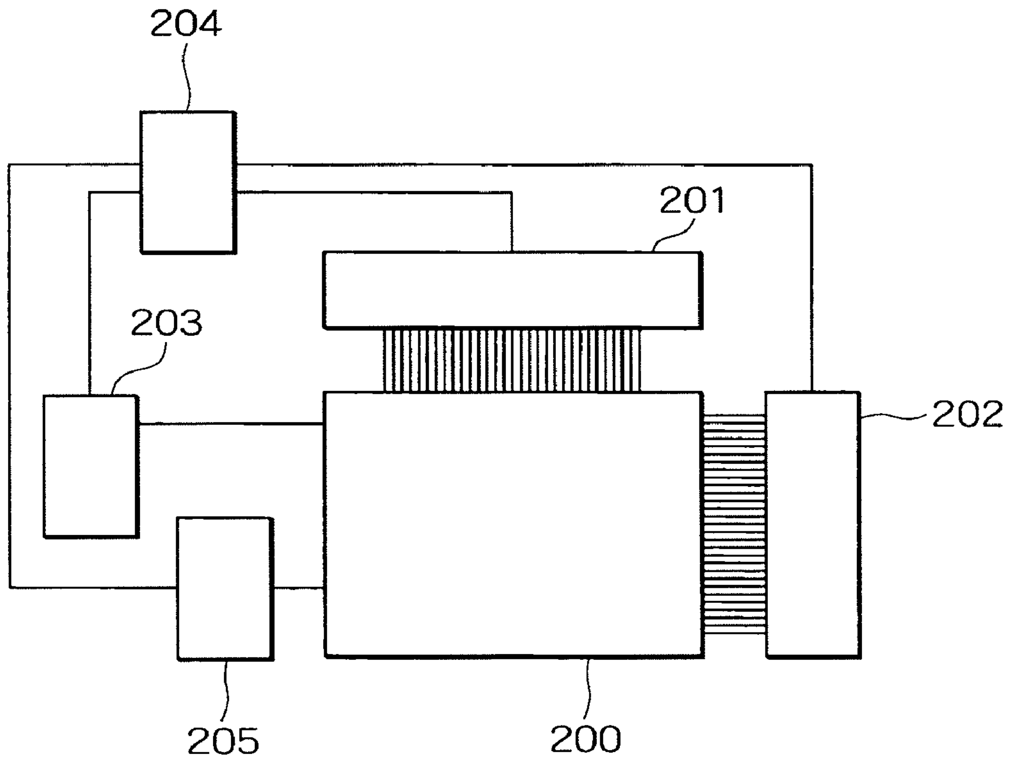
FIG. 11 is a block diagram showing the structure of a third embodiment of the present invention.
Figure 12:
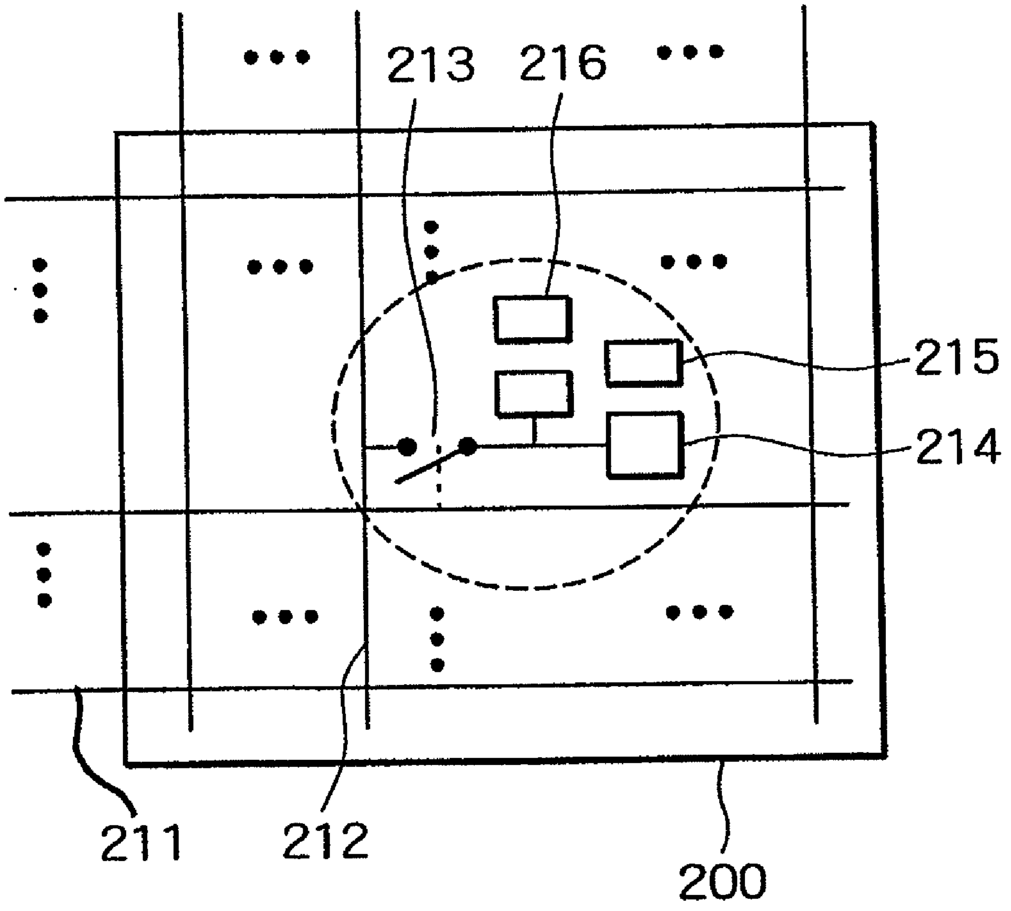
FIG. 12 is a diagram showing further another example of the structure of the display section according to the present invention.

Further otherwise, a display device according to the present invention, as shown in FIGS. 11 and 12, comprises a common electrode potential control circuit 203, a storage capacitor electrode potential control circuit 205, and a synchronous circuit 204. The common electrode potential control circuit 203 changes the electric potential of a common electrode 215 into a pulse shape, after a scan signal drive circuit 202 has scanned all scan electrodes 212 and an image signal has been transmitted to pixel electrodes 214. The storage capacitor electrode potential control circuit 205 changes the electric potential of a storage capacitor electrode 216 into a pulse shape, after the scan signal drive circuit 202 has scanned all the scan electrodes 212 and the image signal has been transmitted to the pixel electrodes 214.

A display device according to the present invention, as shown in FIGS. 7 and 8, comprises a common electrode potential control circuit 203, a synchronous circuit 204, and a plurality of common electrodes 215 which are electrically separated from one another. After a scan signal drive circuit 202 has scanned part of scan electrodes 212 and an image signal has been transmitted to pixel electrodes 214, the common electrode potential control circuit 203 changes the electric potential of the common electrodes 215 corresponding to the scan electrodes 212 into a pulse shape.

A display device according to the present invention, as shown in FIGS. 9 and 10, comprises a storage capacitor electrode potential control circuit 205, a synchronous circuit 204, and a plurality of storage capacitor electrodes 216 which are electrically separated from one another. After a scan signal drive circuit 202 has scanned part of scan electrodes 212 and an image signal has been transmitted to pixel electrodes 214, the storage capacitor electrode potential control circuit 205 changes the electric potential of the storage capacitor electrodes 216 corresponding to the scan electrodes 212 into a pulse shape.

Furthermore, a display device according to the present invention, as shown in FIGS. 11 and 12, comprises a common electrode potential control circuit 203, a storage capacitor electrode potential control circuit 205, a synchronous circuit 204, a plurality of common electrodes 215 electrically separated from one another, and a plurality of storage capacitor electrodes 216 electrically separated from one another. After a scan signal drive circuit 202 has scanned part of scan electrodes 212 and an image signal has been transmitted to pixel electrodes 214, the common electrode potential control circuit 203 changes the electric potential of the common electrodes 215 corresponding to the scan electrodes 212 into a pulse shape. After the scan signal drive circuit 202 has scanned part of the scan electrodes 212 and the image signal has been transmitted to the pixel electrodes 214, the storage capacitor electrode potential control circuit 205 changes the electric potential of the storage capacitor electrodes 216 corresponding to the scan electrodes 212 into a pulse shape.

In the foregoing display devices according to the present invention, the electric potential of the common electrode 215 changed into the pulse shape, and the electric potential of the storage capacitor electrode 216 changed into the pulse shape do not reset the display of a display section 200.

In the foregoing display devices according to the present invention, the electric potential of the common electrode 215 changes among at least three potentials, and more preferably, among four or more potentials. The electric potential of the storage capacitor electrode 216 changes among at least three potentials, and more preferably, among four or more potentials.

In the foregoing display devices according to the present invention, the electric potential of the common electrode 215 is changed into the pulse shape in the direction of temporarily increasing the potential difference between the pixel electrode 214 and the common electrode 215. The electric potential of the storage capacitor electrode 216 is changed into the pulse shape in the direction of temporarily increasing the potential difference between the pixel electrode 214 and the storage capacitor electrode 216.

In the foregoing display devices according to the present invention, the electric potential of the image signal differs from the electric potential of an image signal in a stable display state in static driving, in consideration of the response performance of the display section 200 in electric charge hold driving.

Furthermore, in the foregoing display devices according to the present invention, the electric potential of the image signal is determined by comparing hold data of each pixel before writing the image signal with display data to be newly displayed.

In the foregoing display devices according to the present invention, an electric field response material is sandwiched between the pixel electrode 214 and the common electrode 215 in the display section 200. The electric field response material comprises a liquid crystal material.

In the display device according to the present invention, the liquid crystal material is nematic liquid crystal in twisted nematic alignment.

Furthermore, a relation of $p/d<20$ holds between a twist pitch p (micron) of the nematic liquid crystal and an average thickness d (micron) of a nematic liquid crystal layer. More preferably, a relation of $p/d<8$ holds between the twist pitch p (micron) of the twisted nematic liquid crystal and the average thickness d (micron) of the twisted nematic liquid crystal material layer.

In the liquid crystal display device according to the present invention, the twisted nematic liquid crystal material is polymerically stabilized to have an almost continuously twisted structure.

In the liquid crystal display device according to the present invention, the liquid crystal material is used in a voltage control birefringence mode.

In the liquid crystal display device according to the present invention, the liquid crystal material is in pi-alignment (bend alignment). It is preferred that an optical compensation film be provided to the liquid crystal display device, and the liquid crystal display device is used in an OCB (optical compensated birefringence) mode.

In the liquid crystal display device according to the present invention, the liquid crystal material is used in a VA (vertical alignment) mode in which the liquid crystal material is aligned in homeotropic manner. It is preferable that a viewing angle be widened by using multi-domain or the like.

In the liquid crystal display according to the present invention, the liquid crystal material is used in an IPS (in-plane switching) mode. In the IPS mode, the liquid crystal material responds to an electric field in parallel with the surface of a substrate.

Furthermore, in the liquid crystal device according to the present invention, the liquid crystal material is used in an FFS (fringe field switching) mode or an AFFS (advanced fringe field switching) mode.

In the display device according to the present invention, the liquid crystal material is a ferroelectric liquid crystal material, an anti-ferroelectric liquid crystal material, or a liquid crystal material showing an electroclinic response.

In the display device according to the present invention, the liquid crystal material is a cholesteric liquid crystal material.

In the display device according to the present invention, the alignment of the foregoing liquid crystal materials is polymerically stabilized in structure of a no-voltage-application state or a low-voltage-application state.

The display device according to the present invention performs stereoscopic display by use of a lenticular lens sheet or a dual prism sheet. Preferably, a scan backlight is formed by alternately applying light into a backlight with time from two directions. An image signal is switched with time between an image signal for a right eye and an image signal for a left eye at double or more the normal frequency in synchronization with the scan backlight, to carry out the stereoscopic display.

In the display device according to the present invention, an image signal is divided into a plurality of color image signals corresponding to a plurality of colors. While the plurality of image signals are successively displayed with time, a light source corresponding to the plurality of colors emits light in synchronization with the plurality of image signals with a predetermined phase difference.

Furthermore, in the display device according to the present invention, an image signal includes an image signal for a right eye and an image signal for a left eye. The image signal for each eye is divided into a plurality of color image signals corresponding to a plurality of colors. Light sources corresponding to the plurality of colors are disposed in two positions. While the light sources are synchronized with the image signals for the respective eyes with a predetermined phase difference, the image signals for the respective eyes are successively displayed with time in synchronization with the plurality of color image signals. The image signals for each eye are successively displayed with time as the plurality of divided color image signals.

In the display device according to the present invention, a pixel switch is made of an amorphous silicon thin-film transistor, a poly-silicon thin-film transistor, a single crystal silicon thin-film transistor, or the like.

In the display device according to the present invention, the polarity of the image signal is reversed at a predetermined timing. Also, of a plurality of electric potentials among which the electric potential of the common electrode changes, one or two electric potentials applied for longer time than the other electric potentials, is/are almost equal to a potential middle of a maximum electric potential and a minimum electric potential of all electric potentials applied as the image signal.

Otherwise, in the display device according to the present invention, the polarity of the image signal is reversed at a predetermined timing. Also, of a plurality of electric potentials among which the electric potential of the common electrode changes, the one or two electric potentials applied for longer time than the other electric potentials are almost equal to one of the maximum electric potential and the minimum electric potential of all electric potentials applied as the image signal.

Furthermore, in the display device according to the present invention, the electric potential of the common electrode just before the scan signal drive circuit 202 starts scanning the first scan electrode of the scan electrodes 212 is equal to the electric potential of the common electrode just after the scan signal drive circuit 202 has scanned all the scan electrodes 212 and the image signal has been transmitted to the pixel electrodes 214 and before being changed into the pulse shape.

Furthermore, in the display device according to the present invention, the electric potential of the common electrode just before the scan signal drive circuit 202 starts scanning the first scan electrode of the scan electrodes 212 is different from the electric potential of the common electrode just after the scan signal drive circuit 202 has scanned all the scan electrodes 212 and the image signal has been transmitted to the pixel electrodes 214 and before being changed into the pulse shape.

In a method for driving the display device according to the present invention, the electric potential of the common electrode includes four electric potentials. A first electric potential is applied while the scan signal drive circuit 202 scans the scan electrodes 212 to transmit a reversed image signal with one polarity. A second electric potential is an electric potential of a pulse height section when the electric potential of the common electrode 215 is changed into the pulse shape following the first electric potential. A third electric potential is an electric potential after the completion of a pulse when the electric potential of the common electrode 215 has been changed into the pulse shape following the second electric potential. The third electric potential is the electric potential of the common electrode while the scan signal drive circuit 202 scans the scan electrodes 212 to transmit the reversed image signal with the other polarity. A fourth electric potential is an electric potential of a pulse height section when the electric potential of the common electrode 215 is changed into the pulse shape following the third electric potential.

In another method for driving the display device according to the present invention, the electric potential of the common electrode includes six electric potentials. A first electric potential is the electric potential of the common electrode while the scan signal drive circuit 202 scans the scan electrodes 212 to transmit the reversed image signal with one polarity. A second electric potential is an electric potential of a pulse height section when the electric potential of the common electrode 215 is changed into the pulse shape following the first electric potential. A third electric potential is an electric potential after the completion of a pulse when the electric potential of the common electrode 215 has been changed into the pulse shape following the second electric potential. A fourth electric potential is the electric potential of the common electrode while the scan signal drive circuit 202 scans the scan electrodes 212 to transmit the reversed image signal with the other polarity. A fifth electric potential is an electric potential of a pulse height section when the electric potential of the common electrode 215 is changed into the pulse shape following the fourth electric potential. A sixth electric potential is an electric potential after the completion of a pulse when the electric potential of the common electrode 215 has been changed into the pulse shape following the fifth electric potential.

The display device according to the present invention has a light emitting section for emitting light to be incident on the display section. The display device also has a synchronous circuit for synchronously modulating the light intensity of the light emitting section with a predetermined phase to the image signal.

The display device according to the present invention has a light emitting section for emitting light to be incident on the display section. The display device also has a synchronous circuit for synchronously changing the color of light of the light emitting section with a predetermined phase to the image signal.

In the method for driving the display device according to the present invention, the timing of modulating the light intensity of the light emitting section or the timing of changing the color of light of the light emitting section is positioned at the end of each field or each subfield corresponding to the color when the field is divided into the subfields in accordance with a plurality of colors. The end of each field or each subfield corresponds to just before writing an image signal for the next field.

In the display device according to the present invention, the electric potential of the image signal is determined by performing comparison among hold data of each pixel before writing the image signal, a variation in the electric potential of the pixel electrode, and display data to be newly displayed. The electric potential of the pixel electrode varies in accordance with a variation in the electric potential of the common electrode 215 changed into the pulse shape, a variation in the electric potential of the storage capacitor electrode 216 changed into the pulse shape, or a variation in both the electric potentials of them.

The display device according to the present invention successively compares the data and the variation in the electric potential.

The display device according to the present invention successively compares the data and the variation in the electric potential by use of a LUT (lookup table, correspondence table) prepared in advance.

After the scan signal drive circuit has scanned all the scan electrodes and the image signal has been transmitted to the pixel electrodes, the electric potential of the common electrode, the electric potential of the storage capacitor electrode, or both of them is changed into the pulse shape. Thus, the potential difference between the pixel electrode and the common electrode after the transmission of the image signal differs in each of periods before the pulse-shaped change, a pulse height section during the pulse-shaped change, and after the completion of the pulse-shaped change. (There are cases where potential difference before the pulse-shaped change is the same as that after the completion of the pulse-shaped change.) Therefore, it is possible to adjust the change of a state of the display material and response speed in each period. Accordingly, it is possible to increase the response speed, or decrease the response speed as necessary. Especially, temporarily increasing the potential difference between the pixel electrode and the common electrode is significantly effective at increasing the response speed.

When the display device has the electrically separated common electrodes, the electrically separated storage capacitor electrodes, or both of them, it is possible to change the electric potential into the pulse shape only in a part of the display section. As a result, the electric potential of the common electrodes, the storage capacitor electrodes, or both of them in arbitrary-shaped areas in the display section can be changed into the pulse shape in arbitrary order, so that it is possible to vary a manner of a response area-to-area.

When the electric potential of the common electrodes, the storage capacitor electrodes, or both of them is changed into the pulse shape, the electric potential is set at a potential not resetting the display material, to bring about the following effect. Generally, the display material is aligned in a predetermined state by reset. Thus, when the display material is shifted from the predetermined state to another state, delay often occurs. Setting the electric potential at the potential not resetting the display material can prevent the occurrence of the delay. Therefore, it is possible to further increase the response speed.

There are two types of delay, which occur by shifting from the reset state. A first type of delay occurs because which direction the display material should respond is not immediately determined due to fluctuation of the display material itself and the like, when the display material shifts from the reset state to another state. According to this delay, an optical condition such as transmittance and reflectance of light stays at the almost same condition as the reset state, and time delay occurs before the optical condition starts changing. A second type of delay occurs because the display material temporarily responds to a direction except for a target direction, for example, an opposite direction, when the display material shifts from the reset state to another state. According to this delay, the optical condition such as the transmittance and reflectance of light differs from that of the reset state, but a state different from a desired control state occurs. Response from the different direction to the desired direction causes time delay, which is longer than the first type of delay. Typically, the first type of delay concurrently occurs in a system producing the second type of delay, so that delay time is further prolonged.

By setting the electric potential at the potential not resetting the display material, these two types of delay and the combination thereof are prevented. Therefore, it is possible to realize the originally expected response speed.

Furthermore, since the display material is not reset, there is no dependence of display on the redundancy or lack of the reset. Accordingly, it is possible to obtain stable display over a wide temperature range.

The common electrode potential or the storage capacitor electrode potential is changed into the pulse shape in the direction of temporarily increasing the electric potential difference between the pixel electrode and the common electrode or between the pixel electrode and the storage capacitor electrode. Therefore, it is possible to obtain an overdrive (feed forward) effect without operating the image signal. In the present invention, it is possible to simultaneously give the overdrive effect to all areas electrically connected, in contrast to conventional overdrive for operating the image signal.

Furthermore, if the image signal itself is overdriven, two steps of speedup become possible in addition to the foregoing effect. In this overdrive, the added voltage becomes relatively small, because it is not necessary to increase the speed by the overdrive itself in contrast to the conventional overdrive.

In the falling response, on the other hand, the response speed cannot be increased only by the foregoing method. Accordingly, in the twisted nematic liquid crystal, torque for returning to a twisted state is increased by making the twist pitch p satisfy $p/d<8$. In every liquid crystal display mode including twisted nematic, torque for returning to a polymerically stabilized no-voltage-application state is increased. Therefore, the response speed is increased in the falling response.

Figure 13A:
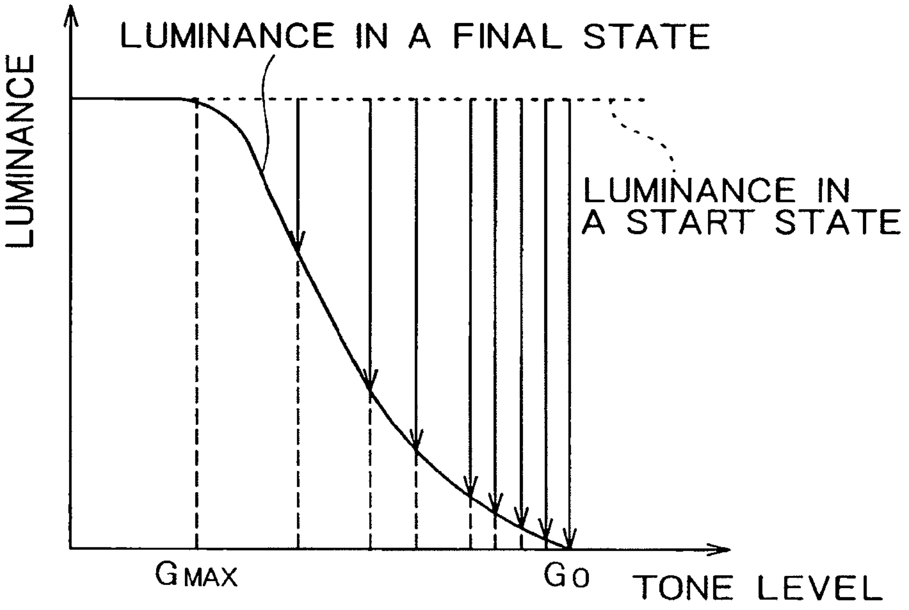
FIGS. 13*a* and 13*b* are schematic graphs which show a method for determining an ON response and an OFF response in twisted nematic liquid crystal of normally white display.
Figure 13B:
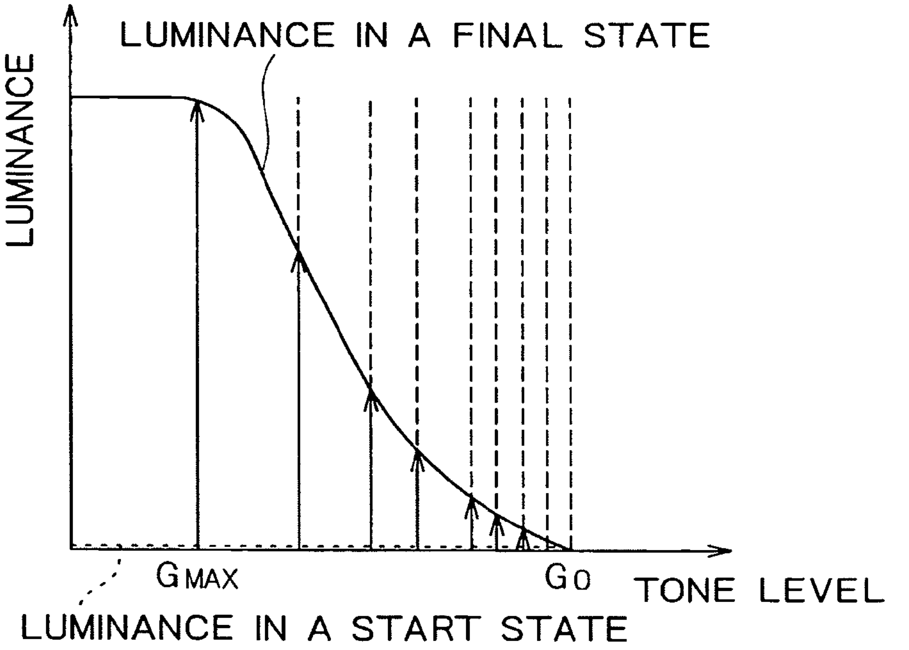

To compare the method for speedup according to the present invention with the conventional one, a difference in response time is compared on principle. The twisted nematic liquid crystal display device is used in this comparison. Two response times corresponding to the rising response (ON response) and the falling response (OFF response) according to the conventional technology are considered as the response time. FIGS. 13*a* and 13*b* are schematic graphs showing a method for determining the ON response and the OFF response in the twisted nematic liquid crystal of normally white display. In FIGS. 13*a* and 13*b*, a horizontal axis represents each gray level, and a vertical axis represents luminance. FIG. 13*a* shows the rising response, and FIG. 13*b* shows the falling response. Referring to FIG. 13*a*, the rising response or ON response is defined as response time in the case of shifting from a gray level with highest luminance to each gray level. Referring to FIG. 13*b*, the falling response or OFF response is defined as response time in the case of shifting from a gray level with lowest luminance to each gray level. In the twisted nematic liquid crystal except for the normally white display and another liquid crystal display mode, the rise and fall of the luminance may be opposite. With respect to four types of twisted nematic liquid crystal display device the driving method of which are different from one another, the ON response and OFF response of each display device are schematically shown in drawings. In the drawings, a horizontal axis represents each gray level, and a vertical axis represents response time. The drawings show the ON response and the OFF response of (1) a normally driven liquid crystal display device (FIG. 14), (2) an overdriven (feed forward driven) liquid crystal display (FIG. 15), (3) a liquid crystal display driven by a method of Japanese National Publication No. 2001-506376, that is, the combination of the overdrive and the reset schemes (FIG. 16), and (4) a liquid crystal display device according to the present invention (FIG. 17).

Figure 14:
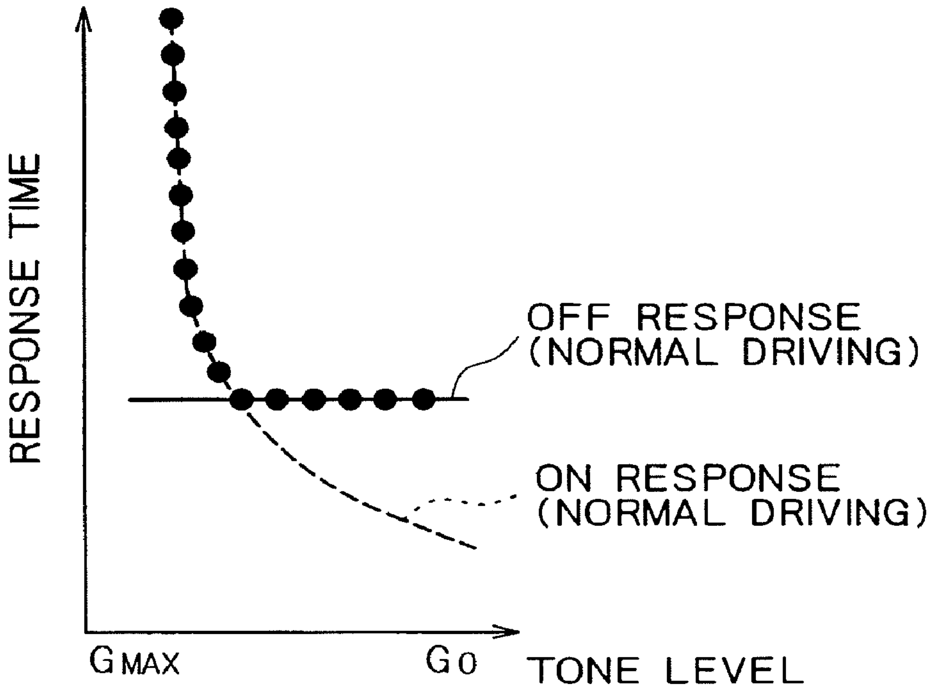
FIG. 14 is a conceptional graph which shows an example of response time in a liquid crystal display device using a normal driving method.

In normal drive shown in FIG. 14, the speed of the ON response (a broken line) is high in applying high voltage, but is extremely low in applying low voltage. This response almost follows the equation 1. The response time of the OFF response (a solid line) is the same over the almost whole voltage range (there is a variation in accordance with a voltage value in reality, but the variation remains within approximately twice at the maximum). As a result, a rate-determining step with respect to the response speed of this display device (a step of predominant determinant for determining the response speed. The rate-determining step refers to a later one of the ON response and the OFF response) has a shape illustrated by a dotted line in the drawing. The response time becomes slow in a low voltage area. In this drawing, a voltage of intersection of the ON response and the OFF response is the square root of 2 times as large as a threshold voltage Vtc in an ideal state following the equations 1 and 2. The voltage of intersection of the ON response and the OFF response is a little over 2 V when, for example, Vtc=1.5 V.

Figure 15:
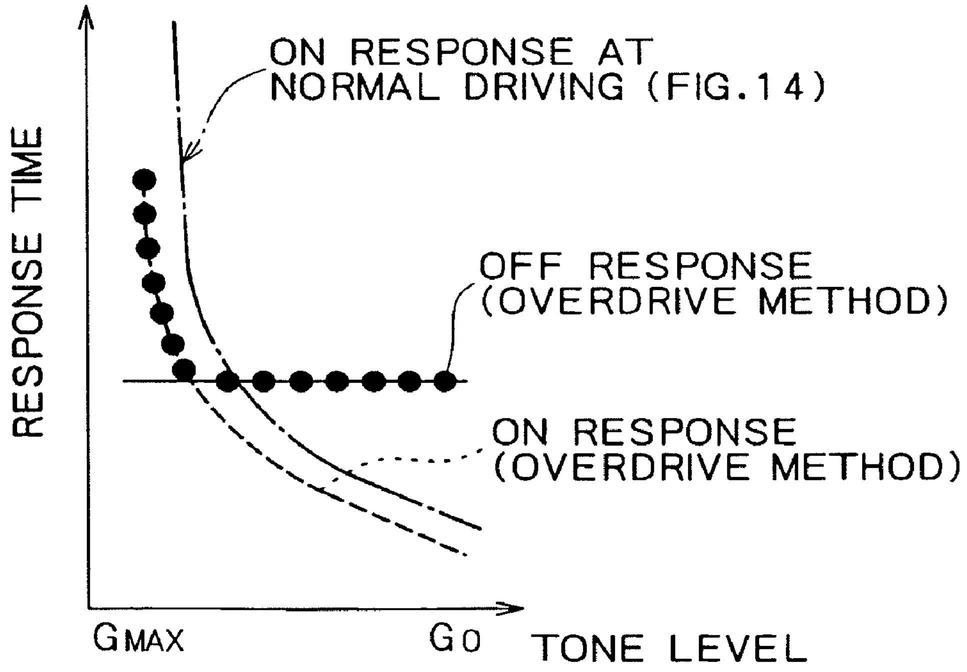
FIG. 15 is a conceptional graph which shows an example of response time in a liquid crystal display device using overdrive.

In the case of the overdrive shown in FIG. 15, the speed of the ON response (a broken line) is higher than that of the ON response in the normal drive of FIG. 14, which is indicated by alternate long and short dashed lines. The OFF response (a solid line), however, hardly changes, so that the rate-determining step is indicated by a dotted line. Namely, the response time is the same as that of the normal drive in higher voltages than the intersection of the ON response and the OFF response. The response time becomes faster than that of the normal drive in lower voltages than the intersection. As described above, effect in the high voltages is little. The response time, however, becomes slowest in the low voltages, so that a display state is quite improved by the overdrive. In the overdrive, however, if the applied voltage is too high, response delay, which is the same as a shift from the reset state as described above, occurs, and hence the OFF response especially becomes slow.

Figure 16:
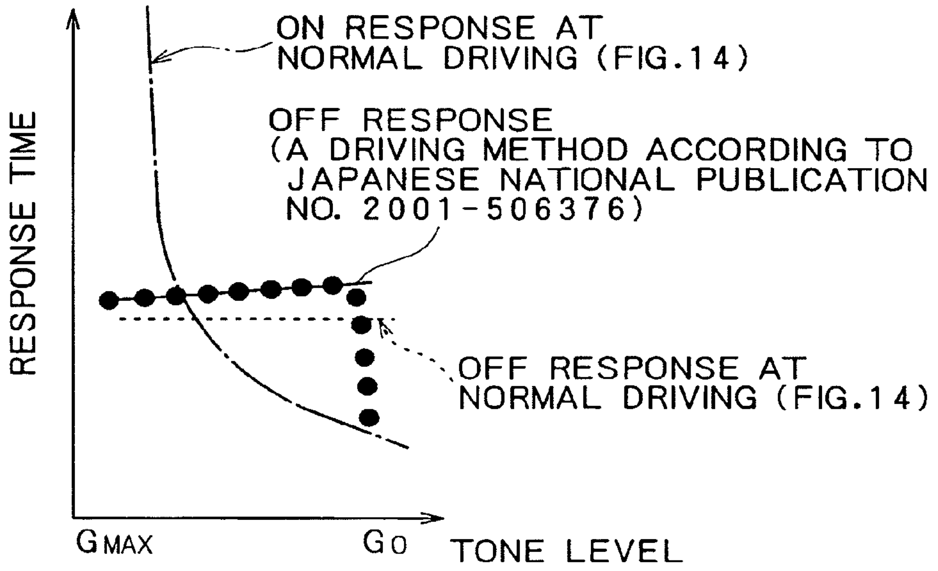
FIG. 16 is a conceptional graph which shows an example of response time in a liquid crystal display device using a method disclosed in Japanese National Publication No. 2001-506376, that is, a combination of the overdrive and reset.
Figure 17:
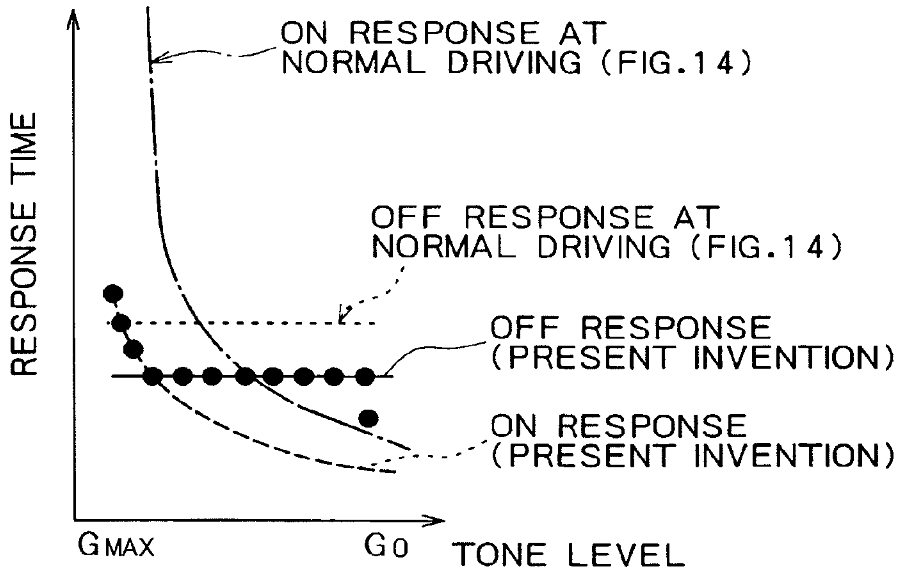
FIG. 17 is a conceptional graph which shows an example of response time in a liquid crystal display device according to the present invention.

In the method of Japanese National Publication No. 2001-506376 shown in FIG. 16, that is, in the combination of the overdrive and the reset, every kind of display once becomes a reset state, so that the ON response acts only at a point in time of the reset. In other words, the response time is determined almost only by the OFF response (a solid line), and the rate-determining step indicated by a dotted line is determined almost only by the OFF response. As compared with the OFF response of the normal drive indicated by a broken line in FIG. 16, the OFF response (a solid line) according to this method is slower than that of the normal drive because delay occurs with the shift from the foregoing reset state. However, there is no slow response in the low voltages, so that the slowest response time is much shorter than that of the normal drive, and is faster than that of the overdrive. The OFF response in the high voltages, on the other hand, is slower than that of the normal drive and the overdrive. The sum of the ON response and the OFF response, which is often used as the response time, becomes smaller than that of the normal drive and the overdrive because the ON response hardly contributes thereto.

The display device according to the present invention, as shown in FIG. 17, makes a change corresponding to the overdrive by two steps of the overdrive and the pulse-shaped change. Thus, the speed of the ON response (a broken line) becomes faster than that of the conventional overdrive (FIG. 15). Furthermore, since the no-voltage-application state is stabilized, torque for returning to the no-voltage-application state is strong, and the speed of the OFF response (a solid line) also becomes fast. Also, delay with the shift from the reset state, which occurs in FIG. 16, does not occur because voltage changes without reset. As a result of these, the present invention offers the fastest response speed among these four types. Only the ON response and the OFF response have been indicated above, but, as a matter of course, the response of halftone also becomes fast.

Next, embodiments of the present invention will be described in detail with reference to the attached drawings.

First, a first embodiment of the present invention will be described with reference to FIGS. 7 and 8. A liquid crystal display device according to this embodiment comprises a display section 200, an image signal drive circuit 201, a scan signal drive circuit 202, a common electrode potential control circuit 203, and a synchronous circuit 204. The display section 200 comprises scan electrodes 212, image signal electrodes 211, a plurality of pixel electrodes 214 arranged in a matrix, a plurality of switching elements 213 for transmitting an image signal to the pixel electrodes 214, and a common electrode 215. The common electrode potential control circuit 203 changes the electric potential of the common electrode 215 into a pulse shape, after the scan signal drive circuit 202 has scanned all the scan electrodes 212 and the image signal has been transmitted to the pixel electrodes 214.

Figure 18:
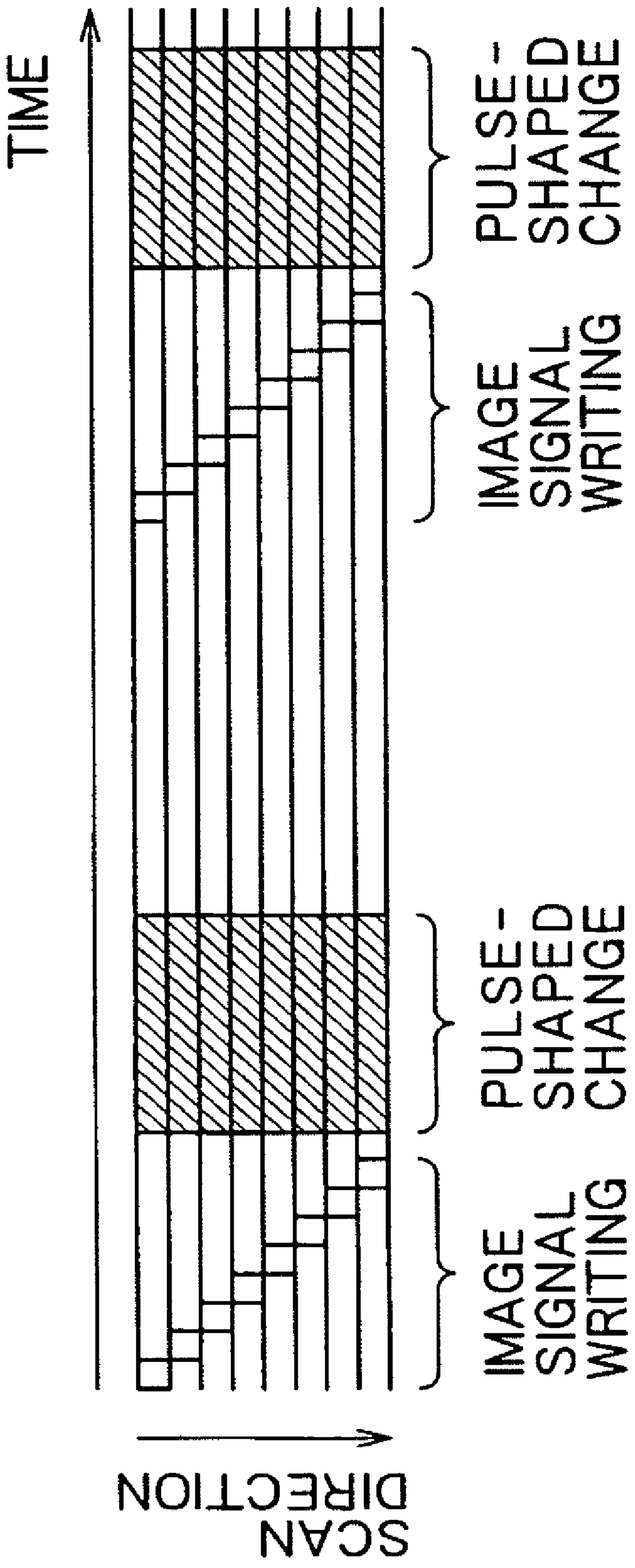
FIG. 18 is a diagram showing an example of timing according to the first embodiment of the present invention.
Figure 19:
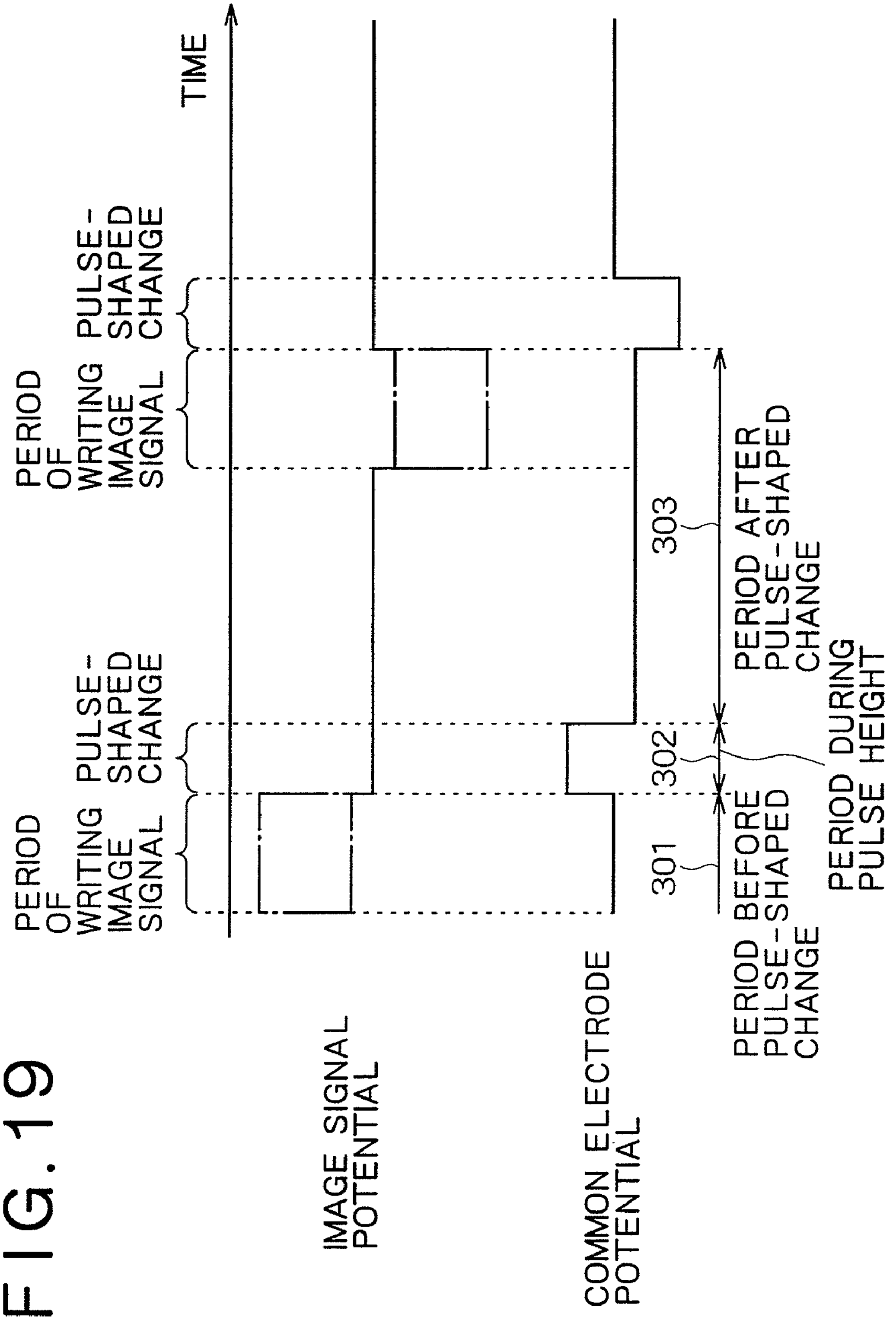
FIG. 19 is a diagram showing an example of waveforms according to the first embodiment of the present invention.

Then, the operation of the liquid crystal display device according to this embodiment structured as described above will be described with reference to FIGS. 18 and 19. FIG. 18 shows an example of timing of this embodiment. FIG. 19 shows an example of waveforms according to this embodiment. In this embodiment, after the image signal has been transmitted to the pixel electrodes 214, the electric potential of the common electrode 215 is changed into the pulse shape. By changing the common electrode potential into the pulse shape after the transmission of the image signal, the potential difference between the pixel electrode 214 and the common electrode 215 differs in each of a period before a pulse-shaped change 301, a period in a pulse height section during the pulse-shaped change 302, and a period after the completion of the pulse-shaped change 303. There are cases, however, where the potential difference is the same before the pulse-shaped change and after the completion of the pulse-shaped change. As a result, it is possible to adjust change in a state of a display material in each period, and response speed. Accordingly, it is possible to accelerate the response speed, and slow down the response speed as necessary. The effects of adjusting the response speed are adjusted by difference in potential values changed into the pulse shape (potential in the period before the pulse-shaped change 301, the period in the pulse height section during the pulse-shaped change 302, and the period after the completion of the pulse-shaped change 303), and a length of a period changed into the pulse shape.

The potential difference between the period before the pulse-shaped change 301 and the period after the completion of the pulse-shaped change 303 is so adjusted as to compensate the effect of potential variation of the pixel electrode by capacitive coupling in accordance with the pulse-shaped change. Also, the potential difference is adjusted in accordance with a display state desired to be realized after the completion of the pulse-shaped change or the like.

Next, a second embodiment of the present invention will be described with reference to FIGS. 9 and 10. A liquid crystal display device according to this embodiment comprises a display section 200, an image signal drive circuit 201, a scan signal drive circuit 202, a storage capacitor electrode potential control circuit 205, and a synchronous circuit 204. The display device 200 comprises scan signal electrodes 212, image signal electrodes 211, a plurality of pixel electrodes 214 arranged in a matrix, a plurality of switching elements 213 for transmitting an image signal to the pixel electrodes 214, and a storage capacitor electrode 216. The storage capacitor electrode potential control circuit 205 changes the electric potential of the storage capacitor electrode 216 into a pulse shape, after the scan signal drive circuit 202 has scanned all the scan electrodes 212 and the image signal has been transmitted to the pixel electrodes 214.

Then, the operation of this embodiment will be described. This embodiment has the same effects as the first embodiment by changing the storage capacitor electrode potential into the pulse shape after the image signal has been transmitted to the pixel electrodes 214. The adjustment effect according to this embodiment, however, is caused by the variation in pixel electrode potential by capacitive coupling. The adjustment effect is not caused by both of the variation in the common electrode potential and the variation in the pixel electrode potential by the capacitive coupling, as in the case of the first embodiment. In other words, this embodiment does not depend on direct means such as the common electrode potential, but does depend on indirect means such as the variation in the pixel electrode potential by the capacitive coupling.

Next, a third embodiment of the present invention will be described with reference to FIGS. 11 and 12. A liquid crystal display device according to this embodiment comprises a display section 200, an image signal drive circuit 201, a scan signal drive circuit 202, a common electrode potential control circuit 203, a storage capacitor electrode potential control circuit 205, and a synchronous circuit 204. The display device 200 comprises scan signal electrodes 212, image signal electrodes 211, a plurality of pixel electrodes 214 arranged in a matrix, a plurality of switching elements 213 for transmitting an image signal to the pixel electrodes 214, a common electrode 215 and a storage capacitor electrode 216. The common electrode potential control circuit 203 changes the electric potential of the common electrode 216 into a pulse shape, after the scan signal drive circuit 202 has scanned all the scan electrodes 212 and the image signal has been transmitted to the pixel electrodes 214. The storage capacitor electrode potential control circuit 205 changes the electric potential of the storage capacitor electrode 216 into a pulse shape, after the scan signal drive circuit 202 has scanned all the scan electrodes 212 and the image signal has been transmitted to the pixel electrodes 214.

Then, the operation of this embodiment will be described. In this embodiment, a display state, response speed, and the like are adjusted by changing the electric potential of both of the common electrode 215 and the storage capacitor electrode 216 into the pulse shape. Accordingly, the operation of this embodiment is a combination of the first and second embodiments.

In this embodiment, however, it is possible to expect a superior effect, which is not just the combination of the first and second embodiments. By, for example, making the polarities of the pulse-shaped changes of the common electrode 215 and the storage capacitor electrode 216 opposite to each other, it is possible to restrain a variation in the pixel electrode potential by capacitive coupling. By making the polarities of the pulse-shaped changes of both of them the same, on the other hand, the width of the variation is increased, and hence a twice effect can be obtained. Furthermore, more complicated adjustment is possible by shifting the synchronous timing of both pulse-shaped changes, or by making a period of each pulse-shaped change different from each other.

Next, a fourth embodiment of the present invention will be described. In this embodiment, the structure of a liquid crystal display device and the structure of a display section are the same as those of the first embodiment shown in FIGS. 7 and 8. In other words, the liquid crystal display device according to this embodiment also comprises a display section 200, an image signal drive circuit 201, a scan signal drive circuit 202, a common electrode potential control circuit 203, and a synchronous circuit 204. The display section 200 comprises scan electrodes 212, image signal electrodes 211, a plurality of pixel electrodes 214 arranged in a matrix, a plurality of switching elements 213 for transmitting an image signal to the pixel electrodes 214, and a plurality of common electrodes 215 which are electrically separated from one another. This embodiment differs from the first embodiment in a way that after the scan signal drive circuit 202 has scanned part of the scan electrodes 212 and the image signal has been transmitted to the pixel electrodes 214, the common electrode potential control circuit 203 changes the electric potential of the common electrodes 215 corresponding to the scan electrodes 212 into a pulse shape.

Next, a fifth embodiment of the present invention will be described. In this embodiment, since the structure of a liquid crystal display device and the structure of a display section are the same as those of the second embodiment, FIGS. 9 and 10 are also used in the description thereof. The liquid crystal display device according to this embodiment also comprises a display section 200, an image signal drive circuit 201, a scan signal drive circuit 202, a storage capacitor electrode potential control circuit 205, and a synchronous circuit 204. The display section 200 comprises scan electrodes 212, image signal electrodes 211, a plurality of pixel electrodes 214 arranged in a matrix, a plurality of switching elements 213 for transmitting an image signal to the pixel electrodes 214, and a plurality of storage capacitor electrodes 216 which are electrically separated from one another. This embodiment differs from the second embodiment in a way that after the scan signal drive circuit 202 has scanned part of the scan electrodes 212 and the image signal has been transmitted to the pixel electrodes 214, the storage capacitor electrode potential control circuit 205 changes the electric potential of the storage capacitor electrodes 216 corresponding to the scan electrodes 212 into a pulse shape.

Next, a sixth embodiment of the present invention will be described. The structure of this embodiment is the same as that of the third embodiment shown in FIGS. 11 and 12. A liquid crystal display device according to this embodiment also comprises a display section 200, an image signal drive circuit 201, a scan signal drive circuit 202, a common electrode potential control circuit 203, a storage capacitor electrode potential control circuit 205, and a synchronous circuit 204. The display section 200 comprises scan electrodes 212, image signal electrodes 211, a plurality of pixel electrodes 214 arranged in a matrix, a plurality of switching elements 213 for transmitting an image signal to the pixel electrodes 214, a plurality of common electrodes 215 which are electrically separated from one another, and a plurality of storage capacitor electrodes 216 which are electrically separated from one another. This embodiment differs from the third embodiment in a way that after the scan signal drive circuit 202 has scanned part of the scan electrodes 212 and the image signal has been transmitted to the pixel electrodes 214, the common electrode potential control circuit 203 changes the electric potential of the common electrodes 215 corresponding to the scan electrodes 212 into a pulse shape. Also, the storage capacitor electrode potential control circuit 205 changes the electric potential of the storage capacitor electrodes 216 corresponding to the scan electrodes 212 into a pulse shape, after the scan signal drive circuit 202 has scanned part of the scan electrodes 212 and the image signal has been transmitted to the pixel electrodes 214.

Figure 20:
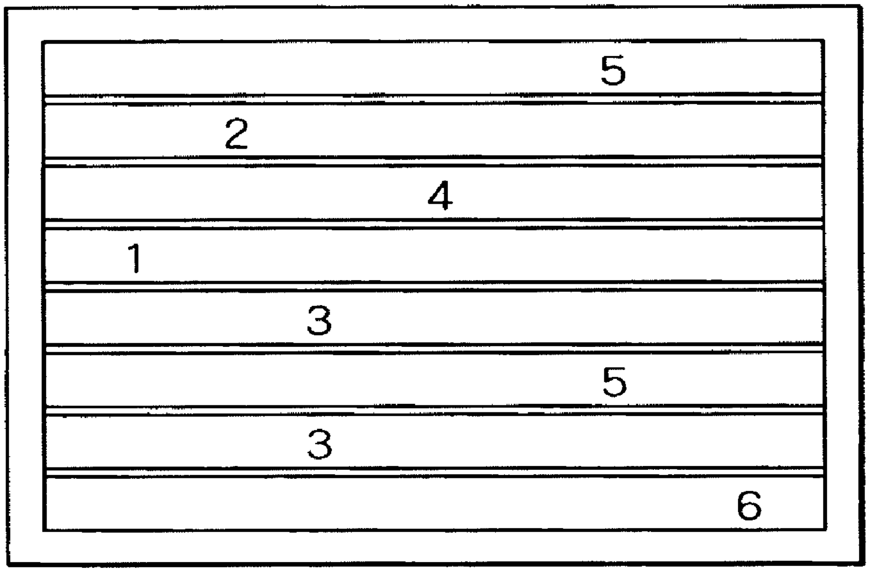
FIG. 20 is a diagram showing an example of order of scanning electrically separated electrodes according to fourth to sixth embodiments of the present invention.
Figure 21:
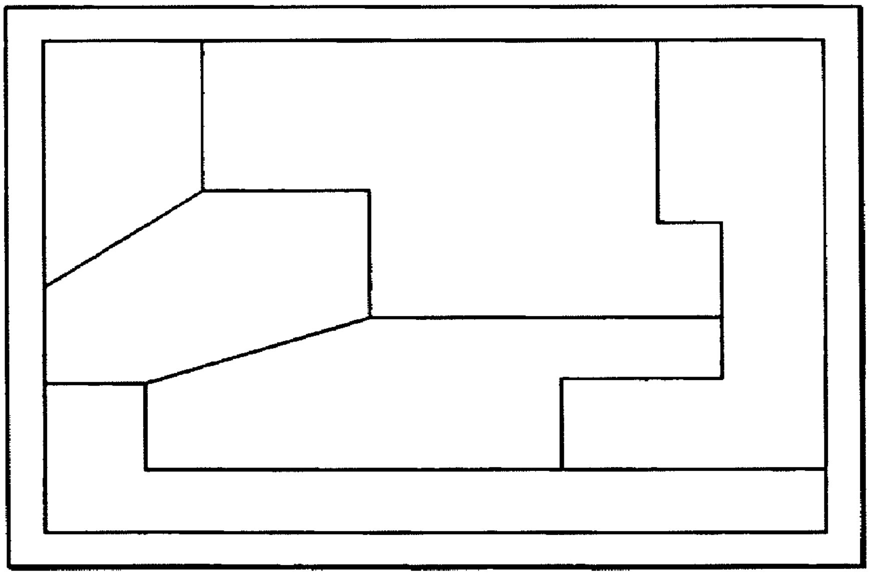
FIG. 21 is a diagram showing an example of the shapes of the electrically separated electrodes in a display section according to fourth to sixth embodiments of the present invention.
Figure 22:
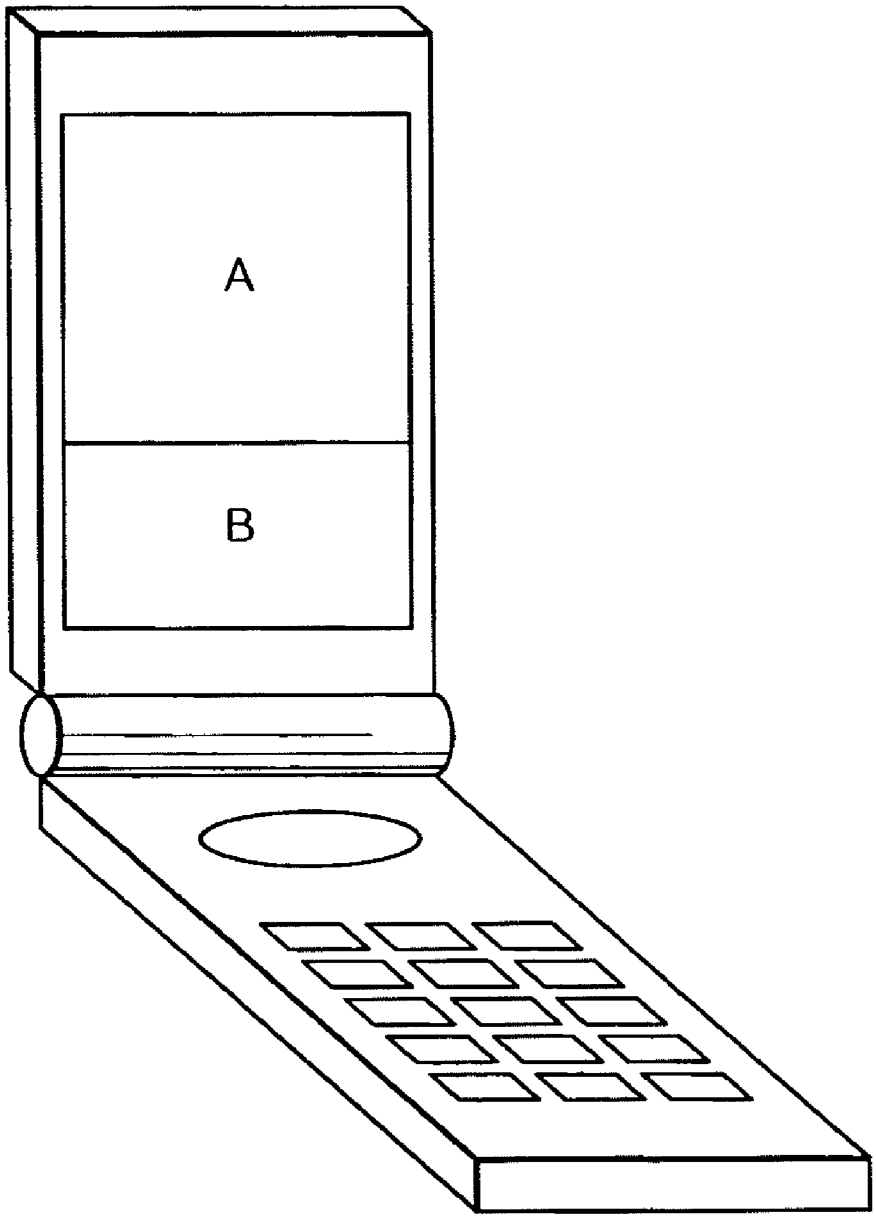
FIG. 22 is a diagram showing an example of a display device for a cellular phone, to which the fourth to sixth embodiments of the present invention are applied.
Figure 23:
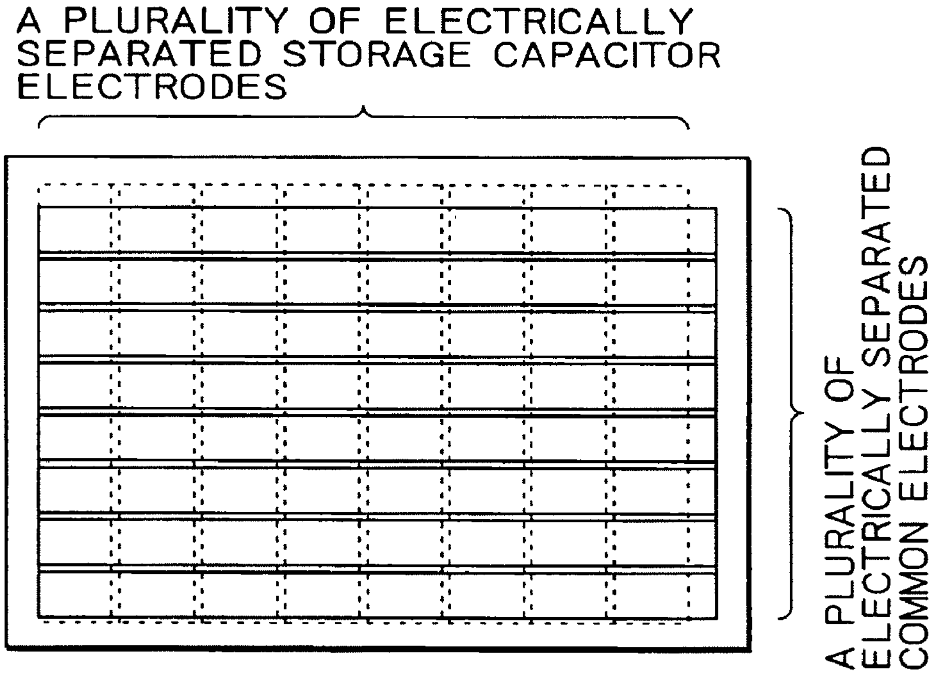
FIG. 23 is a diagram showing an example of disposition of the plurality of electrically separated common electrodes and a plurality of electrically separated storage capacitor electrodes in the display section according to the fourth to sixth embodiments of the present invention.

Then, the operation of the foregoing fourth to sixth embodiments according to the present invention will be described with reference to FIGS. 20 to 23. FIG. 20 shows an example of order of scanning the electrically separated electrodes in the display section according to the fourth to sixth embodiments. FIG. 21 shows an example of the shapes of the electrically separated electrodes in the display section according to the fourth to sixth embodiments. FIG. 22 shows an example of a display for a cellular phone, to which the fourth to sixth embodiments are applied. FIG. 23 shows an example of disposition of the plurality of electrically separated common electrodes and the plurality of electrically separated storage capacitor electrodes in the display section according to the fourth to sixth embodiments.

According to the fourth to sixth embodiments of the present invention, the common electrodes, the storage capacitor electrodes, or both of them are divided into a plurality of electrically separated sections. Thus, a potential change, which is the same as that in the first to third embodiments, can be given to only part of the display section. Accordingly, it is possible to restrain the effect, which affects the whole display section in the first to third embodiments, to affect only the part of the display section in the fourth to sixth embodiments. In other words, while a plurality of sub-display sections, into which the display device is divided, are successively scanned, the potential change is successively given to each sub-display section. Also, it is possible to apply the potential change to a plurality of sub-display sections at the same time. In either case, the position of the successively scanned sub-display sections in the display section can be arbitrarily selected. Namely, appropriately selected areas are successively scanned and the potential changes are given thereto in order of numbers shown in FIG. 20. In scan order of 3 and 5, the potential changes are given to a plurality of areas at the same time. Also, as shown in FIG. 21, for example, it is possible to give the change to areas which are different in size and shape.

Furthermore, it is possible to selectively give the electric change to only part of the whole display section. Accordingly, it is possible to vary a display state between a selected display section and an unselected display section. Referring to FIG. 22, it is possible, for example, to carry out a high speed response in a display area A of the display for the cellular phone, and to carry out a regular speed response in the other display area B.

In the sixth embodiment of the present invention, on the other hand, as shown in FIG. 23, the shape of the plurality of electrically separated common electrodes is different from that of the plurality of electrically separated storage capacitor electrodes. Thus, the display section is divided into four areas, that is, an area in which only the common electrodes are changed into the pulse shape, an area in which only the storage capacitor electrodes are changed into the pulse shape, an area in which both of the common electrodes and the storage capacitor electrodes are changed into the pulse shape, and an area without the pulse-shaped change.

According to this operation, for example, it is possible to accelerate the response of an area, the response speed of which is especially slow in the display section. Also, by adjusting the response speed in the display section so as to correct visual angle dependence occurring in the display section, it is possible to correct luminance nonuniformity due to the viewing angle dependence.

In a seventh embodiment of the present invention, the electric potential of the common electrode 215 changed into the pulse shape according to the first, third, fourth, or sixth embodiment is set at a potential value not resetting the display of the display section 200.

In an eighth embodiment of the present invention, the electric potential of the storage capacitor electrode 216 changed into the pulse shape according to the second, third, fifth, or sixth embodiment is set at a potential value not resetting the display of the display section 200.

In the seventh and eighth embodiments of the present invention, the electric potential changed into the pulse shape is set at the potential value not resetting the display of the display section. Thus, delay as described above does not occur, and the speed can be accelerated. Since this principle has been described in Summary of the Invention, it will not be repeated. The operation and effect of an example, in which the liquid crystal display device according to the seventh embodiment is practically manufactured, will be hereinafter described as compared with a comparative example.

The example of the seventh embodiment will be described as compared with a comparative example in which a voltage for reset is applied. In this example and the comparative example, thin-film transistors made of amorphous silicon, which will be described later, are used as the switching elements. A nematic liquid crystal material is used as the display material of the display section, and the liquid crystal material is in twisted nematic alignment, as described later.

Figure 1:
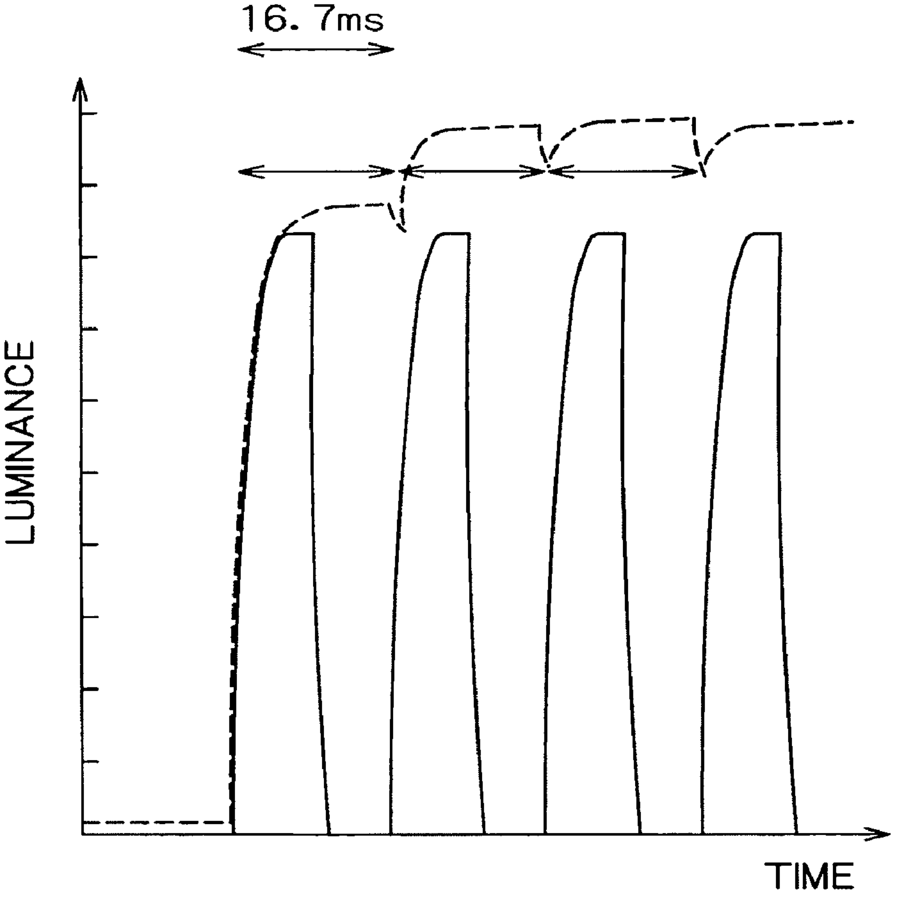
FIG. 1 (PRIOR ART)
FIG. 1 is a graph showing the effect of conventional reset drive, in which a dotted line indicates normal drive, and a solid line indicates variation in light intensity by the reset drive.
Figure 2:
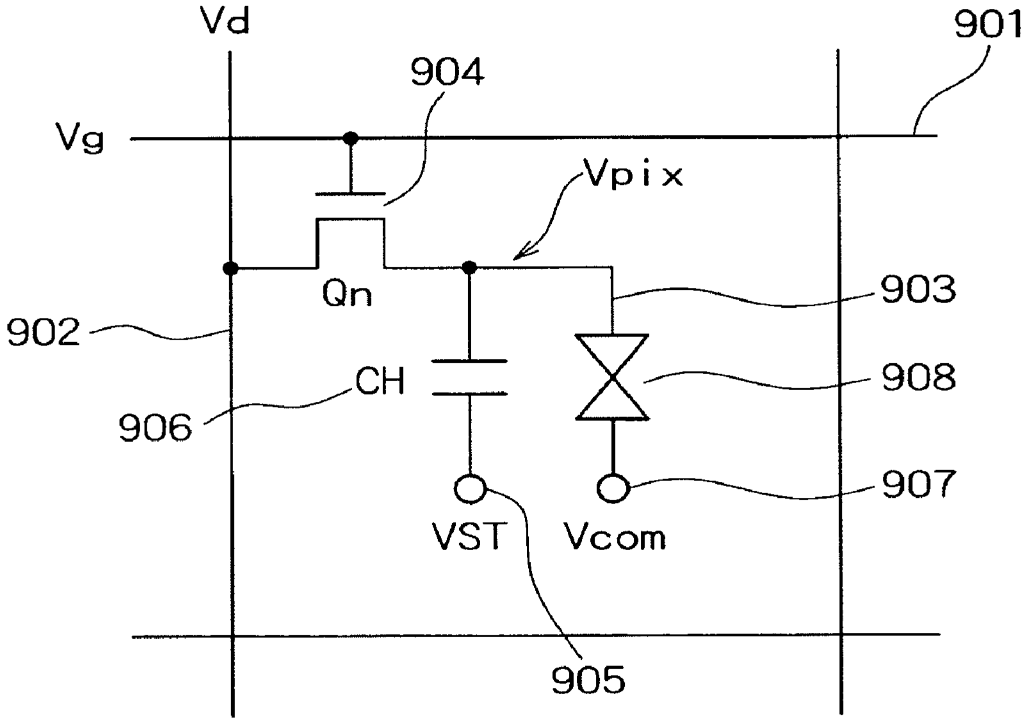
FIG. 2 (PRIOR ART)
FIG. 2 is a circuit diagram showing an example of a pixel circuit composing a conventional liquid crystal display device.
Figure 3:
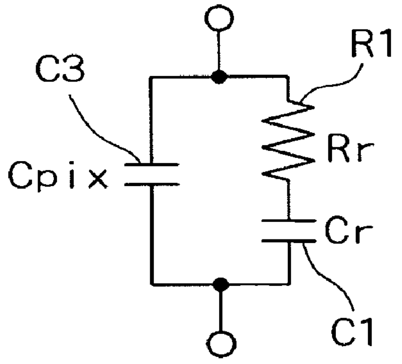
FIG. 3 (PRIOR ART)
FIG. 3 is a circuit diagram showing an equivalent circuit of a TN liquid crystal.
Figure 4:
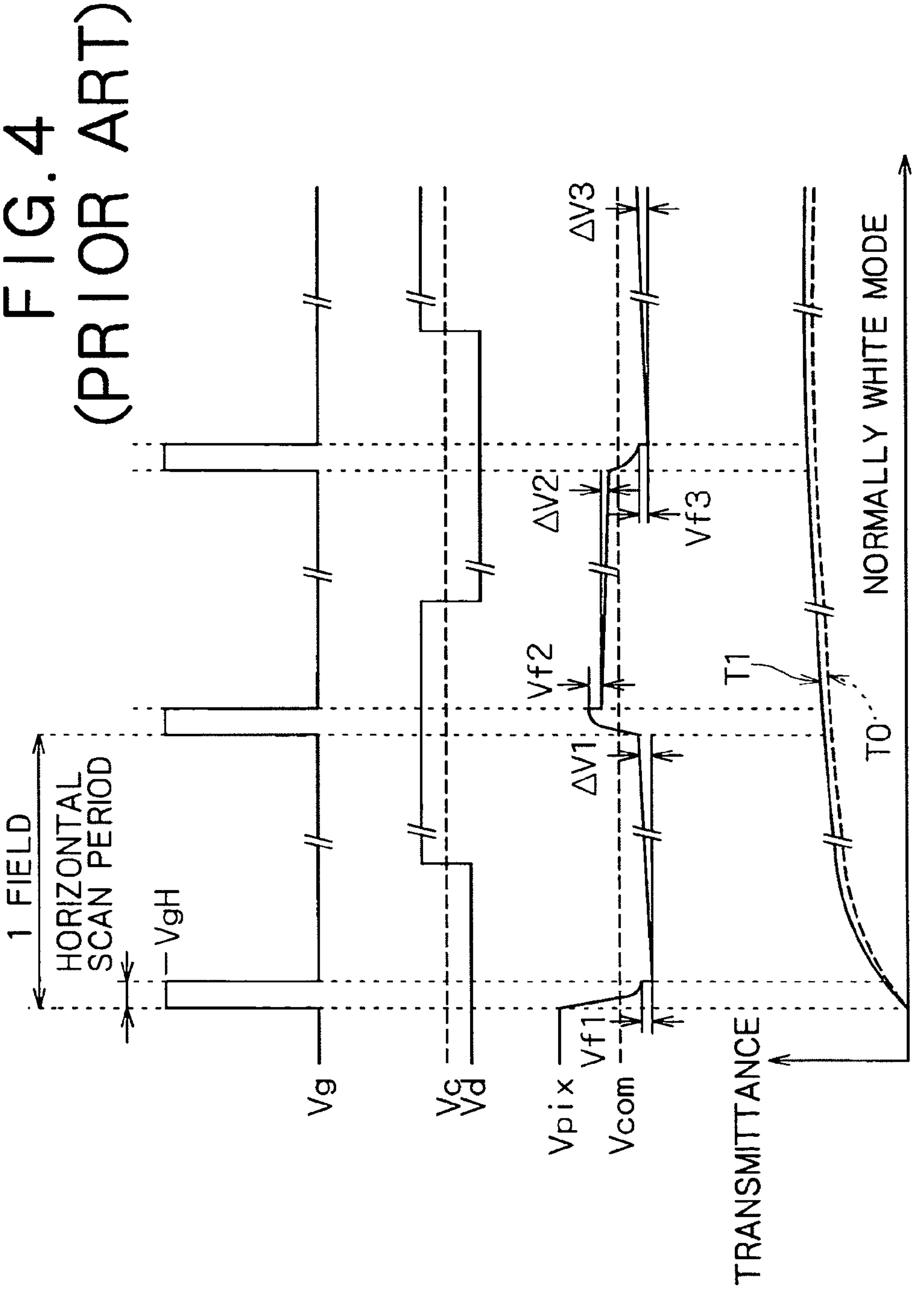
FIG. 4 (PRIOR ART)
FIG. 4 is a timing chart in the case where the TN liquid crystal is driven in the conventional liquid crystal display device.
Figure 5:
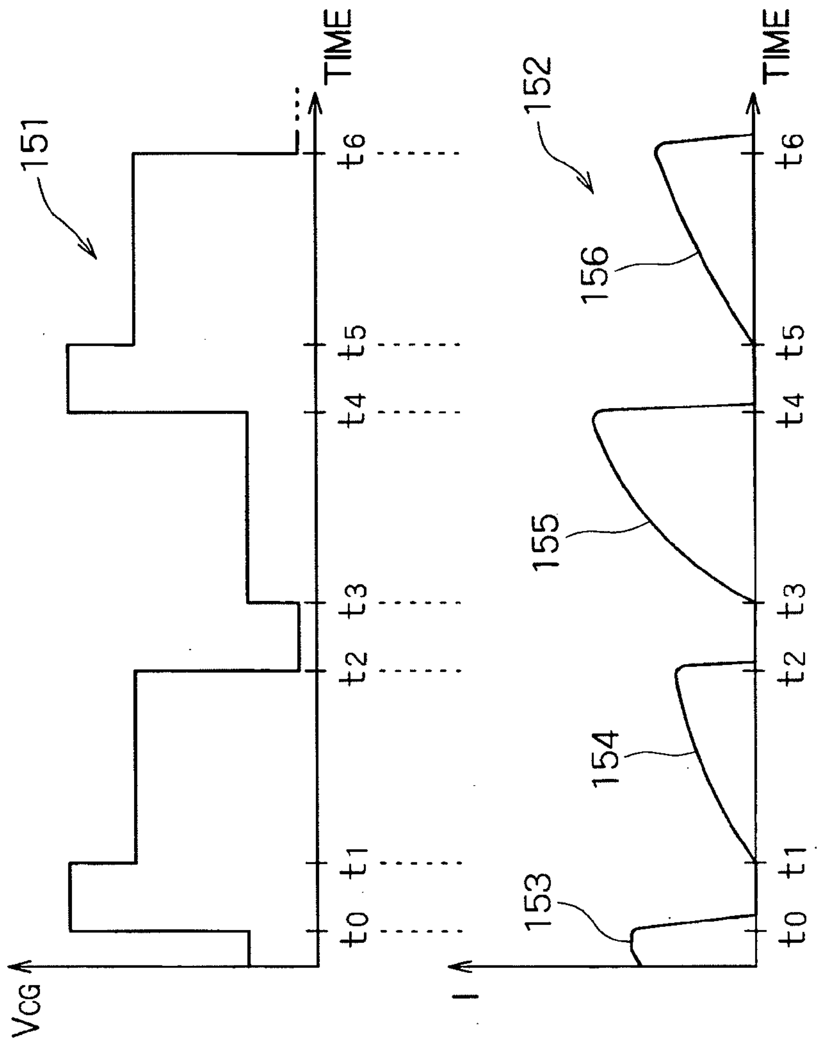
FIG. 5 (PRIOR ART)
FIG. 5 is a graph explaining conventional drive for modulating a common voltage, an upper graph showing a voltage waveform applied to a common electrode, a lower graph showing light intensity.
Figure 6:
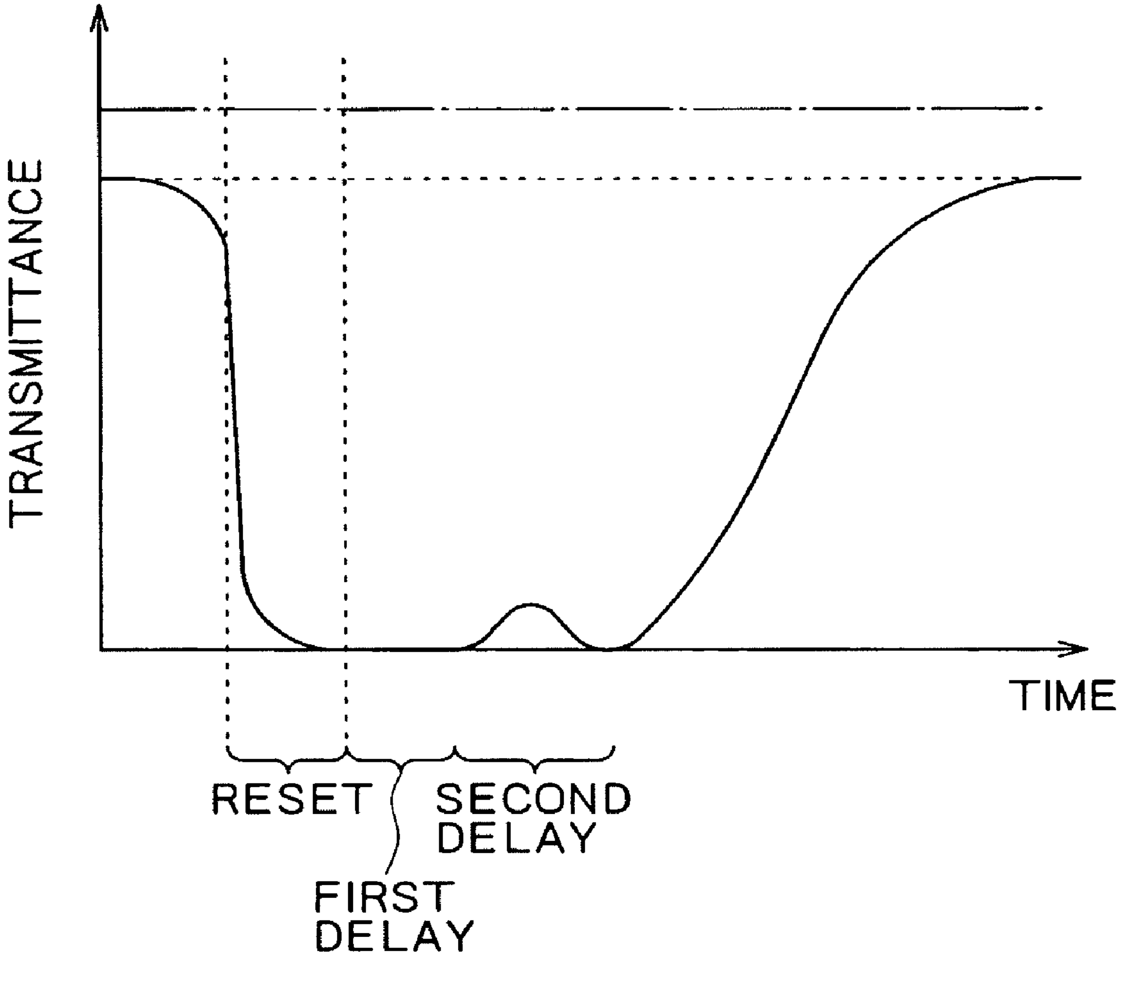
FIG. 6 (PRIOR ART)
FIG. 6 is a graph showing variation in transmittance with time, when a pulse-shaped change having the same effect as a conventional reset is applied.
Figure 24:
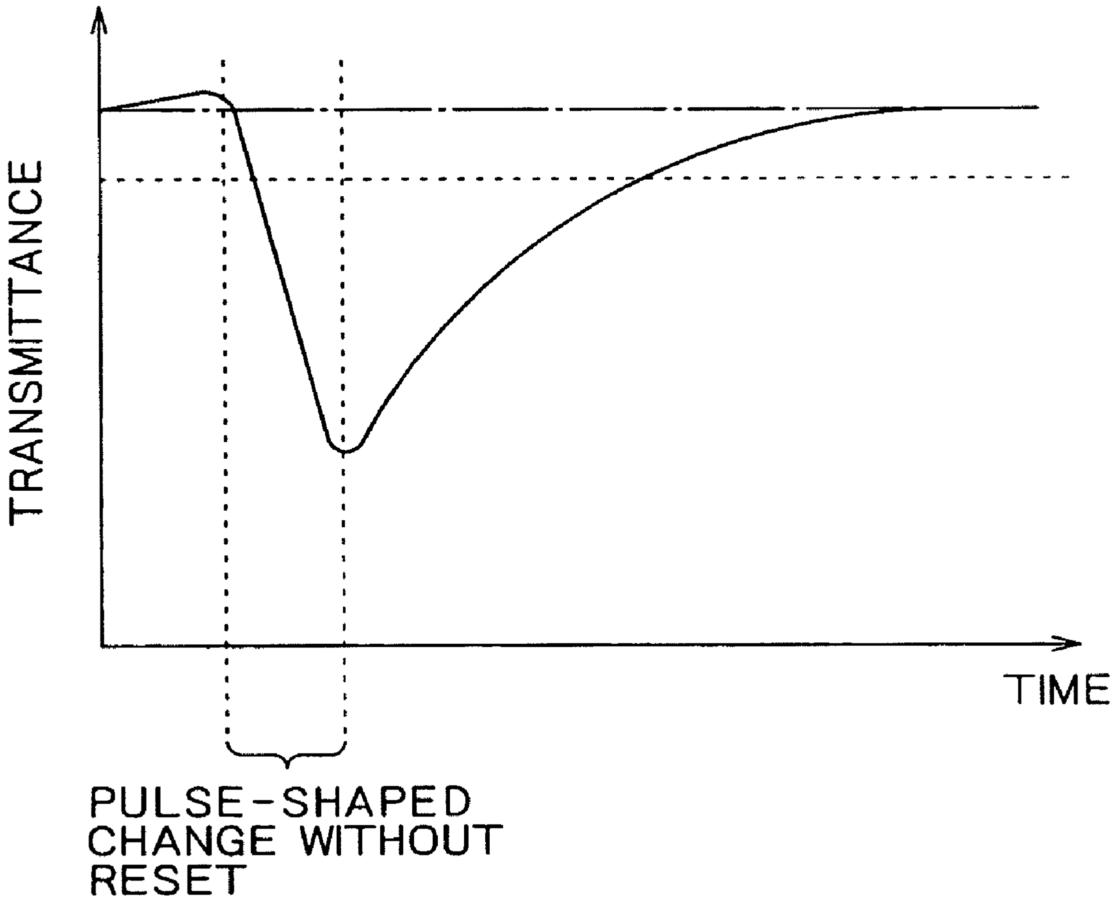
FIG. 24 a graph showing a variation in transmittance with time in the case where a pulse-shaped change without reset according to the present invention is applied.

FIG. 6 is a graph showing a variation in transmittance with time, when a pulse-shaped change for reset is applied, as in the case of the conventional reset drive. On the other hand, FIG. 24 is a graph which shows a variation in transmittance with time according to the present invention, in the case where a pulse-shaped change without reset is applied. To compare the effect of a reset state on response speed, a sequence of drive is the same, and the pulse-shaped change is given to both of them. In other words, an image signal is first written into every pixel, and then the pulse-shaped change (which causes the reset state in FIG. 6, and does not cause reset in FIG. 24) is given. Referring to FIG. 6, in the case where the same pulse-shaped change as the conventional reset is given, the first delay described in Summary of the Invention occurs after the pulse-shaped change, and then the second delay occurs. As compared with it, in the pulse-shaped change shown in FIG. 24 according to the present invention, neither of the first and second delay occurs. After the pulse-shaped change has been completed, a response aiming at desired transmittance immediately occurs. As a result, transmittance does not reach a desired value (shown by alternate long and two short dashed lines) in the conventional reset state. In the pulse-shaped change according to this embodiment, on the other hand, transmittance immediately reaches a maximum value (a chain line in the drawing), which can be secured in the conventional reset state, after the pulse-shaped change. Then, the transmittance reaches the desired value and stabilizes.

Next, a ninth embodiment of the present invention will be described. This embodiment is the same as the first, third, fourth, sixth, and seventh embodiments, except that the electric potential of the common electrode 215 is changed among at least three potentials, and more preferably, among four or more potentials.

A tenth embodiment of the present invention is the same as the second, third, fifth, sixth, and eighth embodiments, except that the electric potential of the storage capacitor electrode 216 is changed among at least three potentials, and more preferably, among four or more potentials.

Then, the operation of the ninth and tenth embodiments according to the present invention will be described with reference to FIG. 19. Also in these embodiments, it is possible to effectively give a pulse-shaped change to both of the opposite polarities of an image signal by giving a potential change as shown in FIG. 19.

Next, an eleventh embodiment of the present invention will be described. This embodiment is the same as the foregoing first to tenth embodiments, except that the electric potential of the common electrode 215 or the electric potential of the storage capacitor electrode 216, which is changed into the pulse shape, is changed into a pulse shape in the direction of temporarily increasing the potential difference between the pixel electrode 214 and the common electrode 215, or between the pixel electrode 214 and the storage capacitor electrode 216.

Then, the operation of the eleventh embodiment according to the present invention will be described. In this embodiment, an overdrive (feed forward) effect can be obtained without operating the image signal, by temporarily increasing the potential difference between the pixel electrode and the common electrode, or between the pixel electrode and the storage capacitor electrode. According to the present invention, in contrast to the conventional overdrive for operating the image signal, it is possible to give the overdrive effect to the whole electrically connected area at the same time.

Next, a twelfth embodiment of the present invention will be described. This embodiment is the same as the foregoing first to eleventh embodiments, except that the electric potential of the image signal is made different from the electric potential of the image signal in a stable display state in static drive, in consideration of the response characteristics of the display section 200 during electric charge holding drive. By adding, for example, an overshoot characteristic, arrival time to predetermined transmittance is shortened.

Since the image signal is transmitted to the pixel electrodes 214 through the switching elements in the present invention, the display section is not in the static drive, in which voltage is always applied. The display section is in the electric charge holding drive, in which the display material is driven so as to hold electric charge of the moment in time at which the switching element is turned off.

Next, a thirteenth embodiment of the present invention will be described. This embodiment is the same as the foregoing twelfth embodiment, except that the electric potential of the image signal is determined by comparing hold data of each pixel before writing the image signal with display data to be newly displayed, in consideration of the response characteristics of the display section 200.

In the present invention, the hold data is approximately equal to the sum of electric charge held between the pixel electrode 214 and the common electrode 215 and electric charge held between the pixel electrode 214 and the storage capacitor electrode 216. The display data to be newly displayed is approximately equal to the average of the sum of electric charge between the pixel electrode 214 and the common electrode 215 and electric charge between the pixel electrode 214 and the storage capacitor electrode 216 during a display period. Otherwise, the display data to be newly displayed is approximately equal to the sum of electric charge between the pixel electrode 214 and the common electrode 215 and electric charge between the pixel electrode 214 and the storage capacitor electrode 216 at a point in time when the display period is completed.

According to the twelfth embodiment of the present invention, applying electric potential different from the static drive makes it possible to apply electric potential which is suited for drive using the pixel switch. Furthermore, since the image signal has the overshoot characteristic, the response speed is accelerated by the overdrive effect.

Figure 25:
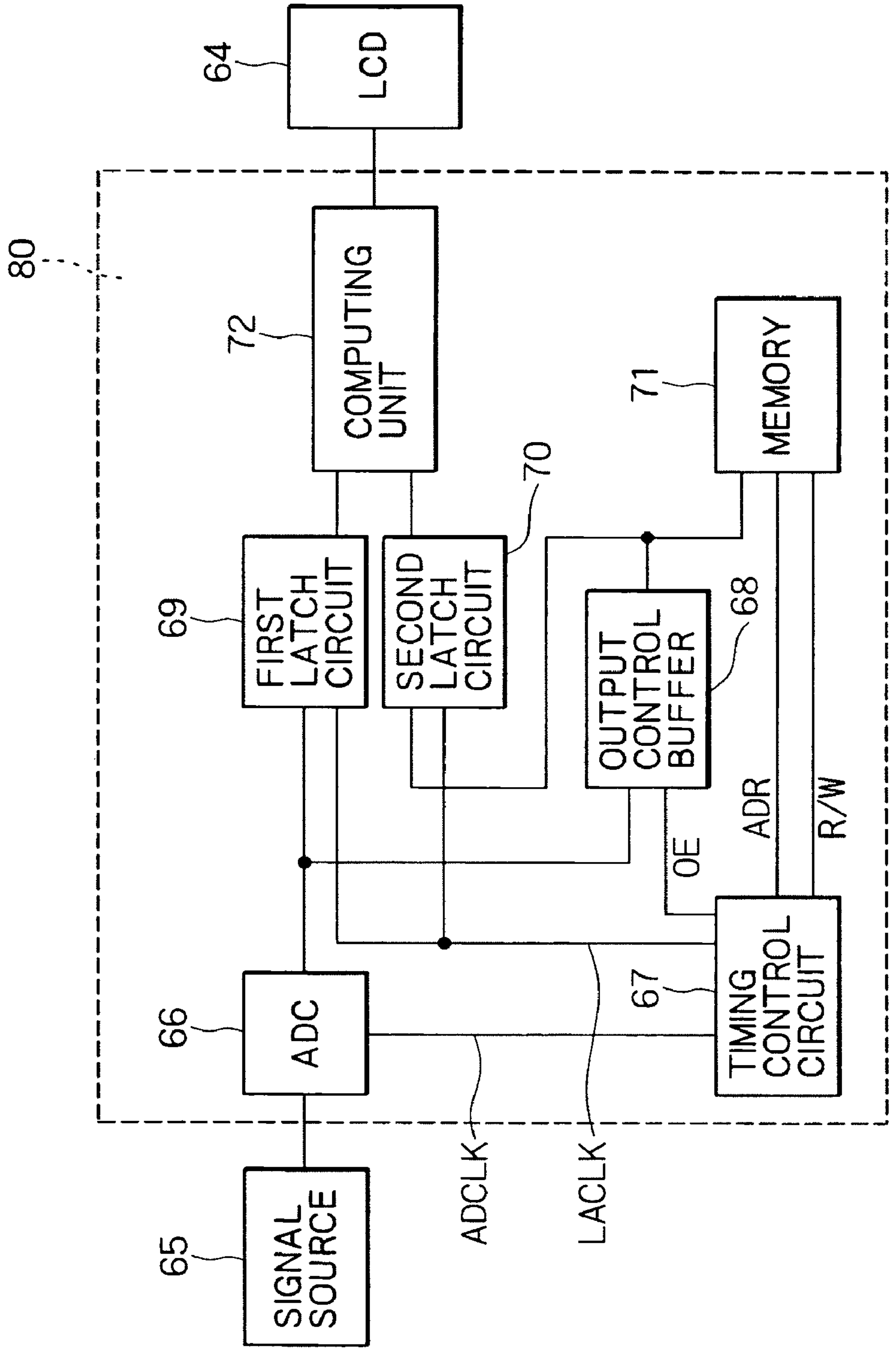
FIG. 25 is a block diagram showing an example of a driving device for driving a display device according to twelfth and thirteenth embodiments of the present invention.

Furthermore, since the electric potential of the image signal is determined by comparing the hold data of each pixel before writing the image signal with the display data to be newly displayed, it is possible to select a more effective image signal. For example, a circuit disclosed in Japanese Patent No. 3039506 is available. FIG. 25 shows an example of a drive device disclosed in the official gazette of this patent. In this display device, a write signal voltage corresponding to the display data is applied to each of successively designated pixels, in order to display an image of each display frame. A drive device 80 for driving a liquid crystal display (LCD) 64 is connected between a signal source 65 and the LCD 64. The drive device 80 comprises an analog-to-digital converter circuit (hereinafter abbreviated as ADC circuit) 66 connected to the signal source 65, a first latch circuit 69 connected to the ADC circuit 66, and an output control buffer 68 connected to the ADC circuit 66. The drive device 80 further comprises a memory 71 connected to the output control buffer 68, a second latch circuit 70, a computing unit 72 connected to the first and second latch circuits 69 and 70, and a timing control circuit 67. The second latch circuit 70 is connected to the memory 71 through a node for connecting the output control buffer 68 and the memory 71 to each other. The ADC circuit 66 converts an analog signal from the signal source 65 into a digital signal in synchronization with a clock ADCLK. The output control buffer 68 has an output control function. An output terminal of the output control buffer 68 becomes a high-impedance (hereinafter called Hi-Z) state upon receiving a control signal OE. In this drive device 80, while the control signal OE is in a high level and the output control buffer 68 is in an output possible state for outputting inputted data, when the control signal OE is changed into a low level the output control buffer 68 outputs Hi-Z. The memory 71 having a capacity of one frame or more is controlled by an address signal ADR and a control signal R/W. The memory 71 carries out reading operation when the R/W is in a high level, and the memory 71 carries out writing operation when the R/W is in a low level. Each of the first and second latch circuits 69 and 70 is a circuit for taking in and holding inputted data while receiving a clock LACLK. The first and second latch circuits 69 and 70 take in data at a rising edge of the clock, and hold the data until the next rising edge. The first latch circuit 69 latches an image signal voltage VS(m,n), and the second latch circuit 70 latches an image signal voltage VS(m,n−1). A write signal voltage Vex(m,n) of an m-th pixel in an n frame is calculated by the linear sum of the image signal voltage VS(m,n−1) of an m-th pixel in an n−1 frame which is displayed last time, and the image signal voltage VS(m,n) of an m-th pixel in an n frame which is displayed next. Namely, Vex(m,n)=AVS(m,n)+BVS(m,n−1) (A and B are constants). Thus, the computing unit 72 sets the write signal voltage Vex(m,n) of the m-th pixel in the n frame, by the linear sum of the image signal voltage VS(m,n−1) of the m-th pixel in the n−1 frame displayed last time and the image signal voltage VS(m,n) of the m-th pixel in the n frame displayed next, by use of an equation of Vex(m,n)=AVS(m,n)+BVS(m,n−1). The timing control circuit 67 controls the timing of each signal. The memory 71 and the computing unit 72 compose display control means.

In the present invention, however, the response speed is accelerated by the pulse-shaped change in the common electrode potential and the like. Thus, a voltage added for giving the overdrive effect can be set lower than that for the conventional overdrive method.

Next, a fourteenth embodiment of the present invention will be described. A liquid crystal display device according to this embodiment is the same as that of the foregoing first to thirteenth embodiments, except that an electric field response material is sandwiched between the pixel electrode 214 and the common electrode 215 in the display section 200. It is preferable that the electric field response material in the display section 200 comprise a liquid crystal material.

The pixel electrode 214 and the common electrode 215 may be provided in different substrates from each other, or may be provided in the same substrate. Otherwise, the pixel electrode 214 and the common electrode 215 may be interposed between substrates.

If the electric field response material is used, it is possible to change a state of response of this material in accordance with the electric potential changed into the pulse shape. Especially, if the liquid crystal material is used, the alignment and response speed of the liquid crystal material are changed in accordance with the electric potential changed into the pulse shape.

Next, a fifteenth embodiment of the present invention will be described. This embodiment is the same as the foregoing fourteenth embodiment, except that the liquid crystal material is nematic liquid crystal, and has twisted nematic alignment. It is preferable that a relation of $p/d<20$ hold, when p (μm) represents a twist pitch p (μm) of the liquid crystal material having the twisted nematic alignment, and d (μm) represents an average thickness of a liquid crystal layer having the twisted nematic alignment. More preferable, a relation of $p/d<8$ hold, when p (μm) represents the twist pitch of the liquid crystal material having the twisted nematic alignment, and d (μm) represents the average thickness of the liquid crystal layer having the twisted nematic alignment.

In this liquid crystal display device, an optical compensation film is provided as necessary to widen a viewing angle. It is preferable that the optical compensation film compensate optical characteristics of the liquid crystal material in a predetermined state. The optical compensation film is structured so as to compensate, for example, the optical characteristics obtained from the alignment structure of the liquid crystal material when applying voltage.

By using the twisted nematic liquid crystal, it is possible to obtain continuous gray level variation. Especially, since the foregoing relations hold between the twist pitch p and the thickness d, it is possible to increase torque for the twisted nematic liquid crystal returning to a twisted state. Thus, it is possible to accelerate the response speed in returning to a no-voltage-application state or a low-voltage-application state. In other words, the falling response can be accelerated.

Figure 26:
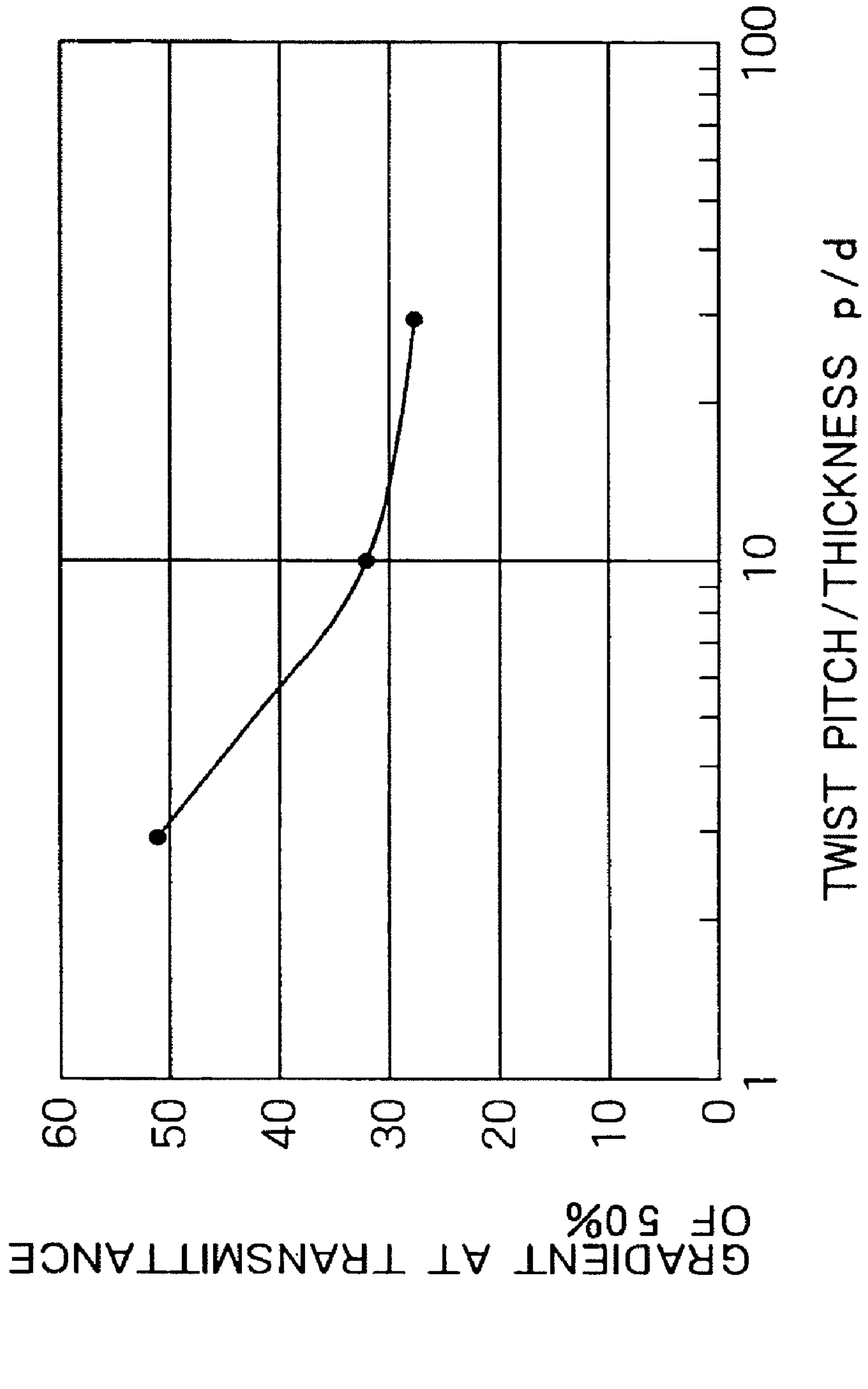
FIG. 26 is a graph showing the relation between a twist pitch/thickness and an inclination at a transmittance of 50% in a falling response according to a fifteenth embodiment of the present invention.

Then, the effect of the fifteenth embodiment will be described by use of its example. A few types of liquid crystal with different twist pitches were prepared, and liquid crystal panels were made of the respective types of the liquid crystal. When a pair of polarizing plates was disposed outside the panel to obtain the normally white display, the effect of this embodiment was confirmed. The distance between substrates (the thickness of a liquid crystal layer) was 2 μm, and the liquid crystal, the twist pitches of which were 6 μm, 20 μm, and 60 μm, was used. The square of the thickness of the liquid crystal layer correlates with the response speed. When the thickness of the liquid crystal layer is 6 μm (triple thickness), for example, the response speed is reduced to one-ninth. Therefore, it is preferable that the thickness of the liquid crystal layer be 4 μm or less, and more preferably, 3 μm or less. There are no restrictions on the thickness, but it is preferable that the thickness of the liquid crystal layer be 0.5 μm or more in consideration of restrictions on the twist pitch of the liquid crystal and difficulty in manufacturing, and more preferably, 1 μm or more. Under this state, the time-transmittance characteristic of the liquid crystal in rising (the optical response of the liquid crystal in falling (that is, a response from a dark state to a bright state in the normally white alignment)) was observed. The liquid crystal display was changed from a black display state to a completely translucent white display state, and the gradient of change in transmittance in the vicinity of transmittance of 50% was calculated from the observed time-transmittance characteristic. The reason why the vicinity of transmittance of 50% is selected is that change in the transmittance is the largest there. FIG. 26 is a plot of the relation between the calculated gradient and p/d (the twist pitch/the thickness of the liquid crystal layer), in which a vertical axis indicates the calculated gradient (%/ms), and a horizontal axis indicates the p/d. As a matter of course, the thickness of the liquid crystal layer is equivalent to the distance of clearance between substrates. It is apparent from FIG. 26 that the gradient increases as "the twist pitch/the thickness of the liquid crystal layer" decreases, and hence the falling response of the liquid crystal is accelerated. Especially, the gradient sharply increases from "the twist pitch/the thickness of the liquid crystal layer" of approximately 15. The gradient exceeds 50 (%/ms), when "the twist pitch/the thickness of the liquid crystal layer" is approximately 3. In other words, a response of 2 milliseconds or less is possible ideally. In this plot, the case of a "twist pitch/thickness" (p/d) of 30 is compared with that of 3. When the p/d is 3, the gradient is approximately twice as large as that in a p/d of 30. Thus, there is a possibility that the optical response time of the liquid crystal in falling becomes half. Even if the p/d is 10, the response speed increases 15% or more with respect to that in a p/d of 30. To put it briefly, this effect is achieved by large torque for returning to an initial alignment state (that is, an almost evenly twisted alignment state between the substrates), in which voltages and the like are not applied.

Next, a sixteenth embodiment of the present invention will be described. This embodiment is the same as the fourteenth embodiment, except that the liquid crystal material in the twisted nematic alignment is polymerically stabilized to have an almost continuously twisted structure. It is preferable that the liquid crystal material be polymerically stabilized into the structure of a no-voltage-application state or a low-voltage-application state.

It is also preferable that a light curing monomer be added to the twisted nematic liquid crystal, and the twisted nematic liquid crystal be polymerized by light irradiation. More preferably, the light curing monomer should be a liquid crystal monomer having a liquid crystal skeleton. Furthermore preferably, the liquid crystal monomer should be diacrylate, or monoacrylate in which a polymer functional group and the liquid crystal skeleton are bonded without the medium of a methylene spacer.

Then, the operation of the sixteenth embodiment of the present invention will be hereinafter described with the use of an example. To obtain a TN-type display device of normally white display, a twisted nematic liquid crystal, which contained 2% of a light curing diacrylate liquid crystal monomer having a structural formula shown in the following chemical formula 1, was injected. Then, the liquid crystal was polymerized by light irradiation (ultraviolet rays radiation (1 $mW/cm^2 \times 600$ sec.)) under a no-voltage-application state. As compared with this structure, a twisted nematic liquid crystal, which contained 2% of a light curing monoacrylate liquid crystal monomer, was injected, and the liquid crystal was polymerized by light irradiation under a no-voltage-application state. In the light curing monoacrylate liquid crystal monomer, a polymer functional group and a liquid crystal skeleton having a structural formula shown in the following chemical formula 2 are bonded without the medium of a methylene spacer. Also in this case, the same result as the case of the diacrylate liquid crystal monomer was obtained.

Chemical formula 1

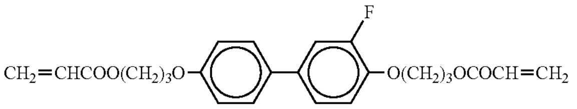

Chemical formula 2

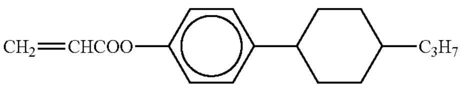

This is because using the monomer without the medium of the methylene spacer seldom delays the response of the liquid crystal to voltage in accordance with the addition of the monomer. Needless to say, another liquid crystal monomer is available by adjusting the amount of addition of the monomer. To stabilize the alignment of the liquid crystal against the unevenness of the substrates, it is preferable that the monomer be added in an amount of 0.5% or more with respect to the liquid crystal, but more preferably, 1% or more. The response of the liquid crystal is not impaired when the amount of the monomer is 5% or less, but 3% or less is more preferable.

The same effect as the fifteenth embodiment can be obtained by polymerical stabilization, as described above. This is because torque for returning to a polymerically stabilized state becomes large.

Next, a seventeenth embodiment of the present invention will be described. This embodiment is the same as the fourteenth embodiment, except that the liquid crystal material is in a voltage control birefringent mode.

Otherwise, the liquid crystal material may be in pi-alignment (bend alignment). Preferably, a liquid crystal display device with the pi-alignment is provided with an optical compensation film, and is in an OCB (optical compensated birefringence) mode.

Otherwise, the liquid crystal material may be in a VA (vertical alignment) mode in a homeotropic alignment. Preferably, a viewing angle is widened by using multi-domain or the like. As a method for using the multi-domain, a MVA (multi-domain vertical alignment) method, a PVA (patterned vertical alignment) method, ASV (advanced super view) method or the like is available. More preferably, the viewing angle is further widened, as necessary, by providing the optical compensation film.

Furthermore, in the foregoing fourteenth embodiment, the liquid crystal material may be in an IPS (in plane switching) mode, in which the liquid crystal material responds to an electric field parallel to the surface of a substrate. It is more preferable that the liquid crystal material be in a Super-IPS mode by using an electrode with zigzag structure, to further improve the characteristics of the liquid crystal material.

Furthermore, in the foregoing fourteenth embodiment, the liquid crystal material may be in an FFS (fringe field switching) mode, or in an AFFS (advanced fringe field switching) mode.

Furthermore, in the foregoing fourteenth embodiment, the liquid crystal material may be a ferroelectric liquid crystal material, an anti-ferroelectric liquid crystal material, or a liquid crystal material showing an electroclinic response. It is preferable that the foregoing liquid crystal material show a V-shaped transmittance response or a Half-V-shaped transmittance response to voltage.

Furthermore, in the foregoing fourteenth embodiment, the liquid crystal material may be a cholesteric liquid crystal material.

Next, an eighteenth embodiment of the present invention will be described. This embodiment is the same as the foregoing seventeenth embodiment, except that the alignment of the liquid crystal material is polymerically stabilized to have the structure of the no-voltage-application state or the low-voltage-application state.

Preferably, a light curing monomer should be added to the twisted nematic liquid crystal, and the twisted nematic liquid crystal should be polymerized by light irradiation.

More preferably, the light curing monomer should be a liquid crystal monomer having a liquid crystal skeleton.

Furthermore preferably, the liquid crystal monomer should be diacrylate, or monoacrylate in which a polymer functional group and the liquid crystal skeleton are bonded without the medium of a methylene spacer.

In the foregoing seventeenth and eighteenth embodiments of the present invention, a liquid crystal mode except for a twisted nematic type is used.

The pi-alignment and the OCB mode can offer both of a high speed response and a wide viewing angle. Applying the present invention makes it possible to further accelerate the rising response.

In a series of the VA mode, a viewing angle is widened, and the speed of a response except for a halftone response is fast. By applying the present invention, it is possible to increase the speed of the response including the halftone response.

The IPS mode offers a wide viewing angle. The rising response speed of the IPS mode is slower than that of the VA, but the halftone response speed thereof is faster than that of the VA. Applying the present invention makes it possible to increase the response speed including the rising response. The FFS mode offers a wide visual angle, and response characteristics are similar to those of the IPS mode. Applying the present invention makes it possible to increase the response speed including the rising response.

The ferroelectric liquid crystal, the anti-ferroelectric liquid crystal, the electroclinic liquid crystal, or the like can respond at extremely high speed, and offer a wide viewing angle. If these liquid crystals are used, the response speed can be further increased by applying the present invention. It is also possible, on the other hand, to slow down the response speed.

The present invention effectively acts on the cholesteric liquid crystal.

As to the rising response of these liquid crystal modes, the response speed cannot be accelerated by a twist pitch, as in the case of the twisted nematic type. Therefore, the liquid crystal material is polymerically stabilized in the no-voltage-application state.

In the display device according to the present invention, a display material and a display mode are not limited to several types described in the foregoing embodiments. In other words, the present invention is effective for every material, as long as the material is an electric field response material, and the response of the material varies in accordance with the strength of an electric field, an application period, magnitude relation with a threshold value, and the like.

A liquid crystal display device according to a nineteenth embodiment of the present invention is a color liquid crystal display device for carrying out color display. In the color liquid crystal display device, a color filter is used in the display section according to the foregoing first to eighteenth embodiments.

Applying the present invention makes it possible to accelerate the response time of the liquid crystal display device using the color filter. As a result, it is possible to obtain the liquid crystal display device suitable for moving image display and the like.

Figure 27:
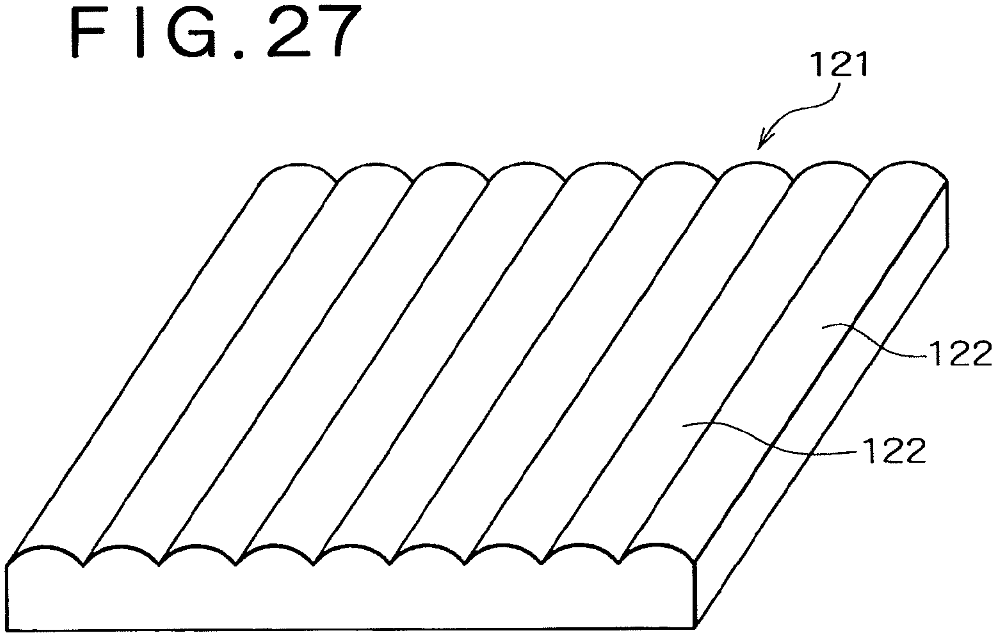
FIG. 27 is a perspective view of a lenticular lens sheet.
Figure 28:
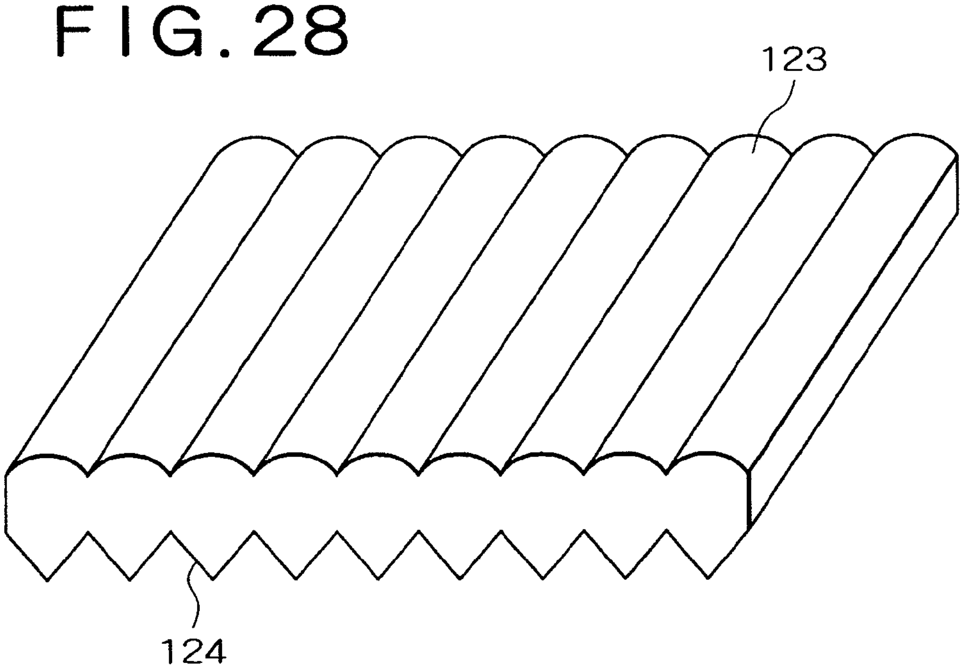
FIG. 28 is a perspective view of a dual prism sheet.

A liquid crystal display device according to a twentieth embodiment of the present invention is a stereoscopic liquid crystal display device for carrying out stereoscopic display. In the stereoscopic liquid crystal display, a lenticular lens sheet shown in FIG. 27 or a dual prism sheet shown in FIG. 28 is used in the foregoing first to eighteenth embodiments. It is preferable that a time division type stereoscopic display method be used. In the time division type stereoscopic display method, a scan backlight is formed by alternately applying light as backlight from two positions. An image signal is switched with time between an image signal for a right eye and an image signal for a left eye at double or more the normal frequency in synchronization with the scan backlight, to carry out the stereoscopic display.

Then, the operation of the twentieth embodiment of the present invention will be described with reference to FIGS. 27 and 28. A lenticular lens sheet 121 shown in FIG. 27 comprises a plurality of cylindrical lenses 122. The lenticular lens sheet 121 can divide an image for the right eye and an image for the left eye between the right and left eyes, by positional relation with pixels. The dual prism sheet shown in FIG. 28 comprises the lenticular lens 123, identical to FIG. 27, provided on one surface, and a light separation prism 124 provided on the other surface. Thus, the dual prism sheet shown in FIG. 28 can divide light into a wider angle than the lenticular lens itself shown in FIG. 27. In the scan backlight, for example, light sources are disposed on the right and left of a light guiding plate of the backlight, and one of the light sources is assigned as a light source for the left eye, and the other is assigned as a light source for the right eye. The image for the left eye and the image for the right eye to be displayed in the display section are selected in synchronization with the corresponding light source to be turned on, so that the stereoscopic display is made possible. The images have to be switched at a frequency of, for example, 120 Hz or more, so that speedup according to the present invention works extremely effectively.

According to the present invention, if display is switched between two-dimensional display and three-dimensional display, there is no difference in the number of pixels. Since the pixel is not divided in two, it is possible to easily realize high resolution or a high aperture ratio.

Next, a twenty-first embodiment of the present invention will be described. A display device according to this embodiment is a color field sequential (color time division) type liquid crystal display device. In the color field sequential type liquid crystal display device, the image signal according to the foregoing first to the eighteenth embodiments is divided into a plurality of color image signals, which correspond to a plurality of colors. A light source corresponding to the plurality of colors is synchronized with the plurality of color image signals with a predetermined phase difference. The plurality of color image signals are successively displayed with time.

Figure 29:
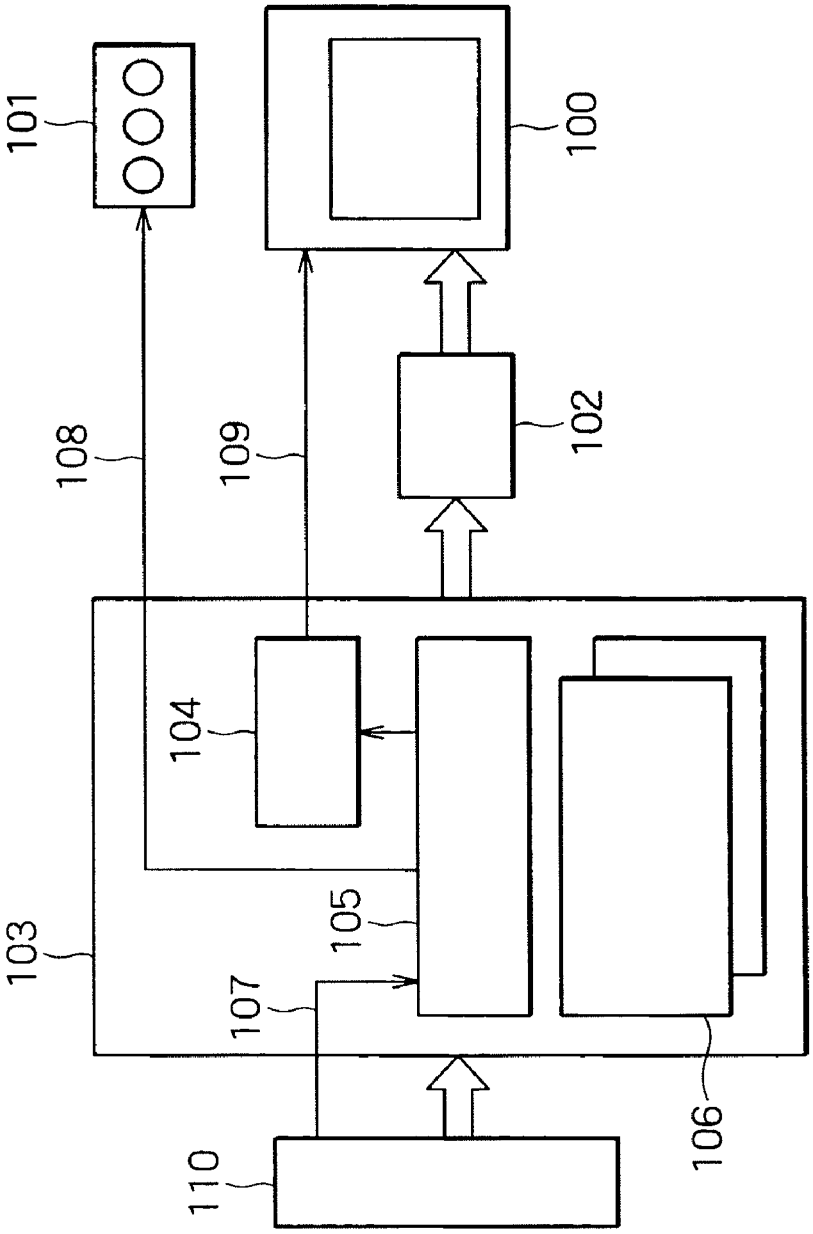
FIG. 29 is a schematic block diagram showing the whole field sequential display system according to a twenty-first embodiment of the present invention.

The twenty-first embodiment of the present invention realizes a color field sequential drive type display device. FIG. 29 is a schematic block diagram showing an example of a field sequential display system. A controller IC 103, which contains a controller 105, a pulse generator 104, and a high speed frame memory 106, converts normal image data into image data of each color of red, blue, or green. The image data is inputted into a liquid crystal display (LCD) 100 through a DAC 102. A scan circuit in the LCD 100 is controlled by a drive pulse from the pulse generator 104 of the controller IC 103. An LED 101 of three colors is used as a light source. The LED 101 is controlled by an LED control signal 108 from the controller IC 103.

In this structure, images of each color have to be switched at a frequency of 180 Hz or more. Therefore, the high speed response according to the present invention effectively works. In display of 180 Hz, a phenomenon of “color breakup”, by which the images of each color are shown separately, occurs when, for example, eyes are rapidly moved by a blink or the like. Thus, a white color is added to the three colors of red, blue, and green, or one color is repeated twice in order of red, green, blue, and green. Otherwise, the display device is driven at double frequency (for example, 360 Hz or more). A high frequency tends to be necessary to resolve the color breakup, as described above, and therefore, the speedup according to the present invention works especially effectively.

In the present invention, the pixel is not divided into three, as in the case of a color filter method, so that it is possible to easily realize high resolution or a high aperture ratio.

Next, a twenty-second embodiment of the present invention will be described. A display device according to this embodiment provides a color field sequential (color time division) time division type stereoscopic liquid crystal display device. In this embodiment, the image signal according to the twenty-first embodiment is composed of an image signal for a right eye and an image signal for a left eye. The image signal for each eye is divided into a plurality of color image signals corresponding to a plurality of colors. Light sources, which correspond to the plurality of colors and are disposed in two positions, are synchronized with the image signal for each eye with a predetermined phase difference. The image signal for each eye is successively displayed with time in synchronization with the plurality of color image signals as the divided plurality of color image signals.

In the twenty-second embodiment of the present invention, the color field sequential display according to the twenty-first embodiment and the field sequential stereoscopic display according to the twentieth embodiment are carried out at the same time. On this account, it is preferable that images be switched at a frequency of at least 360 Hz or more. The speedup according to the present invention effectively works to obtain a sufficient response at this frequency.

According to the present invention, if display is switched between two-dimensional display and three-dimensional display, there is no difference in the number of pixels. Since the pixel is not divided into six for a three dimension and color filters, it is possible to extremely easily realize high resolution or a high aperture ratio. In other words, area efficiency increases six times, as compared with the case of spatially dividing the pixel. As a result, it is possible to obtain a stereoscopic display device with extremely high realism. Since the number of wiring cables is reduced to one-sixth, it is possible to thicken each wiring cable. Therefore, delay in the wiring cables is reduced.

Next, a twenty-third embodiment of the present invention will be described. A display device according to this embodiment is the same as those of the foregoing first to twenty-second embodiments, except that a pixel switch is composed of a thin-film transistor made of amorphous silicon.

Alternatively, in the display devices according to the foregoing first to twenty-second embodiments, the pixel switch is composed of a thin-film transistor made of polycrystalline silicon. The thin-film transistor made of the polycrystalline silicon contains a thin-film transistor which is transferred to a substrate after temporarily being manufactured on another substrate, in addition to thin-film transistors successively manufactured on a substrate.

Furthermore, in the display devices according to the foregoing first to twenty-second embodiments, the pixel switch may be composed of a transistor made of single crystal silicon. A transistor made by bulk silicon technology, a transistor made by SOI (silicon on insulator) technology, a transistor made of amorphous silicon the channel of which is monocrystallized by crystallization technology, or the like corresponds to the transistor made of the single crystal silicon. The transistor made of the single crystal silicon contains a transistor which is transferred to a substrate after temporarily being manufactured on another substrate, in addition to transistors successively manufactured on a substrate.

In the display devices according to the foregoing first to twenty-second embodiments, the pixel switch may be composed of a MIM (metal insulator metal) element.

Next, a twenty-fourth embodiment of the present invention will be described. A display device according to this embodiment is the same as those according to the first to twenty-third embodiments, except that the polarity of the image signal is reversed at a predetermined timing. Of the plurality of electric potentials among which the electric potential of the common electrode changes, one or two electric potentials, which are applied for longer time than the other electric potentials, are almost equal to an electric potential middle of a maximum electric potential and a minimum electric potential of all electric potentials applied as the image signal.

Figure 30:
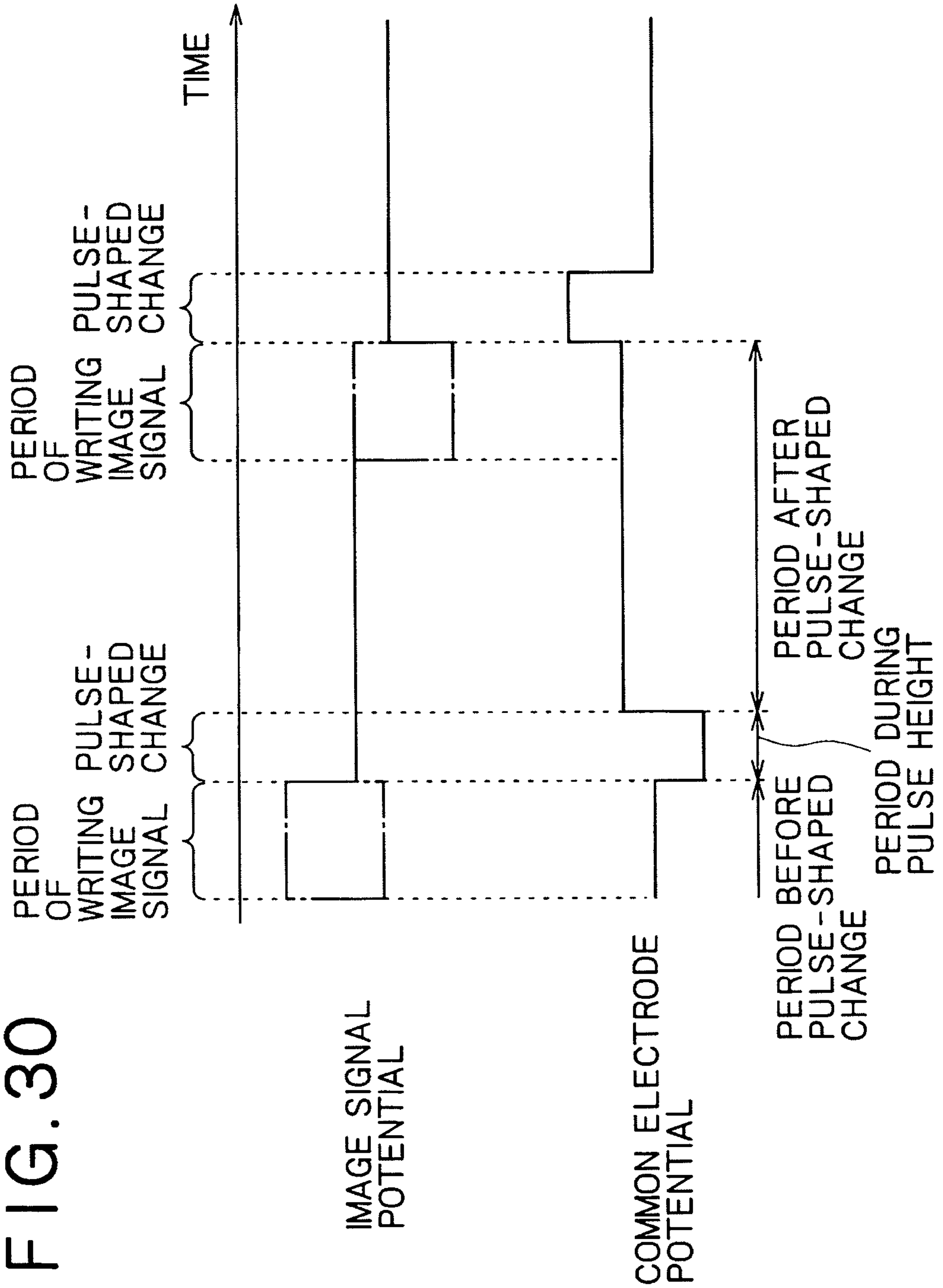
FIG. 30 is a diagram showing an example of waveforms according to a twenty-fourth embodiment of the present invention.

For example, waveforms as shown in FIG. 30 are applied to the liquid crystal display device according to the twenty-fourth embodiment of the present invention. Giving a voltage change as shown in FIG. 30 makes it possible to accelerate the response speed in a period of the pulse-shaped change. The image signal is reversed with respect to the common electrode potential, and minimum values at each polarity are near to each other.

Next, a twenty-fifth embodiment of the present invention will be described. A display device according to this embodiment is the same as those according to the first to twenty-third embodiments, except that the polarity of the image signal is reversed at a predetermined timing. Of the plurality of electric potentials among which the electric potential of the common electrode changes, one or two electric potentials, which are applied for longer time than the other electric potentials, are almost equal to one of a maximum electric potential and a minimum electric potential of all electric potentials applied as the image signal.

Figure 31:
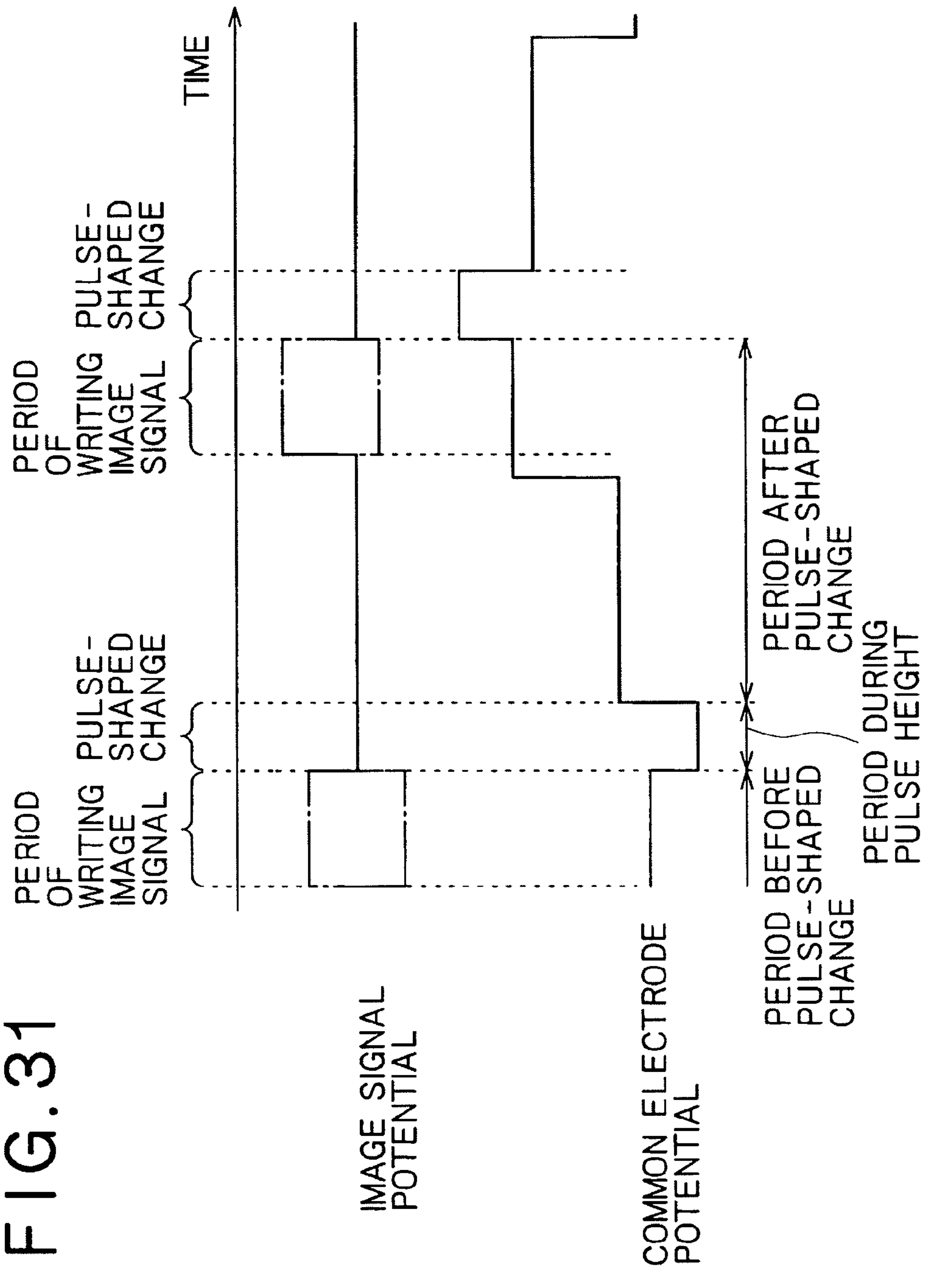
FIG. 31 is a diagram showing an example of waveforms according to a twenty-fifth embodiment of the present invention.

For example, waveforms as shown in FIG. 31 are applied to the liquid crystal display device according to this embodiment. Giving a voltage change as shown in FIG. 31 makes it possible to accelerate the response speed in a period of the pulse-shaped change. The image signal is reversed with respect to the common electrode potential, and a maximum potential value at one polarity is near to a minimum potential value at the other polarity.

Next, a twenty-sixth embodiment of the present invention will be described. A liquid crystal device according to this embodiment is the same as those of the first to twenty-third embodiments, except that the common electrode potential just before the scan signal drive circuit 202 starts scanning the first scan electrode of the scan electrodes 212 is equal to the common electrode potential just after the scan signal drive circuit 202 has scanned all the scan electrodes 212 and the image signal has been transmitted to the pixel electrodes 214, and before being changed into the pulse shape.

An example of waveforms according to the twenty-sixth embodiment is the same as that shown in FIG. 30.

Next, a twenty-seventh embodiment of the present invention will be described. A liquid crystal device according to this embodiment is the same as those of the first to twenty-third embodiments, except that the common electrode potential just before the scan signal drive circuit 202 starts scanning the first scan electrode of the scan electrodes 212 is different from the common electrode potential just after the scan signal drive circuit 202 has scanned all the scan electrodes 212 and the image signal has been transmitted to the pixel electrodes 214, and before being changed into the pulse shape.

In this structure, it is preferable that the common electrode potential just before the scan signal drive circuit 202 starts scanning the first scan electrode of the scan electrodes 212 is almost equal to one of maximum and minimum voltages of the image signal applied after that. The common electrode potential just after the scan signal drive circuit 202 has scanned all the scan electrodes 212 and the image signal has been transmitted to the pixel electrodes 214, and before being changed into the pulse shape is almost equal to the other of the maximum and minimum voltages of the image signal, which has been applied.

An example of waveforms according to the twenty-seventh embodiment is the same as that shown in FIG. 31.

Next, a twenty-eighth embodiment of the present invention will be described. A liquid crystal display device according to this embodiment is the same as those according to the twenty-fourth to twenty-sixth embodiments, except that the common electrode potential is composed of four electric potentials. A first electric potential is the electric potential of the common electrode while the scan signal drive circuit 202 scans the scan electrodes 212 to transmit the reversed image signal with one polarity. A second electric potential is an electric potential of a pulse height section while the electric potential of the common electrode 215 is changed into the pulse shape following the first electric potential. A third electric potential is an electric potential after the completion of the pulse when the electric potential of the common electrode 215 has been changed into the pulse shape following the second electric potential. The third electric potential is also the common electrode potential while the scan signal drive circuit 202 scans the scan electrodes 212 to transmit the reversed image signal with the other polarity. A fourth electric potential is an electric potential of a pulse height section while the electric potential of the common electrode 215 is changed into the pulse shape following the third electric potential.

An example of waveforms according to the twenty-eighth embodiment is the same as that shown in FIG. 30.

Next, a twenty-ninth embodiment of the present invention will be described. A method for driving a display device according to this embodiment is the same as those according to the twenty-fifth to twenty-seventh embodiments, except that the common electrode potential is composed of six electric potentials. A first electric potential is the electric potential of the common electrode while the scan signal drive circuit 202 scans the scan electrodes 212 to transmit the reversed image signal with one polarity. A second electric potential is an electric potential of a pulse height section while the electric potential of the common electrode 215 is changed into the pulse shape following the first electric potential. A third potential is an electric potential after the completion of the pulse when the electric potential of the common electrode 215 has been changed into the pulse shape following the second electric potential. A fourth electric potential is the electric potential of the common electrode while the scan signal drive circuit 202 scans the scan electrodes 212 to transmit the reversed image signal with the other polarity. A fifth electric potential is an electric potential of a pulse height section while the electric potential of the common electrode 215 is changed into the pulse shape following the fourth electric potential. A sixth electric potential is an electric potential after the completion of the pulse when the electric potential of the common electrode 215 has been changed into the pulse shape following the fifth electric potential.

An example of waveforms according to the twenty-ninth embodiment is the same as that shown in FIG. 31.

Figure 32:
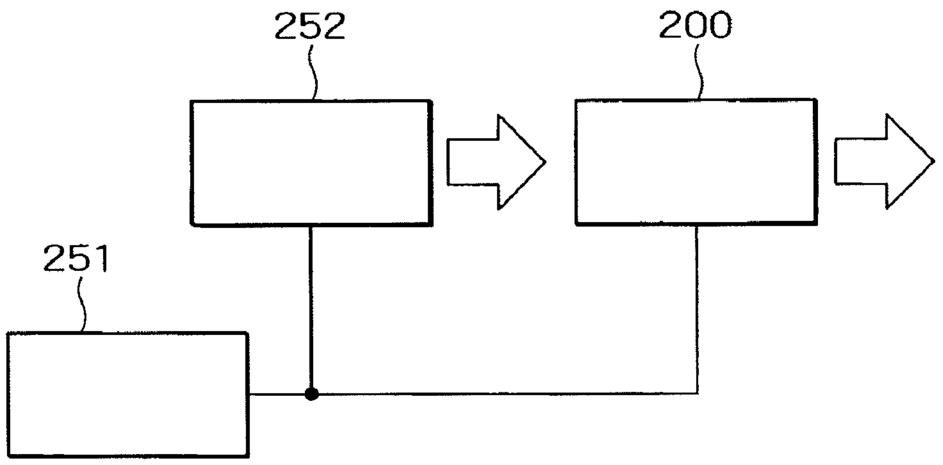
FIG. 32 is a block diagram showing an example of a display device according to a thirtieth embodiment of the present invention.

Next, a thirtieth embodiment of the present invention will be described. A liquid crystal display device according to this embodiment is the same as those according to the first to twenty-ninth embodiments, except for having a light emitting section 252 for emitting light to be incident on a display section 200, as shown in FIG. 32. The liquid crystal display device also has a synchronous circuit 251 for synchronously modulating the light intensity of the light emitting section 252 with a predetermined phase to the image signal.

Figure 33:
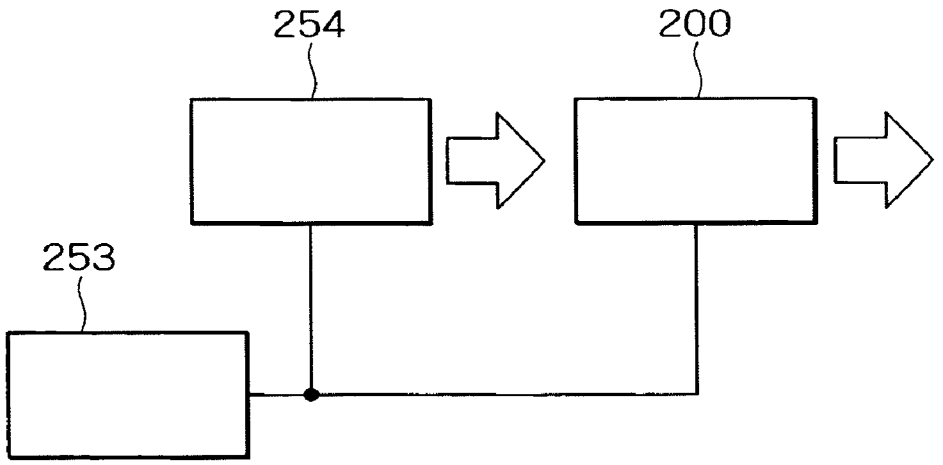
FIG. 33 is a block diagram showing another example of the display device according to the thirtieth embodiment of the present invention.

In the foregoing first to twenty-ninth embodiments, as shown in FIG. 33, the display device may have a light emitting section 252 for emitting light to be incident on a display section 200. The display device may also have a synchronous circuit 253 for synchronously changing the color of light of the light emitting section 254 with a predetermined phase to the image signal.

Figure 34:
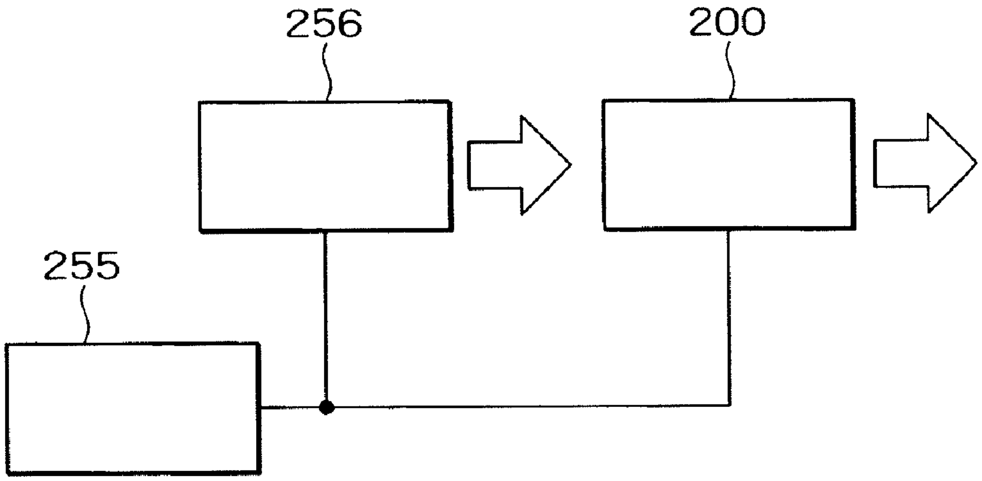
FIG. 34 is a block diagram showing further another example of the display device according to the thirtieth embodiment of the present invention.

In the foregoing first to twenty-ninth embodiments, as shown in FIG. 34, the display device may have a light emitting section 252 for emitting light to be incident on a display section 200. The display device may also have a synchronous circuit 255 for synchronously modulating the light intensity of the light emitting section 256 with a predetermined phase to the image signal, and for synchronously changing the color of light of the light emitting section 256 with a predetermined phase to the image signal.

The light emitting section according to this embodiment may use a surface emitting light source. Otherwise, the light emitting section may use a backlight composed of a light guiding plate and a light source, or another optical element. Otherwise, the light emitting section may use a laser beam, another beam, or a linear light source for scanning.

The light intensity may be modulated by modulation of luminance of the light source itself, or by flashing thereof. Otherwise, the modulation of the light intensity may be carried out by a modulation filter that can modulate translucent or reflective intensity.

Next, a thirty-first embodiment of the present invention will be described. A method for driving a display device according to this embodiment is the same as that of the thirtieth embodiment, except that the timing of modulating the light intensity of the light emitting section, or the timing of changing the color of light of the light emitting section is positioned at the completion of each field, or each subfield corresponding to the color when the field is divided into the subfields in accordance with a plurality of colors. A time of completing each field or each subfield corresponds to just before writing an image signal for the next field.

The operation of the thirty-first embodiment will be described. The light intensity is modulated or the color of light is changed at the completion of each subfield. Thus, it is possible to emit light in a state that the response of the display material of the display section is relatively stable. As a result, it is possible to realize stable display with high light-use efficiency and high quality.

Next, a thirty-second embodiment of the present invention will be described. This embodiment is the same as those of the first to thirty-first embodiments, except that the electronic potential of the image signal is determined by performing comparison among hold data of each pixel before writing the image signal, a variation in the pixel electrode potential, and display data to be newly displayed. The pixel electrode potential varies in accordance with a variation in the electric potential of the common electrode 215 changed into the pulse-shape, the electric potential of the storage capacitor electrode 216 changed into the pulse-shape, or the electric potential of both of them.

Next, a thirty-third embodiment of the present invention will be described. In a display device according to this embodiment, comparison between the data and the variation in the electric potential according to the thirty-second embodiment is successively carried out.

To carry out the successive comparison, the display device has memory means and comparison calculation means. The memory means stores original image signal data in a previous field, or image signal data including correction finally made in the previous field. The comparison calculation means compares image signal data to be newly displayed with the stored data, in order to determine new signal data.

Next, a thirty-fourth embodiment of the present invention will be described. This embodiment is the same as the thirty-second embodiment, except that the comparison between the data and the variation in the electric potential is performed by use of an LUT (lookup table, correspondence table) prepared in advance.

To select necessary data from the correspondence table, the display device has memory means and one of search means and address designation means. The memory means stores original image signal data in a previous field, or image signal data including correction finally made in the previous field. The search means or address designation means searches for the stored data and image signal data to be newly displayed through the correspondence table, in order to determine new signal data.

Then, the operation of the thirty-second to thirty-fourth embodiments according to the present invention will be described. In a simple overdrive method, as disclosed in the official gazette of Japanese Patent No. 3039506, image data of a previous field is basically compared with image data of a new field, to determine image signal data to be applied in consideration of the response of the display material. According to the present invention, on the other hand, since the common electrode potential, the storage capacitor electrode potential, or both of them is changed into the pulse shape, it is necessary to consider the effect of the change in the pulse-shape. This effect causes variation in electric potential mainly caused by the capacitive coupling, and temporal variation in the response time and the like occurring by the variation in the electric potential. By applying the image signal with consideration given to this effect, display according to the present invention has best image quality. The image signal may be made by the successive calculation, or by the lookup table prepared in advance.

Next, a thirty-fifth embodiment of the present invention will be described. This embodiment is the same as the embodiments using the twisted nematic liquid crystal of the first to thirty-fourth embodiments, except that an average tilt angle of the liquid crystal is set at 81 degrees or less during the pulse-shaped change without reset. It is more preferable that the average tilt angle of the liquid crystal be set at 65 degrees or less.

Then, the operation of the thirty-fifth embodiment will be described. The inventor of the present application compared results of experiment and measurement with that of computer simulation. It is apparent from the comparison that delay in a shift from the reset state depends on the average tilt angle of the liquid crystal, in the twisted nematic liquid crystal. When the average tilt angle is 81 degrees or more, the delay occurs because alignment becomes opposite to desired alignment. Also, when the average tilt angle is 65 degrees or more, the direction of changing alignment becomes temporarily unclear, and hence a delay state occurs. The average tilt angle is set lower than such angles when the potential variation without reset is realized, so that it is possible to favorable response characteristics without delay.

Next, a thirty-sixth embodiment of the present invention will be described. A display device according to this embodiment is the same as those of the first to thirty-fifth embodiments, except that the image signal is used as a digital signal. Display is carried out by optical integrated digital drive, in which electric potential applied to the display material is represented by a binary signal and gray level is expressed in a time-base direction.

Figure 35:
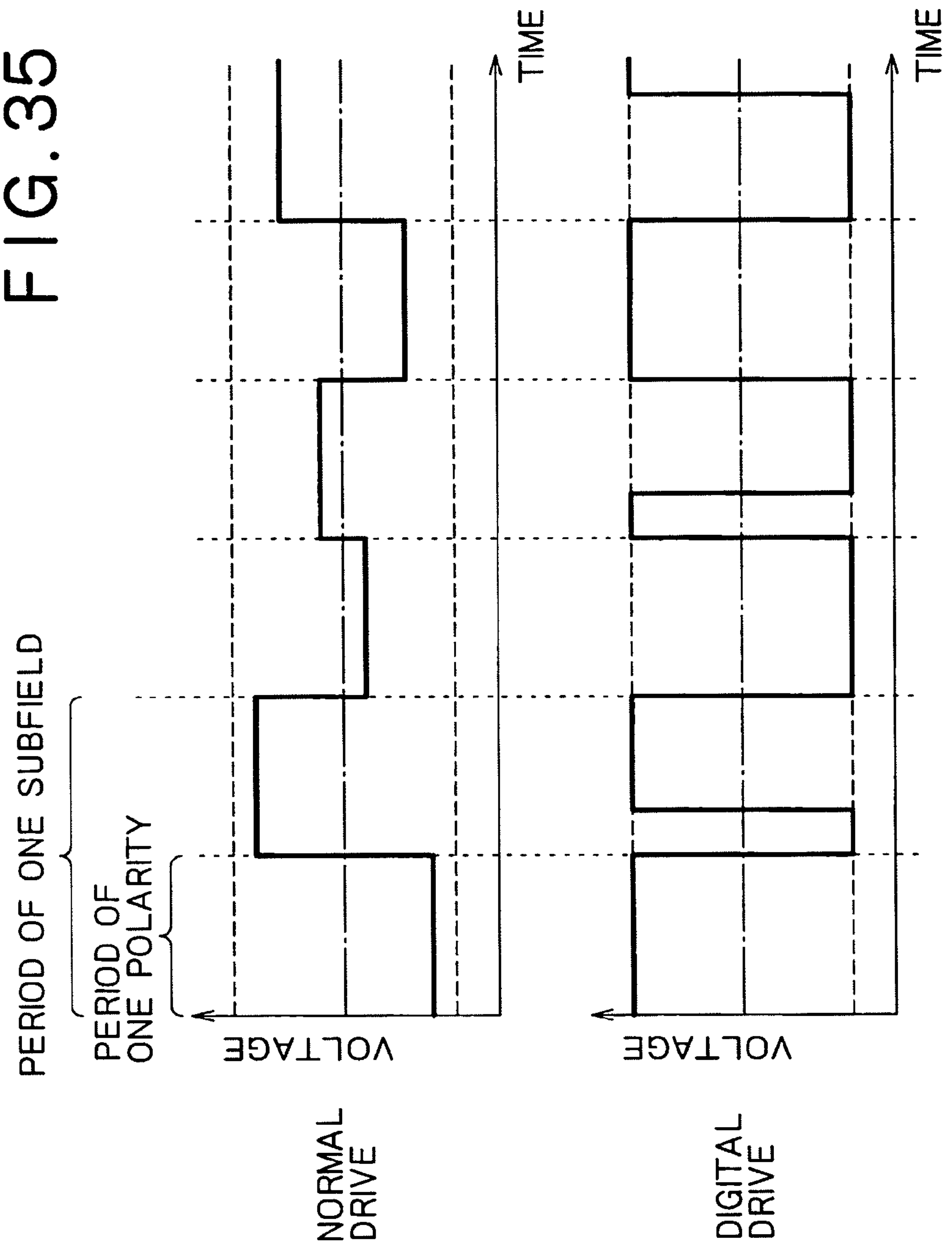
FIG. 35 is a diagram showing an example of a waveform in digital drive of a display device according to a thirty-sixth embodiment of the present invention.
Figure 36:
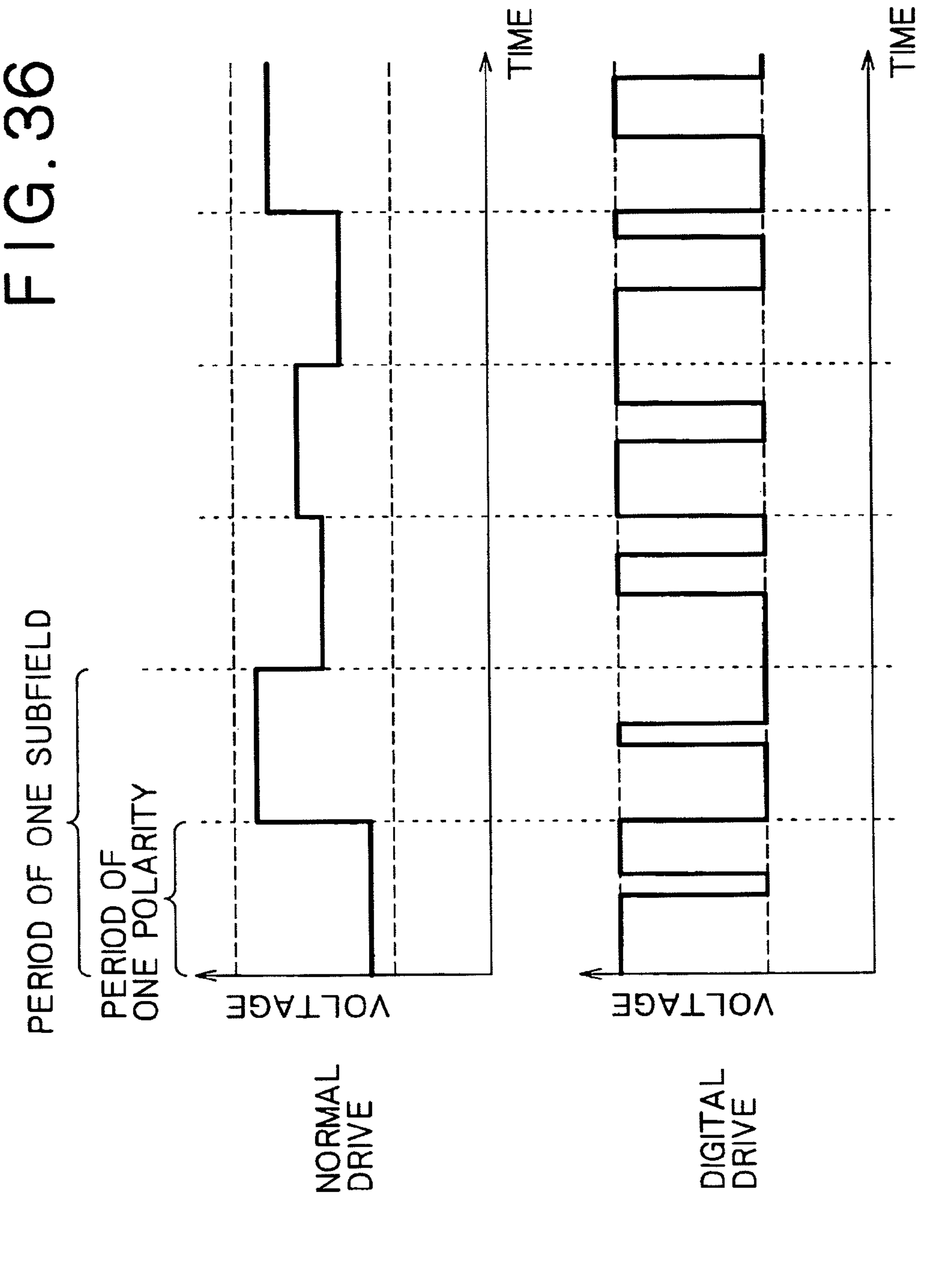
FIG. 36 is a diagram showing another example of the waveform in the digital drive of the display device according to the thirty-sixth embodiment of the present invention.

The operation of the thirty-sixth embodiment will be described. This embodiment carries out the digital drive. For example, the official gazette of Japanese Patent No. 3402602 or the like discloses the digital drive. Referring to FIGS. 35 and 36, the digital drive will be described. FIG. 35 is a schematic diagram showing a waveform of a conventional driving method and a waveform of the digital drive. In the conventional driving method, the electric potential of the common electrode is fixed, and the image signal having a predetermined range of amplitude with respect to the common electrode potential is driven within one subfield period with reversing its polarity. The digital drive uses the same amplitude as the maximum voltage amplitude of the image signal in the conventional driving method. The fixed electric potential of the common electrode is indicated by alternate long and short dashed lines. The maximum and minimum potentials of the image signal are indicated by broken lines. In the conventional drive shown in an upper graph of FIG. 35, gray level is represented by a voltage level. In other words, the gray level is realized by modulating electric field intensity. In the digital drive shown in a lower graph of FIG. 35, on the other hand, a voltage level is binary. The subfield period is divided into a plurality of periods, and gray level is digitally represented by the number of ON and OFF of voltage or the like. Namely, the gray level is realized by the number of pulses. In the digital drive shown in the lower graph, since the amplitude of the image signal voltage can use a width twice as large as the conventional one, the ON response becomes extremely fast. On the other hand, there are cases that delay similar to the delay in shifting from the reset state occurs in some cases. The image signal cannot be reversed, so that it is impossible to keep the electrical neutral of the display material.

FIG. 36 is a schematic diagram showing a waveform of the conventional driving method and a waveform of the digital drive. In the conventional driving method, the electric potential of the common electrode is reversed within the one subfield period, and the image signal having a predetermined range of amplitude with respect to the electric potential of the common electrode is driven in the one subfield period with reversing its polarity. The digital drive uses the same amplitude as the maximum voltage amplitude of the image signal in the conventional driving method. The reversed common electrode potential is indicated by alternate long and short dashed lines. The maximum and minimum potentials of the image signal are indicated by broken lines. In the conventional drive shown in an upper graph of FIG. 36, gray level is represented by a voltage level. In other words, the gray level is realized by modulating electric field intensity. The amplitude of the whole image signal is approximately half of that of FIG. 35. In the digital drive shown in a lower graph of FIG. 36, on the other hand, a voltage level is binary. The subfield period is divided into a plurality of periods, and gray level is digitally represented by the number of ON and OFF of voltage or the like. Namely, the gray level is realized by the number of pulses. In contrast to the digital drive shown in the lower graph of FIG. 35, in the digital drive shown in the lower graph of FIG. 36, the amplitude of the image signal voltage is the same as conventional one, and hence the speed of the ON response is approximately the same. On the other hand, the delay similar to the delay in shifting from the reset state less occurs. The image signal can be reversed, so that it is possible to keep the electrical neutral of the display material.

The speedup according to the method of the present invention effectively works even in such digital drive. Especially, the present invention is extremely effective in structure in which sufficient ON response cannot be obtained as shown in FIG. 36. In the present invention, the display section and various circuits may be formed on different substrates, or may be formed on the same substrate. Part of the circuits may be formed on the same substrate, and the others may be formed on the different substrate.

Figure 37:
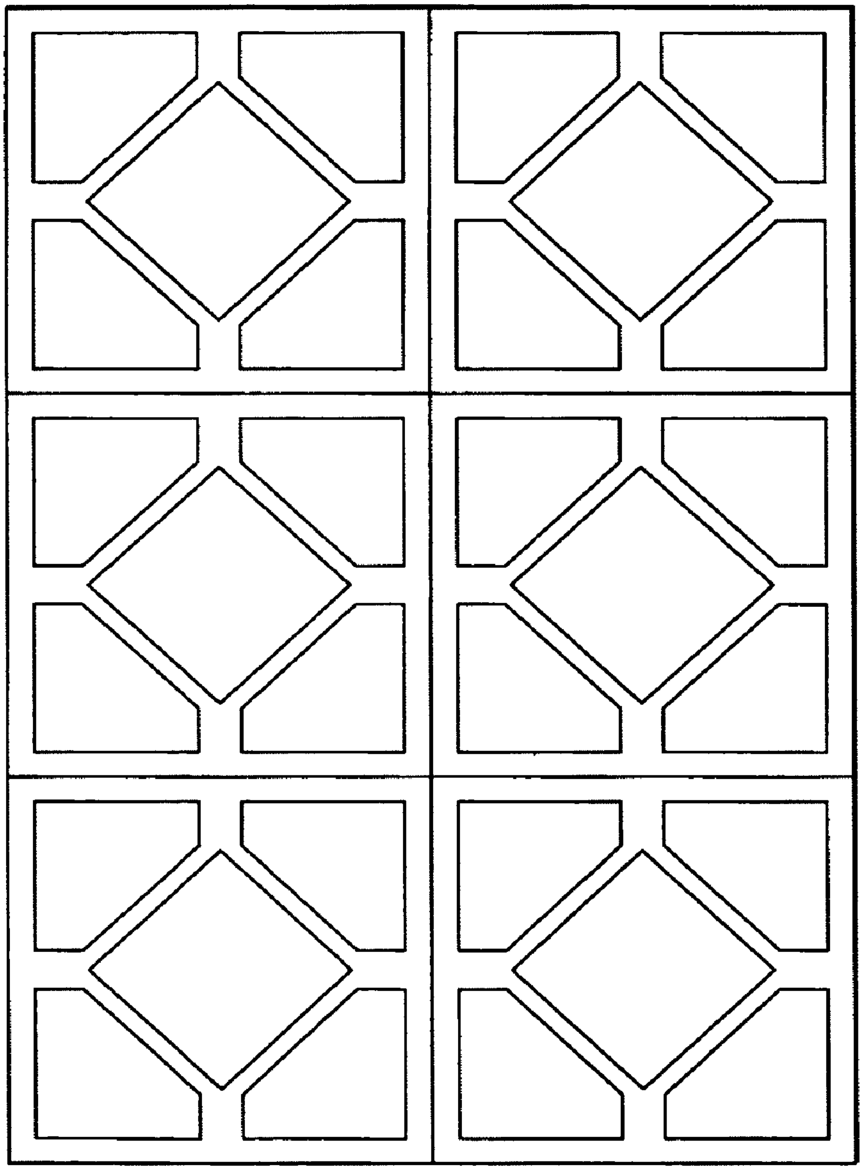
FIG. 37 is a diagram showing an example of PenTile Matrix.

The pixel electrodes, which are arranged in a matrix, may be arranged in stripes, in a delta, in a Bayer pattern (a checkered pattern), or a PenTile Matrix which can increase substantial resolution than usual. The PenTile Matrix is announced by Clair Voyante Laboratory, and FIG. 37 shows an example of the PenTile Matrix.

Next, a thirty-seventh embodiment of the present invention will be described. This embodiment provides a near-eye device which uses the liquid crystal display devices according to the first to thirty-sixth embodiments. The near-eye device includes a viewfinder for a camera and a video camera, a head mount display or a head up display, and other devices used near an eye (for example, within 5 cm).

In the thirty-seventh embodiment, since the liquid crystal display device is used in a near-eye application, high image quality such as fine color reproduction, a sharp image, and crisp moving image display is required. Therefore, the application of the present invention is greatly effective.

Next, a thirty-eighth embodiment of the present invention will be described. This embodiment provides a projection device using the liquid crystal display device according to the first to thirty-sixth embodiments and projecting an original image of the display device by use of a projection optical system. The projection device includes a projector such as a front projector and a rear projector, a magnifying observation device, and the like.

Since this projection device is used in a projection application, an image is often magnified into an extremely large image, and high image quality is severely required. Therefore, the application of the present invention is greatly effective.

Next, a thirty-ninth embodiment of the present invention will be described. This embodiment provides a mobile terminal which uses the liquid crystal display device according to the first to the thirty-sixth embodiments. The mobile terminal includes a cellular phone, an electronic notepad, a PDA (personal digital assistance), a wearable personal computer, and the like.

This mobile terminal is always used in a mobile application. The mobile terminal often uses a battery or a dry battery, so that low electric power consumption is required. Applying the present invention to such an application is greatly effective. The mobile terminal is used not only inside of a room but also in the outside, the application of the present invention with high light-use efficiency is desired to obtain sufficient brightness. Furthermore, the mobile terminal is used in a wide temperature range in response to environment, in which the mobile terminal is carried about. Therefore, the application of the liquid crystal display device according to the present invention capable of operating over a wide temperature range offers a great effect.

Next, a fortieth embodiment of the present invention will be described. This embodiment provides a monitor device which uses the liquid crystal display device according to the first to the thirty-sixth embodiments. The monitor device includes a monitor for a personal computer, a monitor for AV (audio visual) equipment (for example, a television), a monitor for medical care, a monitor in a design application, a monitor in a picture appreciation application, and the like.

This monitor device is used on a desk or the like. The monitor is often watched carefully, so that high image quality is desired. Therefore, application of the present invention is effective.

Next, a forty-first embodiment of the present invention will be described. This embodiment provides a display device for a vehicle which uses the liquid crystal display device according to the first to the thirty-sixth embodiments. The vehicle includes a car, an air plane, a ship, a train, and the like.

This display device for the vehicle is not a device carried about by a person as described in the thirty-ninth embodiment, but a device installed in the vehicle. The vehicle receives various changes in environment, so that it is preferable to apply the liquid crystal device according to the present invention, which tends not to depend on the changes in environment such as light intensity and temperature as described above. Also, since a power source is restricted, the liquid crystal display device with low electric power consumption according to the present invention is beneficial.

Next, the effect of examples in which the liquid crystal display device according to the embodiments of the present invention will be described.

Figure 38:
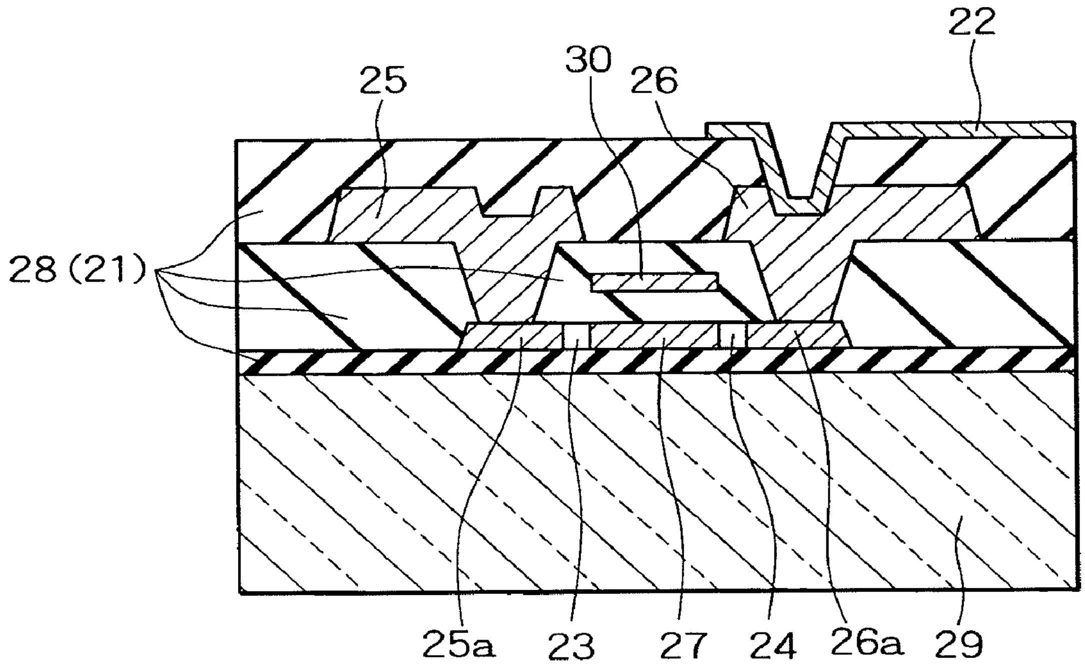
FIG. 38 is a sectional view showing the sectional structure of a planar poly-silicon TFT switch used in the first embodiment of the present invention.

FIG. 38 is a sectional view showing the structure of a TFT array used in the example of the present invention. Referring to FIG. 38, the unit structure of a poly-silicon TFT array in which amorphous silicon is denaturalized into polycrystalline silicon will be described.

In the poly-silicon TFT shown in FIG. 38, after a silicon oxide film 28 is formed on a glass substrate 29, the amorphous silicon is grown. Then, the amorphous silicon is changed into the polycrystalline silicon by annealing with the use of an excimer laser, to form a polycrystalline silicon film 27. Furthermore, a silicon oxide film 28 of 10 nm is grown. After patterning, a photoresist is patterned slightly larger than the shape of a gate (to form LDD regions 23 and 24 after that), and a source region (electrode) **26*a* and a drain region (electrode) 25*a* are formed by doping phosphorus ions. After a silicon oxide film 28 serving as a gate oxide film is grown, the amorphous silicon and tungsten silicide (WSi) serving as a gate electrode 30 are grown. Then, a photoresist is patterned, and the amorphous silicon and the tungsten silicide (WSi) are patterned in the shape of the gate electrode by use of the photoresist as a mask. Then, phosphorus ions are doped to only necessary regions by using the patterned photoresist as a mask, to form the LDD regions 23 and 24. After that, a silicon oxide film 28 and a silicon nitride film 21 are successively grown, and then, holes for contact are made. Then, aluminum and titanium are sputtered and patterned, to form a source electrode 26 and a drain electrode 25. After that, a silicon nitride film 21 is formed on the whole surface, and a hole for contact is made. An ITO film is formed on the whole surface, and a translucent pixel electrode 22 is formed by patterning. In such a manner, a planer type TFT pixel switch as shown in FIG. 38** is made, and the TFT array is formed. Thus, a pixel array with the TFT switches and a scan circuit are provided on the glass substrate.

In FIG. 38, a TFT is formed by changing the amorphous silicon into the polycrystalline silicon. The TFT, however, may be formed by a method of improving the diameter of a particle of the polycrystalline silicon by laser irradiation after the polycrystalline silicon is grown. A continuous-wave (CW) laser may be used instead of the excimer laser.

Furthermore, if the process for changing the amorphous silicon into the polycrystalline silicon by the laser irradiation is omitted, it is possible to form an amorphous silicon TFT array.

Figure 39A:
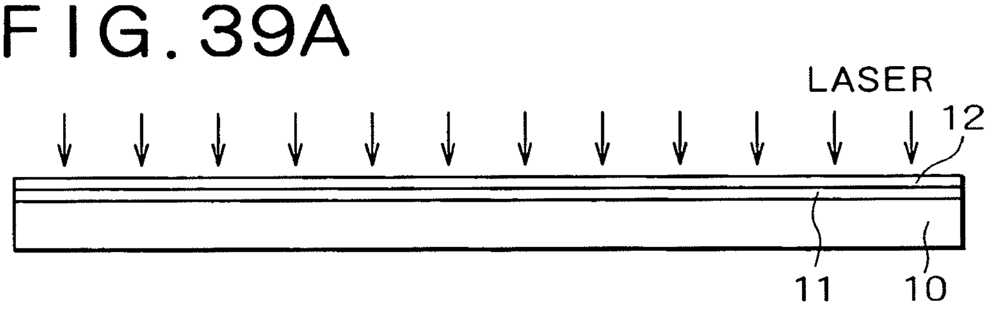
FIGS. 39A to 39D are sectional views which explain main procedures for manufacturing a display panel board used in the present invention.
Figure 39B:
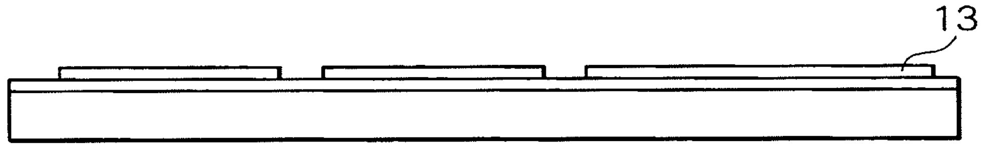
Figure 39C:
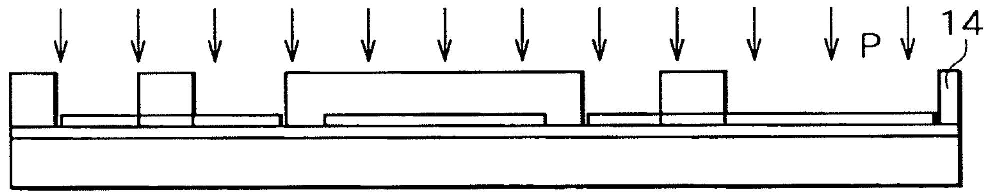
Figure 39D:
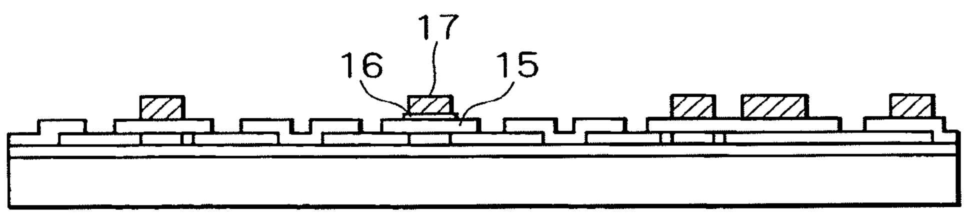

FIGS. 39A to 39D and FIGS. 40A to 40D are sectional views which explain a method for manufacturing the poly-silicon TFT (planer structure) array in processing order. Referring to FIGS. 39A to 39D and FIGS. 40A to 40D, the method for manufacturing the poly-silicon TFT array will be described in detail. After a silicon oxide film 11 was formed on a glass substrate 10, amorphous silicon 12 was grown. Then, the amorphous silicon 12 was annealed by use of the excimer laser, to change the amorphous silicon 12 into polycrystalline silicon (FIG. 39A). Then, after a silicon oxide film 13 having a thickness of 10 nm was grown and patterned (FIG. 39B), a photoresist 14 was applied and patterned (for masking p-channel regions). Phosphorus (P) ions were doped to form source and drain regions of n-channels (FIG. 39C). A silicon oxide film 15 with a thickness of 90 nm serving as a gate insulating film was grown, and then amorphous silicon 16 and tungsten silicide (WSi) 17 were grown to form a gate electrode. Then, the amorphous silicon 16 and the tungsten silicide (WSi) 17 were patterned in the shape of a gate (FIG. 39D).

Figure 40A:
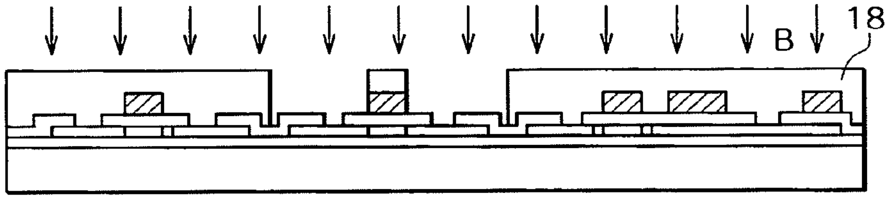
FIGS. 40A to 40D are sectional views which explain main procedures for manufacturing the display panel board used in the present invention.
Figure 40B:
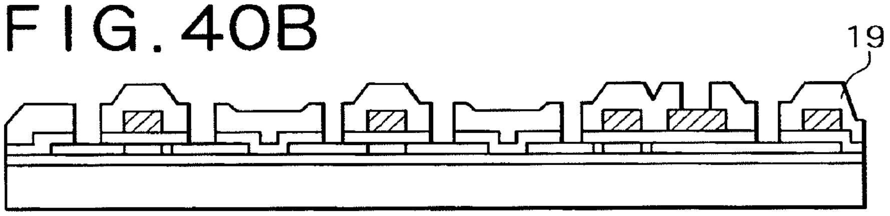
Figure 40C:
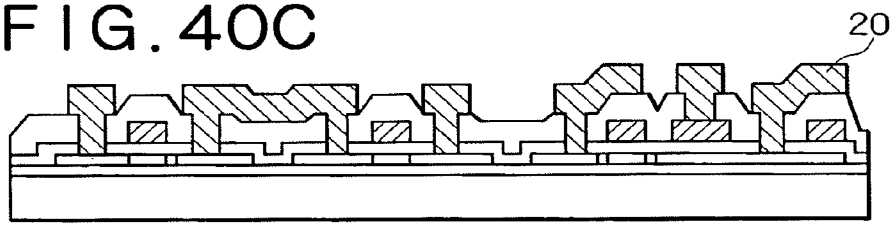
Figure 40D:
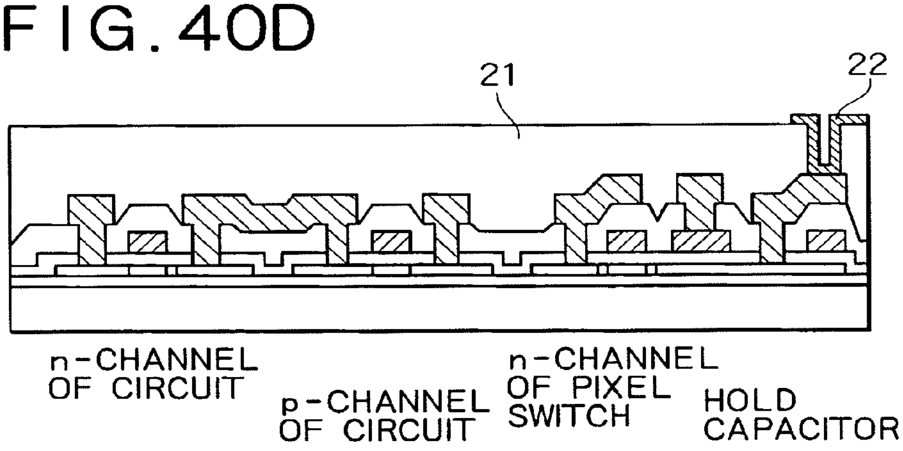

A photoresist 18 was applied and patterned (to mask re-channel regions), and boron (B) were doped to form source and drain regions of p-channels (FIG. 40A). After a silicon oxide film and a silicon nitride film 19 were continuously grown, holes for contact were made (FIG. 40B). Aluminum and titanium 20 were sputtered and patterned (FIG. 40C). By this patterning, source and drain electrodes of CMOS of a peripheral circuit, a data line wiring connected to a drain of the pixel switch TFT, and a contact to the pixel electrode were formed. Then, a silicon nitride film 21 serving as an insulating film was formed. A hole for contact was made, and then an ITO (indium tin oxide) 22 serving as a transparent electrode was formed and patterned as the pixel electrode (FIG. 40D).

In such a manner, the TFT pixel switch with planer structure was made, and the TFT array was formed. The tungsten silicide was used in the gate electrode, but another material such as chromium is also available.

Liquid crystal is sandwiched between a TFT array substrate manufactured like this and an opposed substrate in which an opposed electrode is formed so that a liquid crystal panel is formed. To form the opposed electrode, an ITO film is formed on the whole surface of a glass substrate serving as the opposed substrate, and is patterned. Then, a chromium patterning layer for shielding light is formed. The chromium patterning layer for shielding light may be formed before forming the ITO film on the whole surface. Then, a patterned pole of 2 μm was manufactured on the opposed substrate. This pole is used as a spacer for keeping a cell gap, and also, has resistance to impact. The height of the pole is appropriately changeable in accordance with the design of the liquid crystal panel. An alignment film was printed in the surface of the TFT array substrate and the surface of the opposed substrate, where the surfaces are opposed to each other. Rubbing the alignment film, an alignment direction at an angle of 90 degrees was obtained after assembly. After that, a sealant cured by ultraviolet ray radiation was applied to the outside of a pixel region of the opposed substrate. After the TFT array substrate and the opposed substrate were faced to each other and bonded, the liquid crystal was injected to form the liquid crystal panel.

The chromium patterning layer serving as a light shielding film is provided in the opposed substrate, but may be provided in the TFT array substrate. As a matter of course, the light shielding film is made of a material except for the chromium, as long as the material can shield light. For example, WSi (tungsten silicide), aluminum, a silver alloy, or the like is available.

To form the chromium patterning layer for shield light on the TFT array substrate, there are three types of structure. In the first structure, the chromium patterning layer for shielding light is formed on the glass substrate. After the patterning layer for shielding light is formed, the TFT array substrate is manufactured by the same procedure as above. In the second structure, after the TFT array substrate having the same structure described above is manufactured, the chromium patterning layer for shielding light is lastly formed. In the third structure, the chromium patterning layer for shielding light is formed in the middle of manufacturing the foregoing structure. When the chromium patterning layer for shielding light is formed in the TFT array substrate, a chromium patterning layer for shielding light may not be formed in the opposed substrate. The opposed substrate is formed by patterning after the ITO film is formed on the whole surface.

According to the example of the present invention, the nematic liquid crystal was sandwiched between the foregoing TFT array substrate and the opposed substrate, and the alignment was twisted by 90 degrees between both of the substrates to realize the TN mode. The scan electrode drive circuit, the signal electrode drive circuit, part of the synchronous circuit, and part of the common electrode potential control circuit were manufactured on the glass substrate.

The TFT panel manufactured like this was driven so as to overdrive the image signal and give the pulse-shaped change to the common electrode potential. Also, liquid crystal of p/d=3 was used. A comparison calculation circuit for generating an image signal was also included. In this structure, a color field sequential drive of 180 Hz was carried out. As a color time division light source, a backlight with LEDs was used.

In such a structure, the pixel pitch was 17.5 μm. Display with a resolution of VGA (640 horizontal×480 vertical dots) was carried out in a display area of 0.55-inch diagonal length. A pixel on the corner of the display area was provided with a buffer amplifier made of a thin-film transistor in order to measure variation in the pixel potential. Also, a buffer amplifier connected to the pixel electrode and manufactured in a like manner was manufactured in the substrate to measure the characteristics of the buffer amplifier. The following pixel potentials are corrected values of the output voltage of the buffer amplifier in consideration of a gain and an offset, on the basis of measurement results by the buffer amplifier for measuring the characteristics of the buffer amplifier.

Figure 41:
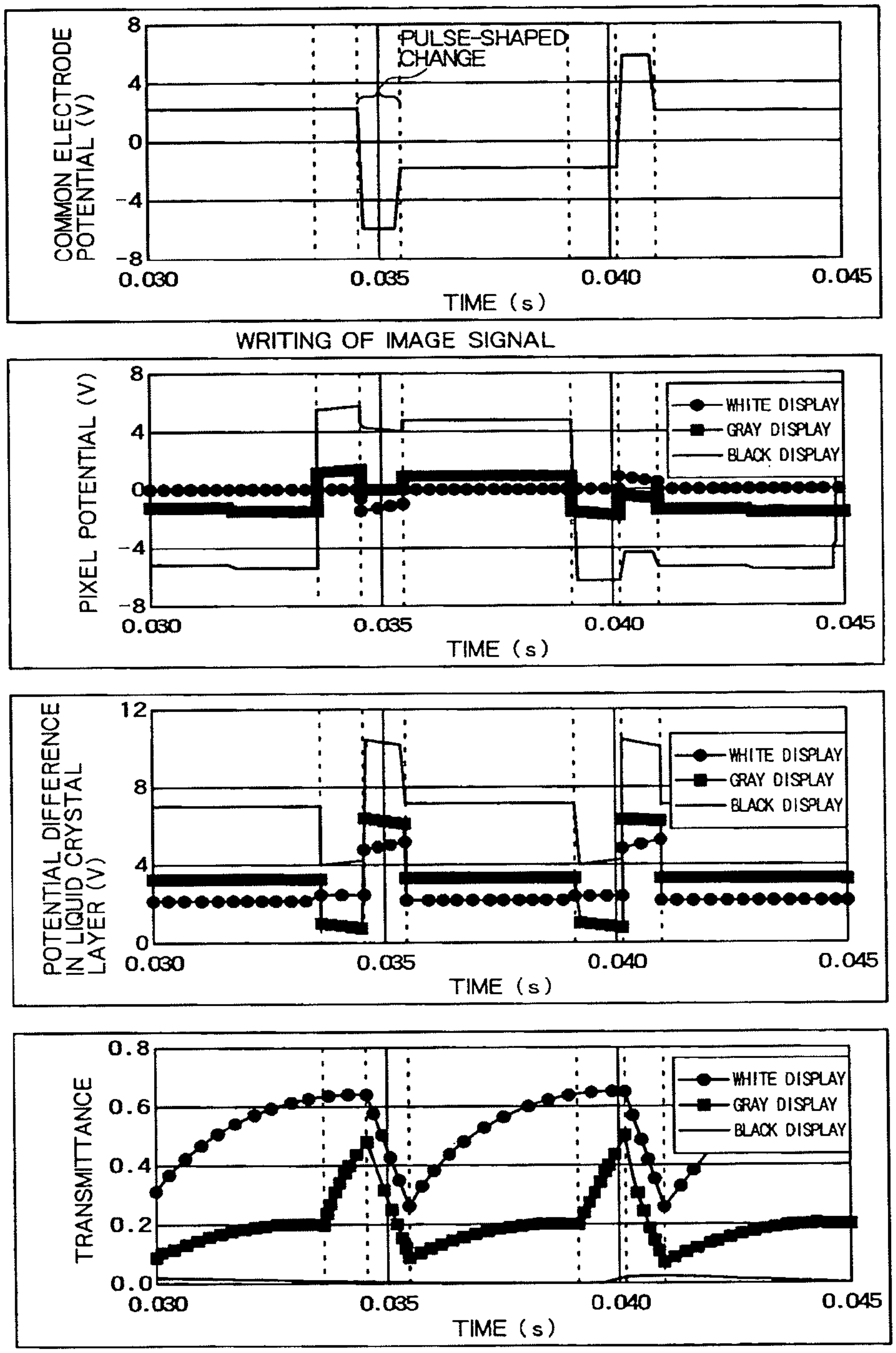
FIG. 41 is graphs showing measurement results of variations in electric potential and transmittance with time according to an example of the present invention.

FIG. 41 shows variations with time in the common electrode potential, the pixel electrode potential, a potential difference in the liquid crystal layer calculated from the common electrode potential and the pixel electrode potential, and the transmittance. Three types of voltage, that is, voltage for white display, black display, and gray display in a halftone state were used as gray level voltage in potential measurement. As is apparent from an uppermost graph of FIG. 41, the common electrode potential was changed as that shown in FIG. 30. As shown in the second graph from above of FIG. 41, the pixel potential changes in accordance with the writing of the image signal. Even in periods without the writing of the signal, a value of the pixel potential increases or decreases in accordance with the response of the liquid crystal. The reason why the pixel potential varies is that the capacitance of the liquid crystal layer varies in accordance with the response of the liquid crystal, even if the electric charge accumulated between the pixel electrode and the common electrode is kept almost constant. When the pulse-shaped change is applied to the common electrode potential, the pixel electrode largely varies by the capacitive coupling. A third graph from above of FIG. 41 indicates the potential difference in the liquid crystal layer which corresponds to an absolute value of difference between the pixel electrode potential and the common electrode potential. The potential difference is large in the pulse height sections, as compared with the other periods. Therefore, it is apparent that an overdrive effect is obtained. Variation in the pixel potential in accordance with the response of the liquid crystal is large in the pulse height sections. In other words, it is suggested that the response of the liquid crystal becomes fast, and hence the capacitance of the liquid crystal layer abruptly varies. At a point in time when the pulse-shaped change is completed, the pixel potential varies again by the capacitive coupling. A lowermost graph of FIG. 41 shows the variation with time in the transmittance obtained from waveforms described above. A unit of the transmittance is arbitrary. When the image signal is written, the transmittance starts changing. The transmittance rapidly varies in a period when the pulse-shaped change is applied. When the pulse-shaped change is completed, the transmittance varies toward a state in which each condition is stable.

Figure 42:
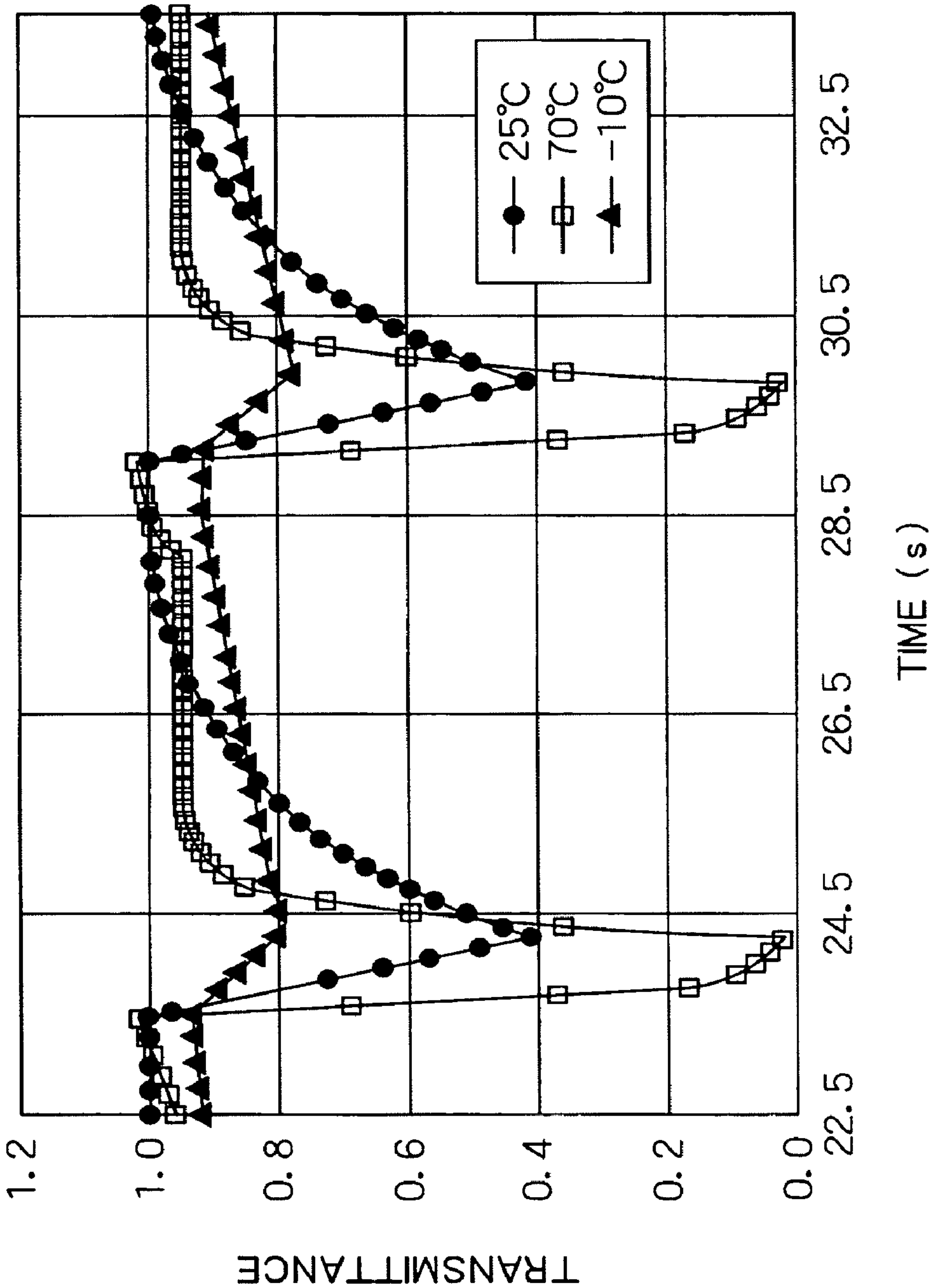
FIG. 42 is a graph showing a variation in the transmittance with time when the temperature is changed, according to the example of the present invention.
Figure 43:
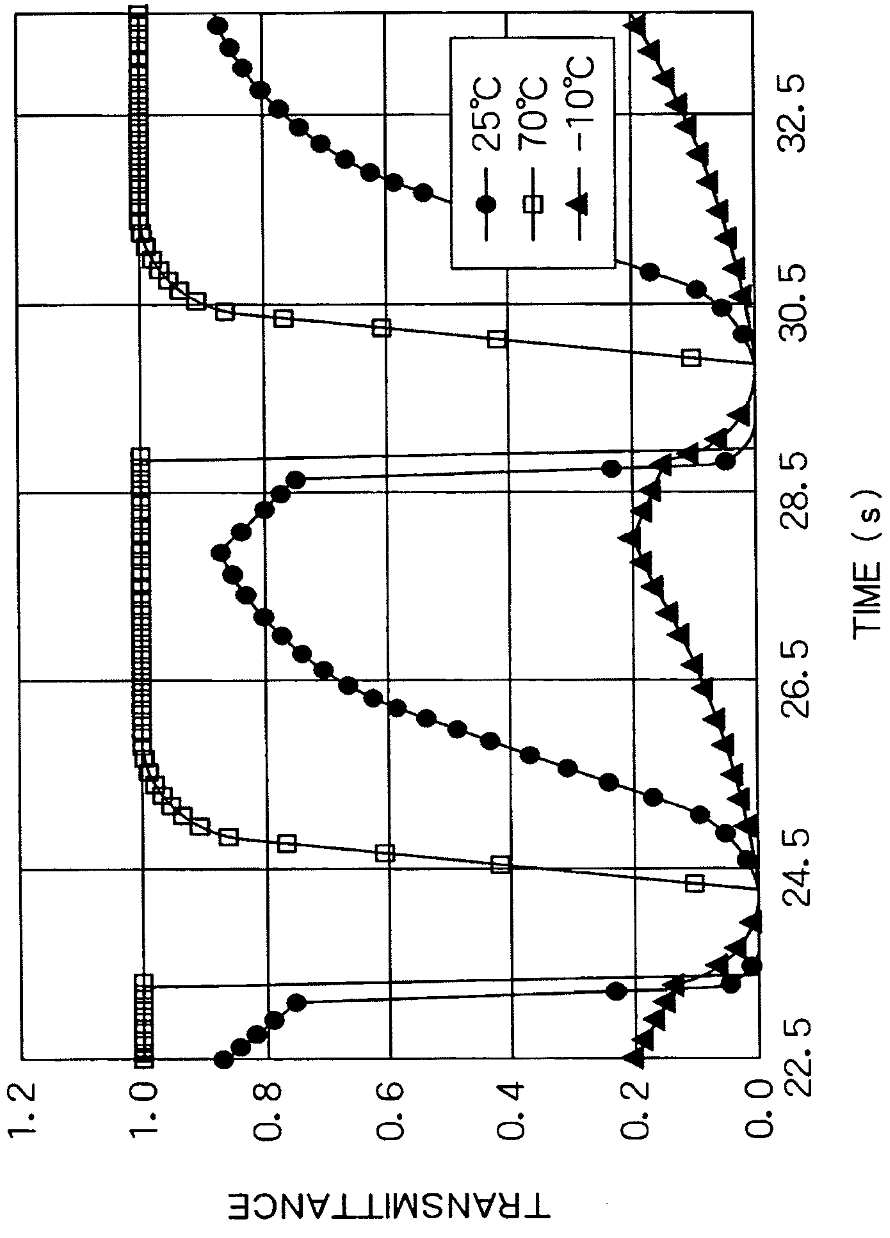
FIG. 43 is a graph showing a variation in transmittance with time when the temperature is changed according to a comparative example.
Figure 44:
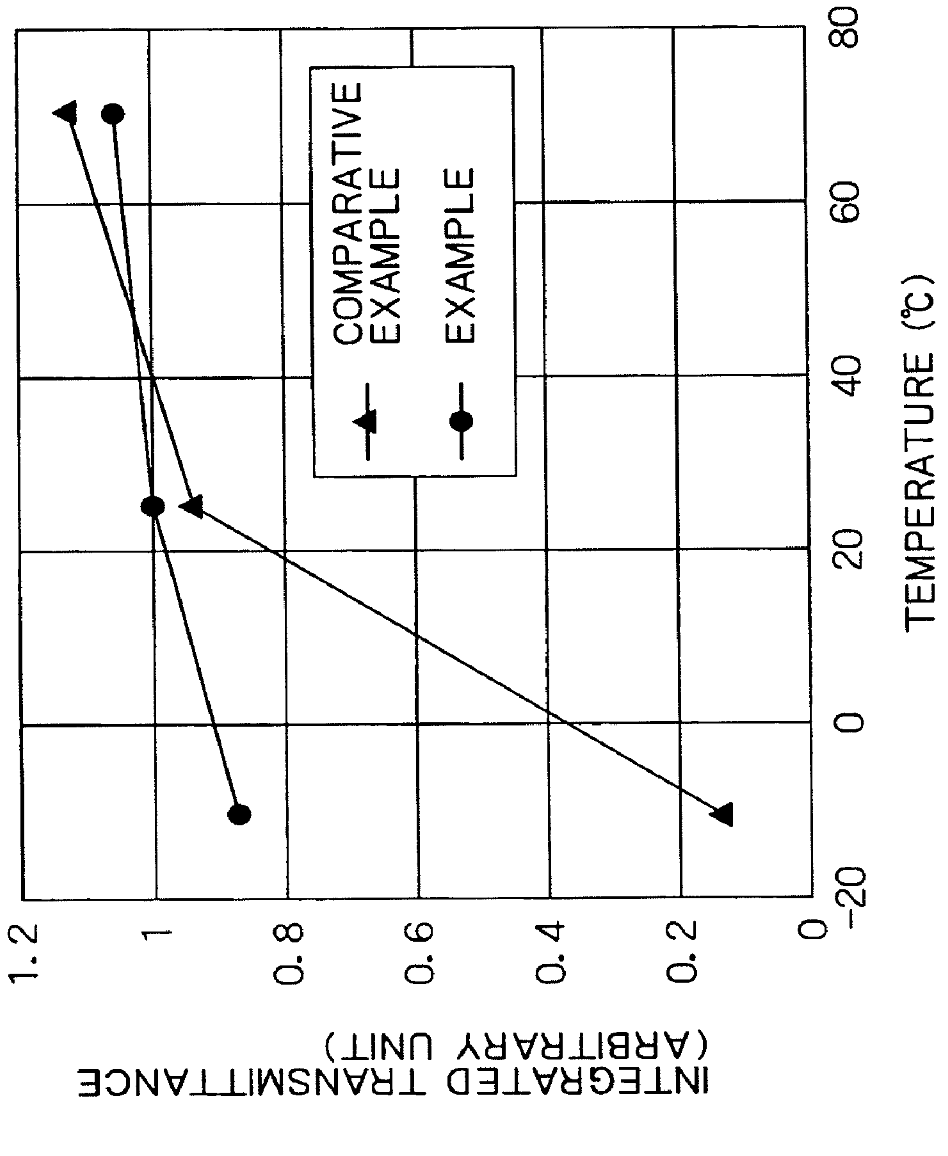
FIG. 44 is a graph showing the dependence of integrated transmittance on temperature according to the example and the comparative example of the present invention.

Then, the characteristics of the display device according to the example of the present invention were measured, when the ambient temperature varied. Also, the characteristics of the example were compared with those of a comparative example. As the comparative example, a color field sequential display device of 180 Hz driven by the combination of the overdrive and the reset drive as disclosed in the Japanese National Publication No. 2001-506376, was used. To correctly ascertain the effects of temperature in measurement, a display device was disposed in a constant temperature oven, and a temperature sensor fixed on the display section was monitored. Since the measurement was carried out after having waited for 30 minutes since reaching a desired temperature, the display section was stably controlled toward the desired temperature. FIG. 42 shows variations with time in the transmittance in the white display according to the example of the present invention, when the temperature was changed among −10° C., 25° C., and 70° C. FIG. 43 shows variations with time in the transmittance in the white display according to the comparative example, when the temperature was changed among −10° C., 25° C., and 70° C. In the example of the present invention, the transmittance heads for the stable state after the pulse-shaped change has been completed. The transmittance reaches approximately the same level at any temperature. In the comparative example, on the other hand, the transmittance rapidly increases after reset at 70° C., but the transmittance gently increases at 25° C. Furthermore, the transmittance hardly increases at −10° C., and a maximum attainable transmittance is approximately one-fifth of that at 70° C. FIG. 44 is a graph, in which the temperature dependence of integrated transmittance is compared between the example and the comparative example of the present invention. The integrated transmittance is the integral of the transmittance in a period of turning on the light source, in the color field sequential method. Average transmittance in the period of turning on the light source is more important than the maximum attainable transmittance in actual use. Thus, the integrated transmittance is used as an index. In the comparative example, the integrated transmittance abruptly changes in accordance with a change in temperature. The integrated transmittance at −10° C. is approximately one-tenth of that at 70° C., so that the device according to the comparative example is unavailable at low temperatures.

Figure 45:
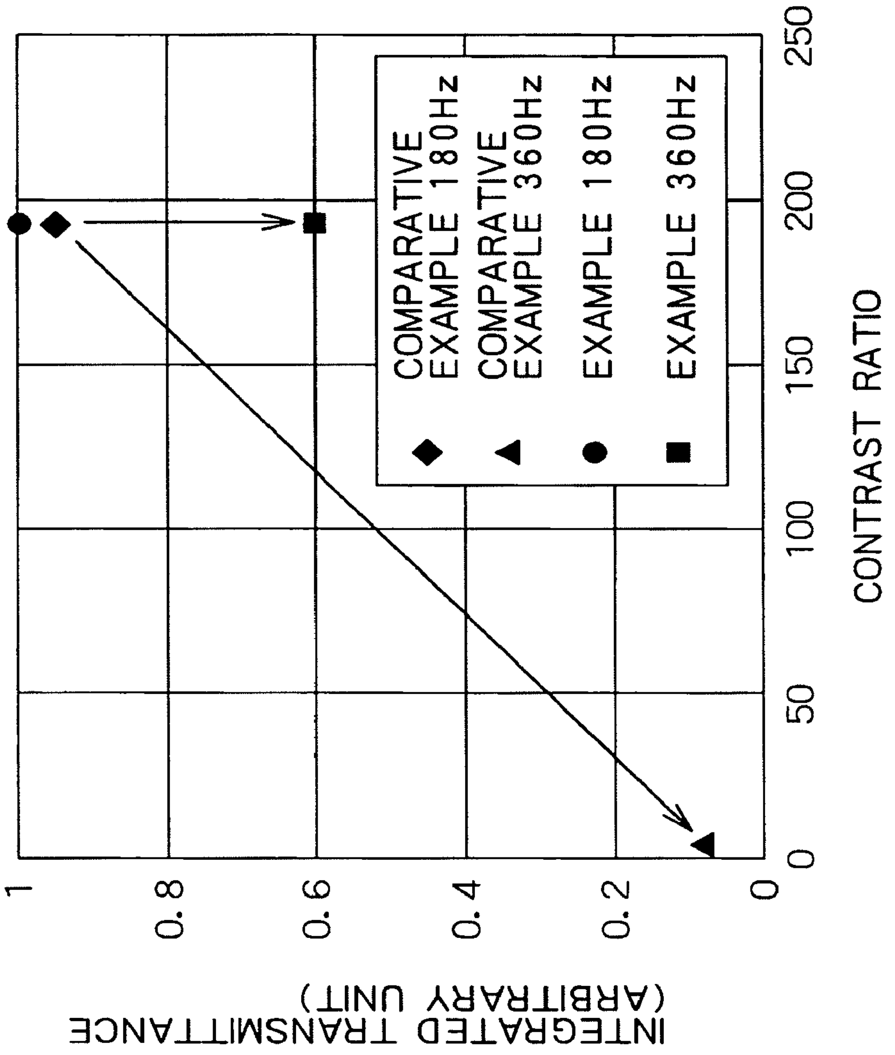
FIG. 45 is a graph showing the dependence of a contrast ratio and the integrated transmittance on a drive frequency according to the example and the comparative example of the present invention.

Furthermore, the characteristics of the display device according to the present invention were measured, when a frequency was increased in the color field sequential method. The display device using a method disclosed in the Japanese National Publication No. 2001-506376 was used as the comparative example, as in the case of FIG. 42 and FIG. 44. The integrated transmittance and a contrast ratio were measured with the use of frequencies of 180 Hz and 360 Hz. FIG. 45 shows measurement results. At 180 Hz, as is apparent from FIG. 45, the integrated transmittance and the contrast ratio are approximately the same between the example and the comparative example. At 360 Hz, however, both of the integrated transmittance and the contrast ratio abruptly decrease in the comparative example. As a result, it became difficult to visually identify an image. In the example of the present invention, on the other hand, the integrated transmittance at 360 Hz is approximately 60% of that at 180 Hz, and the contrast ratio hardly changes. As a result, display becomes slightly dark, but can be favorably identified.

The liquid crystal display device according to this example can obtain a luminance of 150 candelas per square meter or more, so that display is favorably identified even under relatively strong outside light. Under further intense light, the liquid crystal display device is usable as a monochrome display device, since a signal from a light sensor turns off the backlight.

According to the present invention, as described above, the transmissive twisted nematic liquid crystal display device can respond at extremely high speed, so that the color field sequential drive at 360 Hz is made possible.

In the present invention, it is enough to overdrive the image signal at a lower voltage than that in the conventional overdrive method. In this example, a voltage of 6 V is applied in the black display, as shown in the pixel potential of FIG. 41. When a liquid crystal material used in the example is normally drive, an application voltage of 5 V is necessary in the black display. Thus, a voltage for the overdrive is 1 V. In the conventional overdrive method, on the other hand, a voltage of 2 V to 3 V is normally applied. In other words, an application voltage of 7 V to 8 V is necessary for the conventional method, whereas it is 6 V in this example. This difference occurs, because the pulse-shaped change of the common electrode potential, which corresponds to two steps of overdrive, effectively increases the response speed in the present invention.

The present invention is extremely beneficial to increasing the response speed of the liquid crystal display device.

What is claimed is:

1. A liquid crystal display device comprising:

a liquid crystal display section having a plurality of scan electrodes, a plurality of image signal electrodes which are perpendicular to the scan electrodes, a plurality of pixel electrodes arranged in a matrix with the scan electrodes and the image signal electrodes, a plurality of switching elements for transmitting an image signal to the plurality of pixel electrodes, a plurality of common electrodes which are next to the plurality of pixel electrodes and a plurality of storage capacitor electrodes;

an image signal drive circuit coupled to the liquid crystal display section;

a scan signal drive circuit coupled to the liquid crystal display section;

a synchronous circuit coupled to the image signal drive circuit and the scan signal drive circuit; and a common electrode potential control circuit, coupled to the synchronous circuit and the liquid display section, for changing an electric potential of the common electrode into a pulse shape, just after the scan signal drive circuit has scanned all the scan electrodes and the image signal has been transmitted to the pixel electrodes, wherein electric potentials of the image signal, during an electric charge hold drive, are never an electric potential of the image signal in a stable display state during static drive, wherein the sum of electric charge held between the pixel electrodes and the common electrodes and electric charge held between the pixel electrodes and the storage capacitor electrodes, is approximately equal to hold data.

2. The liquid crystal display device according to claim 1, wherein the display section is provided with a lenticular lens sheet or a dual prism sheet to achieve stereoscopic display.

3. The liquid crystal display device according to claim 1, being in a color field sequential (color time division) method, wherein an image signal is divided into a plurality of color image signals corresponding to a plurality of colors, a light source corresponding to the plurality of colors is synchronized with the plurality of color image signals with a predetermined phase difference, and the plurality of color image signals are successively displayed with time.

4. The liquid crystal display device according to claim 3, being in a color field sequential (color time division) type of time division stereoscopic display method, wherein an image signal comprises an image signal for a right eye and an image signal for a left eye, the image signal for each eye is divided into a plurality of color image signals corresponding to a plurality of colors, light sources which correspond to the plurality of colors and are disposed in two positions are synchronized with the image signals for the respective eyes with a predetermined phase difference, the image signals for the respective eyes are successively displayed with time in synchronization with the plurality of color image signals, and the image signals for the respective eyes are successively displayed with time as the divided plurality of color image signals.

5. The liquid crystal display device according to claim 1, wherein the polarity of the image signal is reversed at a predetermined timing, and of a plurality of electric potentials among which the electric potential of the common electrode changes, one or two electric potentials applied for longer time than the other electric potentials is/are almost equal to an electric potential middle of a maximum electric potential and a minimum electric potential of all electric potentials applied as the image signal.

6. The liquid crystal display device according to claim 1, wherein the polarity of the image signal is reversed at a predetermined timing, and of a plurality of electric potentials among which the electric potential of the common electrode changes, one or two electric potentials applied for longer time than the other electric potentials is/are almost equal to one of a maximum electric potential and a minimum electric potential of all electric potentials applied as the image signal.

7. The liquid crystal display device according to claim 1, wherein the electric potential of the common electrode just before the scan signal drive circuit starts scanning the first scan electrode of the scan electrodes is almost equal to one of a maximum electric potential and a minimum electric potential applied as an image signal to be applied after that, and the electric potential of the common electrode just after the scan signal drive circuit has scanned all the scan electrodes and the image signal has been transmitted to the pixel electrode and before being changed into the pulse shape is almost equal to the other of the maximum electric potential and the minimum electric potential having applied as the image signal.

8. The liquid crystal display device according to claim 1, having a light emitting section for emitting light to be incident on the display section, and a synchronous circuit for synchronously modulating a light intensity of the light emitting section with a predetermined phase with respect to the image signal.

9. The liquid crystal display device according to claim 1, having a light emitting section for emitting light to be incident on the display section, and a synchronous circuit for synchronously changing the color of light of the light emitting section with a predetermined phase with respect to the image signal.

10. The liquid crystal display device according to claim 1, having a light emitting section for emitting light to be incident on the display section, and a synchronous circuit for synchronously modulating a light intensity of light of the light emitting section with a predetermined phase with respect to the image signal, and for synchronously changing the color of light of the light emitting section with a predetermined phase with respect to the image signal.

11. The liquid crystal display device according to claim 1, wherein the electric potential of the image signal is determined by performing comparison among hold data of each pixel before writing the image signal, a variation in an electric potential of the pixel electrode, and display data to be newly displayed, the variation in the electric potential of the pixel electrode being in accordance with a variation in the electric potential of the common electrode changed into the pulse shape, a variation in the electric potential of the storage capacitor electrode changed into the pulse shape, or a variation in both the electric potentials of the common electrode and the storage capacitor electrode.

12. The liquid crystal display device according to claim 11, wherein the comparison between the data and the variation in the electric potential is successively performed.

13. The liquid crystal display device according to claim 11, wherein the comparison between the data and the variation in the electric potential is performed by use of a LUT (lookup table, correspondence table) prepared in advance.

14. The liquid crystal display device according to claim 1, using twisted nematic liquid crystal, wherein a pulse-shaped change without reset restricts an average tilt angle of the liquid crystal to 81 degrees or less, while the pulse-shaped change is applied.

15. The liquid crystal display device according to claim 14, wherein the pulse-shaped change without reset restricts the average tilt angle of the liquid crystal to 65 degrees or less, while the pulse-shaped change is applied.

16. The liquid crystal display device according to claim 1, wherein: an image signal is used as a digital signal; an electric potential applied to a display material is a binary signal; and display is carried out by optical integrated digital drive that expresses gray level in a time-base direction.

* * * * *